United States Patent
Li et al.

(10) Patent No.: US 12,487,411 B2
(45) Date of Patent: Dec. 2, 2025

(54) OPTICAL FIBER ADAPTER, OPTICAL FIBER CONNECTOR PLUG, CONNECTOR ASSEMBLY, AND COMMUNICATION DEVICE

(71) Applicant: HUAWEI TECHNOLOGIES CO., LTD., Guangdong (CN)

(72) Inventors: Xiupeng Li, Wuhan (CN); Shangjun Peng, Wuhan (CN); Yuanyuan Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 18/176,424

(22) Filed: Feb. 28, 2023

(65) Prior Publication Data
US 2023/0280542 A1  Sep. 7, 2023

Related U.S. Application Data

(63) Continuation of application No. PCT/CN2021/082462, filed on Mar. 23, 2021.

(30) Foreign Application Priority Data

Aug. 31, 2020 (CN) .......................... 202010901757.3

(51) Int. Cl.
*G02B 6/38* (2006.01)
(52) U.S. Cl.
CPC ........... *G02B 6/3825* (2013.01); *G02B 6/387* (2013.01); *G02B 6/3881* (2013.01); *G02B 6/3849* (2013.01)

(58) Field of Classification Search
CPC .......................... G02B 6/3825; G02B 6/3849
See application file for complete search history.

(56) References Cited

U.S. PATENT DOCUMENTS

| | | | |
|---|---|---|---|
| 5,537,501 A | 7/1996 | Iwano et al. | |
| 5,953,473 A * | 9/1999 | Shimotsu | G02B 6/3825 385/56 |
| 7,785,018 B2 * | 8/2010 | Jones | G02B 6/3849 385/94 |

(Continued)

FOREIGN PATENT DOCUMENTS

| | | |
|---|---|---|
| CN | 105339822 B | 10/2017 |
| CN | 108254835 A | 7/2018 |

(Continued)

*Primary Examiner* — Rhonda S Peace

(57) ABSTRACT

An optical fiber adapter is provided, including an adapter body provided with a first slot, the first slot being used for connecting to an optical fiber connector in insertion fashion; a first locking structure, the first locking structure being provided on the adapter body and being used for engaging with a second locking structure of an optical fiber connector plug to fix the optical fiber adapter and the optical fiber connector plug; and a press member, the press member being connected to the adapter body, and the press member being capable of sliding with respect to the adapter body to drive the first locking structure and the second locking structure to be unlocked. Also provided are an optical fiber connector plug, a connector assembly comprising the optical fiber adapter and the optical fiber connector plug, and a communications device comprising the optical fiber adapter.

18 Claims, 18 Drawing Sheets

(56) References Cited

U.S. PATENT DOCUMENTS

| | | | |
|---|---|---|---|
| 8,224,146 B2* | 7/2012 | Hackett | G02B 6/3825 |
| | | | 385/139 |
| 11,347,006 B2* | 5/2022 | Kadar-Kallen | G02B 6/3809 |
| 11,971,583 B2* | 4/2024 | Nguyen | G02B 6/3882 |
| 2008/0175542 A1 | 7/2008 | Lu et al. | |
| 2009/0046981 A1 | 2/2009 | Margolin et al. | |
| 2011/0194828 A1 | 8/2011 | Hackett | |
| 2023/0280542 A1* | 9/2023 | Li | G02B 6/387 |
| | | | 385/78 |

FOREIGN PATENT DOCUMENTS

| | | |
|---|---|---|
| CN | 110998397 A | 4/2020 |
| CN | 112051644 A | 12/2020 |
| JP | 2010152084 A | 7/2010 |
| JP | 2011007839 A | 1/2011 |

\* cited by examiner

OPTICAL FIBER ADAPTER, OPTICAL FIBER CONNECTOR PLUG, CONNECTOR ASSEMBLY, AND COMMUNICATION DEVICE

CROSS-REFERENCE TO RELATED APPLICATIONS

This application is a continuation of International Application No. PCT/CN2021/082462, filed on Mar. 23, 2021, which claims priority to Chinese Patent Application No. 202010901757.3, filed on Aug. 31, 2020. The disclosures of the aforementioned applications are hereby incorporated by reference in their entireties.

TECHNICAL FIELD

This application relates to the field of optical communication technologies, and in particular, to an optical fiber adapter, an optical fiber connector plug, a connector assembly, and a communication device.

BACKGROUND

With the development of communication technologies, optical fiber transmission is gradually widely applied in an access network represented by fiber to the home (FTTH) due to its unique and excellent characteristics such as high bandwidth and low electromagnetic interference. During construction of a fiber to the home network, a distribution optical cable communicated with a central office (CO) can be connected, in a fiber division box, to a drop optical cable communicated with a user terminal device, to transmit an optical signal.

Considering that the drop optical cable not only needs to be reliably connected to the distribution optical cable and the user terminal device, but also needs to adapt to a complex and changeable outdoor environment, an optical fiber pre-connection product is gradually applied in a fiber to the home system. The optical fiber pre-connection product means that termination of a drop optical cable is performed in a factory. Optical fiber connector plugs are prepared at both ends of the drop optical cable, and an optical performance test, a mechanical performance test, an environmental performance test, and the like are performed. An optical fiber adapter matching an optical fiber connector plug is also prepared on a device to be connected to the drop optical cable.

Currently, in a manner of locking the optical fiber adapter and the optical fiber connector plug, relatively large operation space is required. Therefore, it is difficult to perform an operation in some scenarios in which space is limited.

SUMMARY

Embodiments of this application provide an optical fiber adapter, an optical fiber connector plug, a connector assembly, and a communication device, to well adapt to setting of a scenario in which space is limited and achieve strong practicability and a wide application range.

According to a first aspect, this application provides an optical fiber adapter. The optical fiber adapter includes:
an adapter body, where the adapter body is provided with a first slot, and the first slot is configured to plug an optical fiber connector plug;
a first locking structure, where the first locking structure is disposed on the adapter body and is configured to cooperate with a second locking structure of the optical fiber connector plug to secure the optical fiber adapter to the optical fiber connector plug; and
a pressing member, where the pressing member is connected to the adapter body, and the pressing member can slide relative to the adapter body and is configured to drive the first locking structure to be unlocked from the second locking structure.

The first locking structure is disposed, so that the first locking structure can be in direct contact with the second locking structure of the optical fiber connector plug, to cooperate with each other to secure the optical fiber connector plug to the optical fiber adapter, thereby implementing locking of the optical fiber connector plug and the optical fiber adapter. In addition, the pressing member is disposed, so that the pressing member can drive, based on a pressing force, the first locking structure to be unlocked from the second locking structure of the optical fiber connector plug, thereby implementing unlocking of the optical fiber connector plug from the optical fiber adapter.

Therefore, for the optical fiber connector plug and the optical fiber adapter, a straight-plugging and pressing type locking manner is used. Compared with a conventional rotation type locking manner in which relatively large operation space is required, operation space required for assembly and disassembly of the optical fiber connector plug and the optical fiber adapter can be greatly reduced, to well adapt to setting of a scenario in which space is limited and achieve strong practicability and a wide application range. In addition, during locking and disassembly, a worker only needs to perform straight plugging and pressing operations, the operations are simple and time-saving, and there is no need to rotate a plurality of turns like the conventional rotation type locking manner. In this way, problems of poor locking effect consistency and easy loosening after long-time vibration that are caused by uneven manual tightening forces of workers can be effectively avoided, and strong connection reliability is achieved.

In an embodiment, the adapter body is provided with a mounting groove, and the mounting groove penetrates through an inner surface and an outer surface of the adapter body and is in communication with the first slot; and
the mounting groove includes a first groove wall and a second groove wall that are disposed opposite to each other in an axial direction of the adapter body, the first groove wall is disposed close to a plug interface of the first slot relative to the second groove wall, and the first locking structure has elasticity and is elastically connected to the first groove wall.

It may be understood that, because the first locking structure is an elastic structure having elasticity, the first locking structure can be elastically connected to the first groove wall, to be locked with or unlocked from the second locking structure through elastic deformation. For example, there may be two first locking structures, and the two first locking structures are symmetrically disposed. Therefore, tight locking forces can be distributed more evenly, and the optical fiber connector plug can be prevented from being detached from the optical fiber adapter. In addition, the first locking structure may alternatively be integrated with the adapter body. The integration design can reduce process steps and ensure overall strength of the optical fiber adapter.

Alternatively, the first locking structure passes through the mounting groove, and the first locking structure can move relative to the mounting groove in a radial direction of the adapter body.

In an embodiment, the first locking structure includes a first part and a second part, where the first part is elastically connected to the first groove wall and extends in the axial direction of the adapter body, the second part is bent and connected to one end of the first part away from the first groove wall, the second part extends toward an interior of the first slot and forms an included angle with the first part, and at least a part of the second part is located inside the first slot; and a surface of the second part facing the second groove wall is a first matching surface, and the first matching surface is configured to abut against a second matching surface of the second locking structure.

The first part is connected to the first groove wall and extends in the axial direction, the second part is bent and connected to one end of the first part away from the first groove wall, and the second part extends toward an interior of the first slot and forms an included angle with the first part. In other words, the second part extends in a direction inclined with respect to the axial direction. For example, the first part and the second part are arranged at an obtuse angle, so that the first locking structure presents a shape like a Chinese character "chang". The arrangement of the shape helps the pressing member to subsequently drive the first locking structure to be elastically deformed, thereby facilitating labor saving.

In addition, at least a part of the second part is located inside the first slot. In this case, when the optical fiber connector plug extends into the optical fiber adapter, the part of the second part can be more conveniently in contact with the second locking structure of the optical fiber connector plug, thereby locking the optical fiber adapter and the optical fiber connector plug. In addition, when the pressing member is driven to slide, the pressing member can apply a force to the first locking structure to separate the first locking structure from the second locking structure, thereby unlocking the optical fiber adapter from the optical fiber connector plug.

In an embodiment, the first locking structure includes a moving part and a contact part, and the contact part is bent and connected to one end of the moving part;

the moving part passes through the mounting groove and can move relative to the mounting groove in the radial direction of the adapter body, and the contact part is configured to abut against the pressing member; and a surface of the moving part facing a ferrule sleeve is a first matching surface, and the first matching surface is configured to abut against a second matching surface of the second locking structure.

It may be understood that, the moving part is a part that is of the first locking structure and that passes through the mounting groove, the moving part extends in the radial direction, and the moving part can slide relative to the mounting groove in the radial direction, to abut against or be detached from the second locking structure of the optical fiber connector plug. The contact part is a part that is of the first locking structure, that is located outside the adapter body, and that can abut against a sliding assembly and the pressing member; and the contact part extends in the axial direction. Therefore, the first locking structure may roughly present an inverted "L" shape. For example, the first locking structure may be a locking tongue that passes through the mounting groove and that can slide relative to the mounting groove in the axial direction.

In an embodiment, the first matching surface is inclined with respect to the axial direction of the adapter body, or the first matching surface is perpendicular to the axial direction of the adapter body.

Therefore, an arrangement form of the first matching surface may be selected based on a design of the first locking structure, thereby achieving strong flexibility and a wide application range.

In an embodiment, the pressing member is sleeved and slidably connected to the inner surface of the adapter body; and the pressing member includes a pressing part and a sliding part, the sliding part is connected to one end of the pressing part, the pressing part is located outside the adapter body, and the sliding part can slide relative to the first slot to press against the second locking structure to drive the second locking structure to be opened.

It may be understood that, the pressing part is a part that is located outside the adapter body and that can be used by a worker to apply a force. When the worker applies a force to this part, the pressing member can be subject to a force, so that the entire pressing member slides in the first slot. The sliding part is a part that is located inside the adapter body and that can slide relative to the first slot in the first slot. Under driving of a pressing force applied to the pressing part, this part can be driven to move in the first slot in a direction toward accommodating space to press against the first locking structure to make the first locking structure elastically deformed to be opened outward, to be detached from the second locking structure to be unlocked from the second locking structure.

In an embodiment, the adapter body is provided with a first stop structure, the sliding part is provided with a second stop structure, and the first stop structure cooperates with the second stop structure, to prevent the pressing member from being removed from the adapter body from one end that is of the adapter body and at which the plug interface of the first slot is disposed.

Therefore, the pressing member can be stopped on the adapter body to prevent the pressing member from being detached from the adapter body, thereby improving connection reliability between the pressing member and the adapter body. For example, the first stop structure is a clamping hole and may be configured to be clamped with the second stop structure.

In an embodiment, the optical fiber adapter further includes a sliding assembly, the sliding assembly is slidably connected to the outer surface of the adapter body, and the sliding assembly is configured to: when the sliding assembly does not slide relative to the adapter body, prevent the first locking structure from being unlocked from the second locking structure.

Therefore, when the sliding assembly does not slide relative to the adapter body, the sliding assembly can always abut against the first locking structure, so that a possibility that the first locking structure is detached from the second locking structure can be effectively reduced to a minimum by tightly pressing the first locking structure by using the sliding assembly, thereby achieving strong reliability.

In an embodiment, the sliding assembly includes a sliding sleeve and an elastic component, the sliding sleeve is sleeved at a periphery of the adapter body and abuts against the pressing member, the sliding sleeve is configured to slide relative to the adapter body in a direction away from the pressing member under an action of a thrust force of the pressing member, the sliding sleeve and the adapter body together form accommodating space for accommodating the elastic component, and the elastic component is accommodated in the accommodating space and elastically abuts against the sliding sleeve and the adapter body.

Therefore, reliability of the first locking structure can be further ensured.

In an embodiment, an inner surface of the sliding sleeve is provided with a contact region and a depression region connected to the contact region, the depression region is located at one end of the sliding sleeve facing the pressing member, the contact region is configured to tightly press the second locking structure when the sliding sleeve does not slide relative to the adapter body, and the depression region is configured to: when the sliding sleeve slides relative to the adapter body in the direction away from the pressing member, provide space for generating elastic deformation for the second locking structure.

It may be understood that, in a state in which the sliding sleeve does not slide relative to the adapter body, the contact region tightly presses the first locking structure, and the depression region is misaligned with the first locking structure, to prevent the first locking structure from being subject to a force to bounce off. The state in which the sliding sleeve does not slide relative to the adapter body may be a state in which the optical fiber connector plug is not plugged into the optical fiber adapter or may be a state in which the optical fiber connector plug and the optical fiber adapter have been assembled in place. In a state in which the sliding sleeve slides relative to the adapter body, the contact region is misaligned with the first locking structure, and the depression region moves above the first locking structure and can provide space for generating elastic deformation for the first locking structure, to make the first locking structure detached from the second locking structure. For example, that the sliding sleeve slides relative to the adapter body may be that the sliding sleeve slides relative to the adapter body in the direction away from the pressing member.

In an embodiment, an elastic structure is disposed on an inner surface of the pressing member, a stop block is disposed on the optical fiber connector plug, and the elastic structure is configured to: under driving of the stop block, make the pressing member slide in a direction close to the adapter body, to drive the sliding sleeve to slide relative to the adapter body.

Therefore, when the optical fiber connector plug is plugged into the optical fiber adapter, the stop block of the optical fiber connector plug is first in contact with the elastic structure, to drive the elastic structure to drive the entire pressing member to slide a distance in a direction of the adapter body. In addition, because the pressing member abuts against the sliding sleeve, when the pressing member is driven to move, a thrust force can be applied to the sliding sleeve to push the sliding sleeve to slide relative to the adapter body in the direction away from the pressing member.

In an embodiment, both the sliding assembly and the pressing member are sleeved and slidably connected to the outer surface of the adapter body, the sliding assembly and the pressing member are located on both sides of the first locking structure in the axial direction of the adapter body and both abut against the first locking structure, one end of the pressing member protrudes relative to the adapter body, and the pressing member is configured to drive the second locking structure to move in the radial direction of the adapter body to be detached from the first locking structure.

Therefore, an unlocking operation is simple and feasible, and unplugging and plugging operations of the optical fiber connector plug in relatively small space can be implemented.

In an embodiment, a baffle plate is disposed on the outer surface of the adapter body, the sliding assembly includes an elastic component and a sliding sleeve, the elastic component is sleeved on the outer surface of the adapter body, and the sliding sleeve is sleeved on the outer surface of the adapter body and a periphery of the elastic component, and accommodates at least a part of the elastic component; and the elastic component elastically abuts against the baffle plate and the sliding sleeve, and the sliding sleeve can slide toward or away from the baffle plate.

In an embodiment, a surface of the contact part facing the pressing member is a first contact surface, the first contact surface is inclined with respect to the axial direction of the adapter body, and the first contact surface is configured to form inclined surface matching with a surface of the pressing member; and/or a surface of the contact part facing the sliding sleeve is a second contact surface, the second contact surface is inclined with respect to the axial direction of the adapter body, and the second contact surface is configured to form inclined surface matching with a surface of the sliding sleeve.

It may be understood that, inclined surface matching is configured, so that quick alignment can be implemented between the first locking structure and the pressing member and between the first locking structure and the sliding assembly. This not only reduces interconnection difficulty, but also increases contact areas between the first locking structure and the pressing member and between the first locking structure and the sliding assembly, thereby further improving interconnection tightness. For example, the first contact surface and the second contact surface may both be planes, may both be arc surfaces, or may be a combination of a plane and an arc surface.

In an embodiment, a guide key is disposed on an inner wall of the first slot, the guide key extends in the axial direction of the adapter body, and the guide key is configured to cooperate with a guide structure of the optical fiber connector plug, to prevent the optical fiber connector plug from rotating relative to the optical fiber adapter.

In an embodiment, the optical fiber adapter further includes a ferrule sleeve, the ferrule sleeve is secured to an interior of the adapter body and is in communication with the first slot, and the ferrule sleeve is configured to accommodate a ferrule of the optical fiber connector plug.

According to a second aspect, this application provides an optical fiber connector plug, where the optical fiber connector plug includes a housing and a ferrule assembly accommodated in the housing, and the ferrule assembly includes a ferrule;

the housing includes a main shaft, the main shaft includes a shaft body and a second locking structure, a through-hole extending in an axial direction of the shaft body is disposed inside the shaft body, the through-hole is configured to allow an optical fiber to pass through, and the ferrule is configured to be connected to a fiber core of the optical fiber; and the second locking structure is located on an outer surface of the shaft body, and the second locking structure is configured to cooperate with a first locking structure of the optical fiber adapter described above, to secure the optical fiber connector plug to the optical fiber adapter, and is further configured to be unlocked from the first locking structure under driving of a pressing member of the optical fiber adapter, so that the optical fiber connector plug is detached from the optical fiber adapter.

It may be understood that, the second locking structure is disposed on the outer surface of the shaft body, so that the second locking structure can be in direct contact with the first locking structure of the optical fiber adapter, to cooperate with each other to secure the optical fiber connector plug to the optical fiber adapter. Therefore, the outer surface of the shaft body can directly form an outer surface of the optical fiber connector plug. Compared with a case in which a conventional optical fiber connector plug has a relatively large outer diameter because a handle sleeve is sleeved outside a main shaft of the optical fiber connector plug, an outer diameter of the optical fiber connector plug can be reduced correspondingly. Correspondingly, an outer diameter of the optical fiber adapter that matches the optical fiber connector plug is further reduced. In other words, based on this arrangement, a size of space occupied by the optical fiber connector plug and the optical fiber adapter can be effectively reduced. In this case, compared with a conventional design, more jacks for plugging and securing optical fiber adapters can be arranged in limited space of a communication device to which the optical fiber adapter is applied. In other words, more optical fiber adapters that function as optical fiber connection ports can be arranged, so that a quantity of optical fiber connection ports is further increased in an insufficient space layout of the communication device, and requirements of high performance and miniaturization of the communication device can also be satisfied, thereby achieving strong practicability and a wide application range.

In an embodiment, the second locking structure is an annular boss disposed around the outer surface of the shaft body in a circumferential direction of the shaft body; or the second locking structure is an arc-shaped boss disposed on the outer surface of the shaft body in a circumferential direction of the shaft body.

Therefore, when the second locking structure is the arc-shaped boss disposed on the outer surface of the shaft body in the circumferential direction of the shaft body, the arc-shaped boss is partially disposed around the outer surface of the shaft body. For example, there are two second locking structures, and the two second locking structures are symmetrically arranged. The symmetrical arrangement form leads to good force uniformity and good balance.

The two second locking structures may be symmetrically located at two circular arc bends of an oval, so that each second locking structure may present a shape of an arc-shaped boss. In this case, a central angle corresponding to each arc-shaped boss is less than 180°. Alternatively, the two second locking structures may be symmetrically located at two straights of an oval, so that each second locking structure may present a shape of an ellipsoidal arc-shaped boss.

Based on this, the second locking structure is disposed as an arc-shaped boss, so that the second locking structure can fit a cylindrical shape of the outer surface of the shaft body. In this way, it is relatively simple to perform processing, and the second locking structure that can cooperate with the first locking structure of the optical fiber adapter can be formed without consuming more materials. This can effectively reduce material costs and improve production efficiency.

In an embodiment, a protrusion is disposed on a surface of the second locking structure facing away from the ferrule, the protrusion includes a second matching surface, the second matching surface is connected to the surface of the second locking structure facing away from the ferrule and an included angle is formed between the second matching surface and the surface of the second locking structure facing away from the ferrule, and the second matching surface is configured to abut against a first matching surface of the second locking structure.

It may be understood that, a surface of the second locking structure facing away from an outer frame sleeve is disposed perpendicular to the axial direction, and an included angle is formed between the second matching surface and the surface of the second locking structure facing away from the outer frame sleeve. In other words, the second matching surface is inclined with respect to the axial direction. In other words, the second matching surface is an inclined surface that is inclined with respect to the surface of the second locking structure facing away from the outer frame sleeve. Correspondingly, a first matching surface of the first locking structure of the optical fiber adapter is also an inclined surface disposed obliquely. Therefore, matching between the second matching surface and the first matching surface is inclined surface matching. Inclined surface matching is configured, so that quick alignment can be implemented between the second locking structure and the first locking structure. This not only reduces difficulty of interconnection between the second locking structure and the first locking structure, but also increases a contact area between the second locking structure and the first locking structure, thereby further improving interconnection tightness.

In an embodiment, a surface of the second locking structure facing away from the ferrule is a second matching surface, the second matching surface is perpendicular to the axial direction of the shaft body, and the second matching surface is configured to abut against a first matching surface of the first locking structure.

Therefore, whether the second matching surface is an inclined surface or a non-inclined surface may be selected based on an actual situation, thereby achieving strong flexibility and a wide application range.

In an embodiment, the housing further includes an outer frame sleeve. The outer frame sleeve is sleeved at a periphery of the ferrule and is secured to one end of the main shaft facing the ferrule, and an end face of the outer frame sleeve facing the main shaft is connected to an end face of the main shaft, so that an outer surface of the outer frame sleeve and an outer surface of the main shaft are spliced to form the outer surface of the optical fiber connector plug. The outer surface of the main shaft is the outer surface of the shaft body.

Therefore, the outer surface of the outer frame sleeve and the outer surface of the main shaft are spliced to form the outer surface of the optical fiber connector plug. It may be understood that, a case in which the outer surface of the outer frame sleeve and the outer surface of the main shaft are spliced may include a case in which the outer surface of the outer frame sleeve is connected to the outer surface of the main shaft with no gap therebetween, or may include a case in which the outer surface of the outer frame sleeve and the outer surface of the main shaft are close to each other with a small gap therebetween. When the outer surface of the outer frame sleeve is connected to the outer surface of the main shaft with no gap therebetween, an end face of the outer frame sleeve facing the main shaft is connected to the end face of the main shaft, so that the outer surface of the outer frame sleeve is connected to the outer surface of the main shaft with no gap, thereby achieving good reliability and strong aesthetics.

In an embodiment, the housing is provided with a guide structure, where the guide structure extends in an axial direction of the housing and is configured to cooperate with a guide key of the optical fiber adapter.

Therefore, the guide structure can play a guiding function in a process of plugging the optical fiber connector plug into the optical fiber adapter, to guide the optical fiber connector plug to be smoothly plugged into the optical fiber adapter. For example, the guide structure may extend from a front end face of a front frame sleeve to a rear end face of the front frame sleeve.

In an embodiment, one end of the outer frame sleeve away from the main shaft is a front end of the outer frame sleeve, and one end of the ferrule away from a ferrule base is a front end of the ferrule; and the front end of the ferrule is retracted inside the front end of the outer frame sleeve.

Therefore, the front end of the outer frame sleeve protrudes relative to a front end of the ferrule assembly, in other words, a front end face of the outer frame sleeve protrudes relative to a front end face of the ferrule assembly in an axial direction; and the front end face of the ferrule assembly is surrounded by an inner surface of the outer frame sleeve. Based on this, the outer frame sleeve can protect the front end face of the ferrule assembly in processes of turnover, transportation, and plugging and unplugging of the optical fiber adapter, so that the ferrule assembly can be protected by the outer frame sleeve from suffering bumping, crashing, and dust interference, and can keep its own cleanness and safety. In this way, when the ferrule assembly is subsequently plugged into a ferrule assembly of an opposite connector plug, stable and reliable transmission of an optical signal between the two ferrule assemblies is ensured.

Alternatively, an end face of the front end of the ferrule is flush with the end face of the front end of the outer frame sleeve.

In an embodiment, the guide structure is a groove structure formed after an outer surface of the housing is recessed inward, and the groove structure does not penetrate through an inner surface of the housing.

Therefore, the guide structure can be embedded with the guide key of the optical fiber adapter, and has a bearing capacity to support a corresponding structure of the optical fiber adapter. In addition, the guide structure can guide the guide key of the optical fiber adapter to be plugged into the guide structure, to prevent the housing from rotating, thereby preventing the optical fiber connector plug from rotating relative to the optical fiber adapter.

Alternatively, the groove structure penetrates through the inner surface and the outer surface of the housing.

In an embodiment, the guide structure includes a first guide structure and a second guide structure, the first guide structure is located on the outer frame sleeve, the second guide structure is located on the main shaft, and the first guide structure and the second guide structure are connected to each other to together cooperate with the guide key of the optical fiber adapter.

Therefore, the rotation of the optical fiber connector plug in the optical fiber adapter can be limited.

In an embodiment, one end of the first guide structure facing away from the second guide structure and/or one end of the second guide structure facing the first guide structure form/forms a chamfer, and the chamfer is configured to provide a guiding function for the guide key of the optical fiber adapter.

Outer ends/an outer end of the first guide structure and/or the second guide structure can form a shape of a trumpet-shaped flaring by using the chamfer. An outer end of the first guide structure is an end of the first guide structure close to the front end face of the outer frame sleeve. Therefore, the chamfer is disposed, so that a fault-tolerant space can be provided for the first guide structure. Even if the corresponding structure of the optical fiber adapter is not aligned with a center of the first guide structure, the corresponding structure can slide into the first guide structure by using the guiding function of the chamfer. When a worker plugs the optical fiber connector plug into the optical fiber adapter, the first guide structure can also be aligned with the corresponding structure of the optical fiber adapter by using the guiding function of the chamfer. This can further improve plugging efficiency and increase a plugging success rate, and can more effectively protect the optical fiber connector plug from being damaged.

For example, the chamfer may be a right-angled chamfer. Structure processing of the right-angled chamfer is simpler and more convenient, and an outer end opening of the trumpet-shaped flaring may be set to be relatively large, thereby further widening a guiding range. For example, an angle range of a tilt angle of a single-sided chamfer may be 0°-90°. For example, the tilt angle of the single-sided chamfer may be set to 10°, 15°, or 30°. Angle selection of the tilt angle may be adjusted based on an actual requirement. This is not strictly limited in this embodiment.

Alternatively, the chamfer may be a fillet, and the fillet has no edge, and a surface thereof is smoother. This can effectively prevent wear on the corresponding structure of the optical fiber adapter, thereby achieving strong safety.

In an embodiment, the optical fiber connector plug further includes a fixing sleeve, where the fixing sleeve is located between the outer frame sleeve and the ferrule assembly and accommodates a part of the ferrule assembly;

the ferrule assembly further includes a ferrule base, where the ferrule is secured at one end of the ferrule base; and one end of the fixing sleeve is secured to the outer frame sleeve, and the other end of the fixing sleeve is secured to the ferrule base.

Therefore, the fixing sleeve can accommodate the ferrule and a part of the ferrule base, thereby further ensuring stability and reliability of the ferrule assembly during installation. In addition, the fixing sleeve can be fixedly connected to the ferrule assembly and can also be fixedly connected to the outer frame sleeve, so that the outer frame sleeve and the ferrule assembly can be relatively fixed through connection of the fixing sleeve. This effectively prevents the ferrule assembly from rotating in a circumferential direction and moving in an axial direction in the outer frame sleeve. Therefore, the arrangement of the fixing sleeve can adapt to a requirement of diversified scenarios, thereby achieving strong practicability and a wide application range.

In an embodiment, the ferrule assembly further includes an elastic component, a gap is formed between the ferrule and the ferrule base, the elastic component is located in the gap, and one end of the elastic component abuts against the ferrule and the other end of the elastic component abuts against the ferrule base.

Therefore, the elastic component elastically abuts between the ferrule and the ferrule base, so that under an action of an elastic force of the elastic component, the ferrule and the ferrule base can be kept tensioned, and the ferrule and the ferrule base are not easy to loosen even if they are subject to long-time vibration. This helps to enhance long-term reliability of the ferrule assembly.

In an embodiment, a clamping hole or a clamping groove is disposed in the inner surface of the outer frame sleeve, a clamping hook is disposed on an outer surface of the fixing sleeve, and the clamping hook cooperates with the clamping hole or the clamping groove, to fixedly connect the fixing sleeve to the outer frame sleeve. In this way, movement of the ferrule assembly in the axial direction and rotation of the ferrule assembly in the circumferential rotation can be limited by using a connection relationship between the fixing sleeve and the ferrule assembly, thereby ensuring connection stability and reliability of the ferrule assembly. For example, there are two clamping hooks, the two clamping hooks are symmetrically disposed, and each clamping hook is clamped with one clamping hole (or one clamping groove) of the outer frame sleeve in a cooperation manner.

In an embodiment, an end face of the fixing sleeve facing the main shaft and the end face of the outer frame sleeve facing the main shaft are coplanar and together form an abutment surface, and the abutment surface is connected to the end face of the main shaft.

Therefore, the fixing sleeve can be precisely connected to the main shaft, to ensure that the fixing sleeve fits the main shaft and improve tightness of the connection to the main shaft.

In an embodiment, one end of the main shaft away from the ferrule assembly is a tail end of the main shaft, the optical fiber connector plug further includes an optical fiber and an optical fiber fixing component sleeved on the optical fiber, and the optical fiber fixing component is secured to the tail end of the main shaft, to plug the optical fiber into the through-hole.

It may be understood that, considering that the optical fiber needs to be tightly connected to the main shaft to ensure that there is no loose, and that a head end of the main shaft has been secured to the front frame sleeve, the optical fiber fixing component is secured to the tail end of the main shaft to further ensure retention stability and reliability of the optical fiber and the main shaft, to improve structure layout appropriateness of the optical fiber connector plug.

In an embodiment, a glue filling hole that penetrates through the outer surface and an inner surface of the main shaft and that is in communication with the through-hole is disposed at the tail end of the main shaft, and the glue filling hole is used for glue injection to secure the main shaft to the optical fiber.

Therefore, connection reliability and stability between the main shaft and the optical fiber can be further ensured.

In an embodiment, the optical fiber fixing component includes a fixing base, a heat shrink tubing, and a tail sleeve, the fixing base is sleeved and secured to the tail end of the main shaft, and the heat shrink tubing is sleeved and overlaps the tail end of the main shaft and the optical fiber, the heat shrink tubing seals the glue filling hole, the tail sleeve is sleeved at a periphery of the heat shrink tubing, and one end of the tail sleeve is secured to the fixing base.

Therefore, the optical fiber fixing component can effectively ensure the connection stability and reliability between the optical fiber and the main shaft.

In an embodiment, the optical fiber includes a fiber core, a cladding layer wrapped around the fiber core, and an outer layer wrapped around the cladding layer, a part of the fiber core extends out of the cladding layer to be connected to the ferrule, a part of the outer layer forms a reinforcing section with a plurality of slits, and the plurality of slits are used for allowing glue injected through the glue filling hole to flow, so that the glue secures the reinforcing section to the main shaft.

It may be understood that, a part of the fiber core extends out of the cladding layer for connection to the ferrule. A part of the outer layer forms the reinforcing section with the plurality of slits, and the reinforcing section with the plurality of slits presents a fence shape and is disposed around the cladding layer. The plurality of slits are used for allowing the glue injected through the glue filling hole to flow, so that the glue secures the reinforcing section to the inner surface of the main shaft, thereby securing the optical fiber to the main shaft and improving tensile strength of the optical fiber connector plug. For example, the reinforcing section may be made of aramid, steel wire, or fiber reinforced polymer/plastic (FRP).

In an embodiment, the optical fiber connector plug further includes a dust-proof cap, and the dust-proof cap is sleeved outside the ferrule and detachably connected to the main shaft.

It may be understood that, a structure in which a detachable connection is configured is simple, so that the dust-proof cap can be quickly disassembled and installed from the main shaft without using a special-purpose tool, thereby effectively improving efficiency of connecting the dust-proof cap to the main shaft.

Therefore, when the optical fiber connector plug is not connected to the optical fiber adapter, that is, when the optical fiber connector plug is in turnover, transportation, or another case, the dust-proof cap may be connected to the main shaft, so that the dust-proof cap can close and cover a joint part between the optical fiber connector plug and the optical fiber adapter, to protect the outer frame sleeve and the main shaft. This can prevent entry of external foreign matters, moisture, dust, and the like into the optical fiber connector plug from causing damage to an optical fiber connector, so that the joint part between the optical fiber connector plug and the optical fiber adapter is kept clean, thereby reaching an IP68 protection level. When the optical fiber connector plug needs to be connected to the optical fiber adapter, the dust-proof cap may be disassembled from the main shaft.

In an embodiment, the optical fiber connector plug further includes a sealing ring, the sealing ring is sleeved on the main shaft, and the sealing ring is configured to seal the dust-proof cap, and/or the sealing ring is configured to seal the optical fiber adapter.

Therefore, when the dust-proof cap is connected to the main shaft, the sealing ring may be sandwiched between the dust-proof cap and the main shaft to seal the dust-proof cap, so that there is good sealing between the dust-proof cap and the main shaft. In addition, when the optical fiber connector plug is connected to the optical fiber adapter, the sealing ring may be sandwiched between the optical fiber connector plug and the optical fiber adapter to seal the optical fiber adapter, so that there is good sealing between the optical fiber connector plug and the optical fiber adapter. Therefore, the sealing ring can have dual functions of sealing the dust-proof cap and the optical fiber adapter, thereby achieving strong practicability and a wide application range.

According to a third aspect, this application provides a connector assembly. The connector assembly includes the optical fiber connector plug described above and the optical fiber adapter described above, and the optical fiber connector plug is plugged into the optical fiber adapter.

According to a fourth aspect, this application provides a communication device. The communication device includes a housing and the optical fiber adapter described above, the housing is provided with a jack, and the optical fiber adapter is disposed at a position of the jack, to be connected to the housing.

In an embodiment, there are a plurality of jacks, the plurality of jacks are arranged in a row, a quantity of optical fiber adapters is the same as a quantity of the jacks, there are also a plurality of optical fiber adapters, and the optical fiber adapters are respectively disposed at positions of the plurality of jacks.

In an embodiment, there are a plurality of jacks, the plurality of jacks are arranged on the housing in at least two rows, a quantity of optical fiber adapters is the same as a quantity of the jacks, there are also a plurality of optical fiber adapters, and the optical fiber adapters are respectively disposed at positions of the plurality of jacks.

In an embodiment, the communication device further includes the optical fiber connector plug described above, and the optical fiber connector plug is configured to be plugged into the optical fiber adapter.

DESCRIPTION OF EMBODIMENTS

The following clearly describes implementations of this application with reference to the accompanying drawings.

An embodiment of this application provides a communication device. The communication device may be applied to an FFTx system. The FFTx system may be but is not limited to an FFTH (fiber to the home) system, an FFTC (fiber to the curb) system, an FTTP (fiber to the premises) system, an FTTN (fiber to the node or neighborhood) system, an FTTO (fiber to the office) system, and an FTTSA (fiber to the service area) system.

Figure 1:
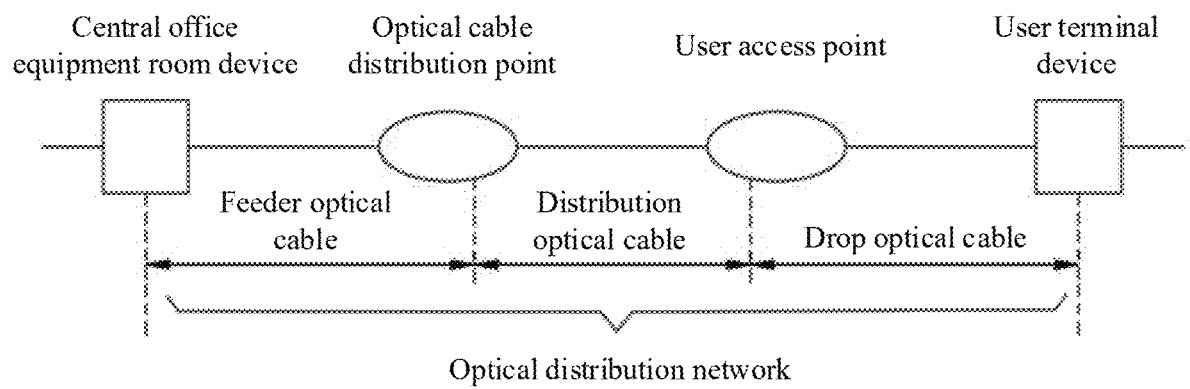
FIG. 1 is a diagram of a connection relationship between an optical distribution network and a central office equipment room device and a user terminal device.

In this embodiment of this application, an example in which the communication device is applied to a fiber to the home (FTTH) system is used for description. Refer to FIG. 1. The fiber to the home system includes a central office equipment room device (OLT), a user terminal device (ONT), and an optical distribution network (ODN).

As an important part of the fiber to the home system, the optical distribution network is a physical channel for optical transmission between the central office equipment room device and the user terminal device. The optical distribution network may include an optical fiber cable, an optical connector, an optical splitter, and an optical fiber distribution device for installing and connecting these components. The optical distribution network includes a feeder optical cable, an optical cable distribution point, a distribution optical cable, a user access point, and a drop optical cable. As a trunk optical cable of the optical distribution network, the feeder optical cable is connected between the central office equipment room device and an optical cable distribution point to implement long-distance coverage of an optical signal. The distribution optical cable is connected between the optical cable distribution point and the user access point, so that an optical fiber can be distributed nearby in a user region of the feeder optical cable along a road. The drop optical cable is connected between the user access point and the user terminal device, to implement fiber to the home.

It may be understood that the drop optical cable is connected between a node device of the user access point and the user terminal device to implement connection to the distribution optical cable and implement fiber to the home. In an actual situation, for consideration of costs, an outdoor pre-connection solution in which an outdoor optical fiber adapter is pre-configured on the node device of the user access point and an outdoor optical fiber connector plug is pre-configured at an end of the drop optical cable is gradually applied to the fiber to the home system. Therefore, only the optical fiber connector plug of the drop optical cable needs to be plugged into the optical fiber adapter on the node device of the user access point to together form a plug-and-play optical fiber pre-connection product.

Based on this, the optical fiber pre-connection product can conveniently and quickly complete laying of the drop optical cable, without opening a box body of the node device of the user access point and without performing fusion splicing on the drop optical cable by using a fusion splicer that consumes a relatively long time. In this way, reliable connection between the drop optical cable and the distribution optical cable and between the drop optical cable and the user terminal device can be implemented, an operation is simple, and construction difficulty is relatively low. In addition, the optical fiber pre-connection product can adapt to a complex and changeable outdoor environment, to eliminate, to a maximum extent, damage or safety influence caused by various uncertain factors on an optical fiber link during design, construction, and use of an optical fiber network. This fully ensures safety of the fiber to the home system and reduces time and material costs required for on-site construction.

In this embodiment of this application, the communication device has use performance of the optical fiber pre-connection product, is easy to operate, consumes a relatively short time, and can implement plug-and-play in an outdoor application scenario. The following provides detailed descriptions by using an example in which a communication device is a node device of a user access point in an optical distribution network. The communication device may be but is not limited to an ODN device such as a fiber access terminal (FAT) or a splitting and splicing closure (SSC).

Figure 2:
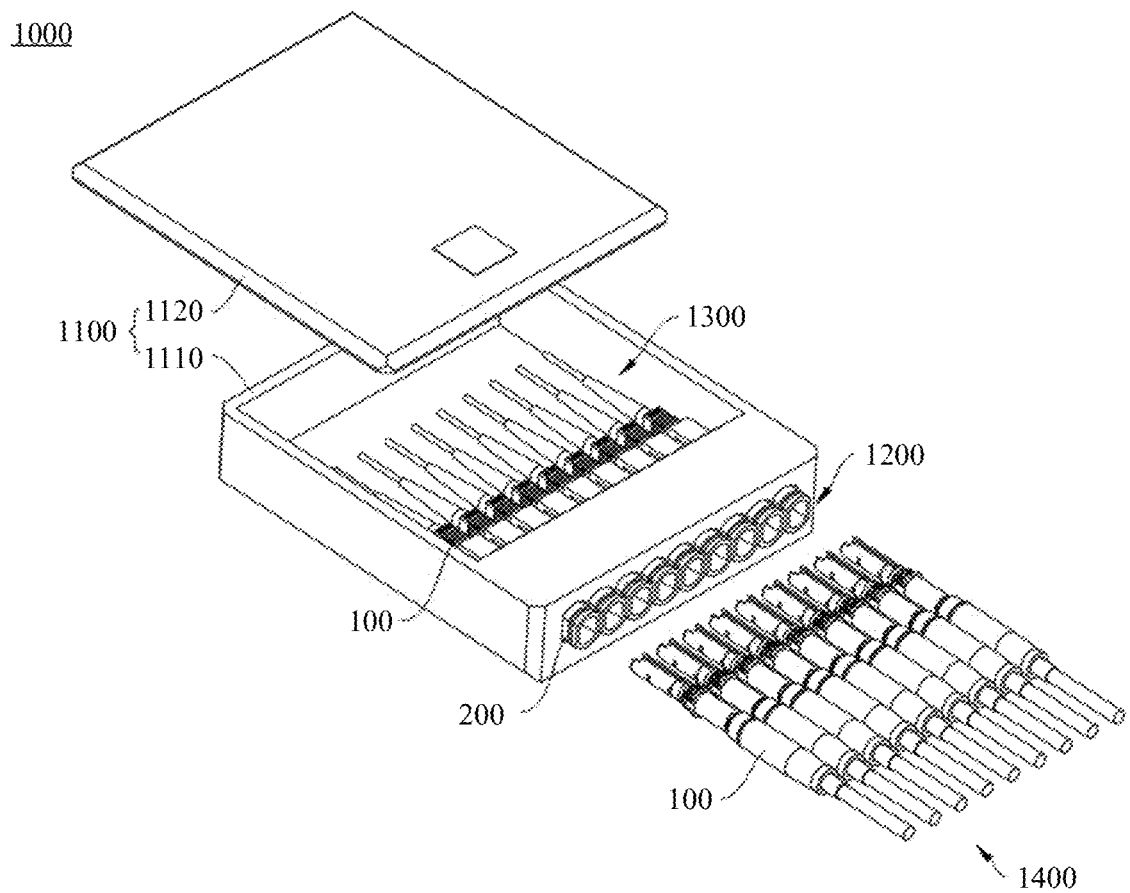
FIG. 2 is a diagram of a communication device according to this application.
Figure 3:
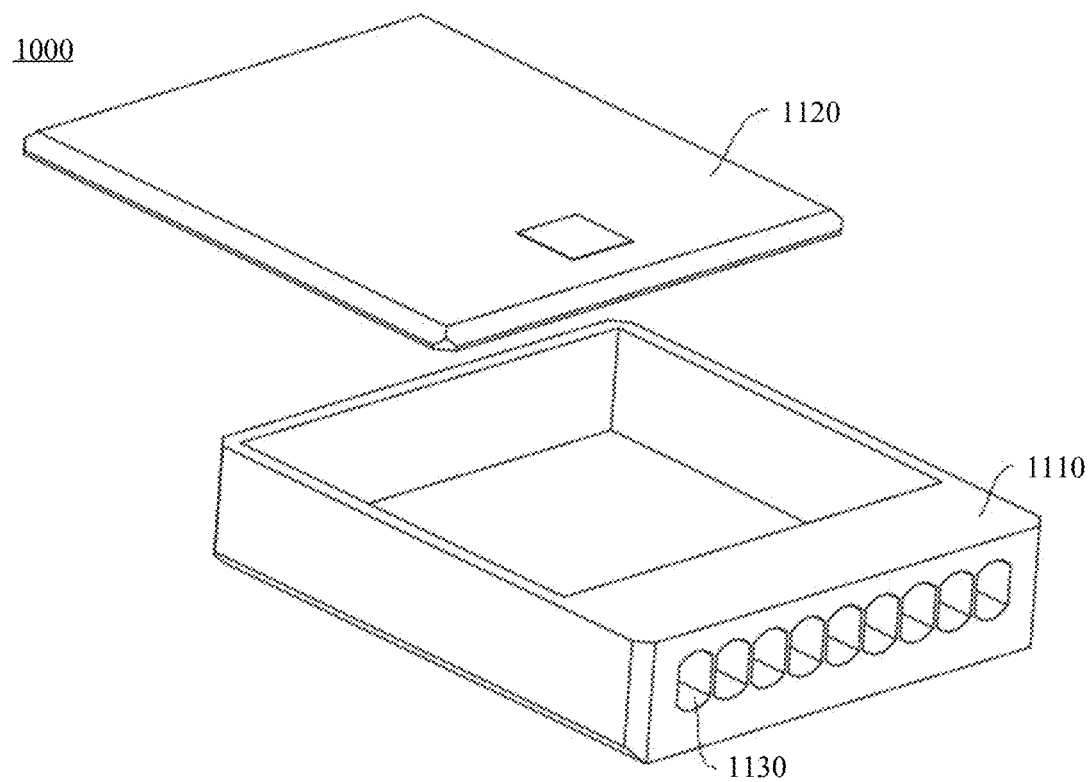
FIG. 3 is a diagram of a housing of the communication device shown in FIG. 2.

Refer to FIG. 2 and FIG. 3. A communication device 1000 includes a housing 1100, an adapter assembly 1200, an indoor connector assembly 1300, and an outdoor connector assembly 1400. The adapter assembly 1200 is secured to the housing 1100, the indoor connector assembly 1300 is accommodated in the housing 1100, the outdoor connector assembly 1400 is located outside the housing 1100, and the outdoor connector assembly 1400 and the indoor connector assembly 1300 can be plugged into each other through connection of the adapter assembly 1200, thereby implementing optical signal transmission.

It should be understood that a difference between the indoor connector assembly 1300 and the outdoor connector assembly 1400 lies in that they are used in different scenarios. The indoor connector assembly 1300 may be located inside the housing 1100 and located in relatively closed space, and can effectively isolate outside dust, moisture, and the like. The outdoor connector assembly 1400 may be located outside the housing 1100 and located in relatively open space, and needs to have a relatively good environmental adaptability to cope with a complex and changeable external environment.

The housing 1100 includes a box body 1110 and a top cover 1120 that covers the box body 1110, the housing 1100 is provided with a plurality of jacks 1130 disposed side by side, and the jacks 1130 may be arranged in one row in the box body 1110 or the top cover 1120, or the jacks 1130 may be arranged in a plurality of rows in the box body 1110 or the top cover 1120 or in the box body 1110 and the top cover 1120. For example, the jacks 1130 may be arranged in one row in the box body 1110; or the jacks 1130 may be arranged in two rows, one of the two rows is arranged in the box body 1110, and the other of the two rows is arranged in the top cover 1120.

The adapter assembly 1200 includes a plurality of optical fiber adapters 200. A quantity of the optical fiber adapters 200 is the same as a quantity of the jacks 1130, and each optical fiber adapter 200 is secured to the box body 1110 through one jack 1130, is partially accommodated in the box body 1110, and is partially located outside the box body 1110. Therefore, each optical fiber adapter 200 can be correspondingly disposed at a position of a corresponding jack 1130, so that one optical fiber adapter 200 and one jack 1130 can be correspondingly disposed.

The indoor connector assembly 1300 includes a plurality of opposite connector plugs 300, and the plurality of opposite connector plugs 300 are all accommodated in the housing 1100. In addition, a quantity of the opposite connector plugs 300 is the same as the quantity of the optical fiber adapters 200, so that each opposite connector plug 300 can be plugged into a part that is of a corresponding optical fiber adapter 200 and that is located inside the box body 1110.

The outdoor connector assembly 1400 includes a plurality of optical fiber connector plugs 100, and a quantity of the optical fiber connector plugs 100 is the same as the quantity of the optical fiber adapters 200, so that each optical fiber connector plug 100 can be plugged from an exterior of the housing 1100 to a part that is of a corresponding optical fiber adapter 200 and that is located outside the housing 1100.

It may be understood that, an opening matching an opposite connector plug 300 and an opening matching an optical fiber connector plug 100 are respectively disposed at two ends of the optical fiber adapter 200, and the opposite connector plug 300 and the optical fiber connector plug 100 are respectively plugged into the two openings of the optical fiber adapter 200. In this way, ferrules of the opposite connector plug 300 and the optical fiber connector plug 100 are connected to each other in the optical fiber adapter 200, in other words, end faces of two optical fibers that need to be connected to each other are connected to each other, so that an optical signal output by a transmitting optical fiber can be coupled to a receiving optical fiber to a maximum extent.

Therefore, each opposite connector plug 300 and each optical fiber connector plug 100 can be plugged, respectively from an interior and the exterior of the housing 1100, into each optical fiber adapter 200 secured to the housing 1100, so that each opposite connector plug 300 can be plugged into a corresponding optical fiber connector plug 100. In other words, one optical fiber connector plug 100, one optical fiber adapter 200, and one opposite connector plug 300 can together form a connector assembly 400, to implement link transmission of an optical signal.

Figure 4:
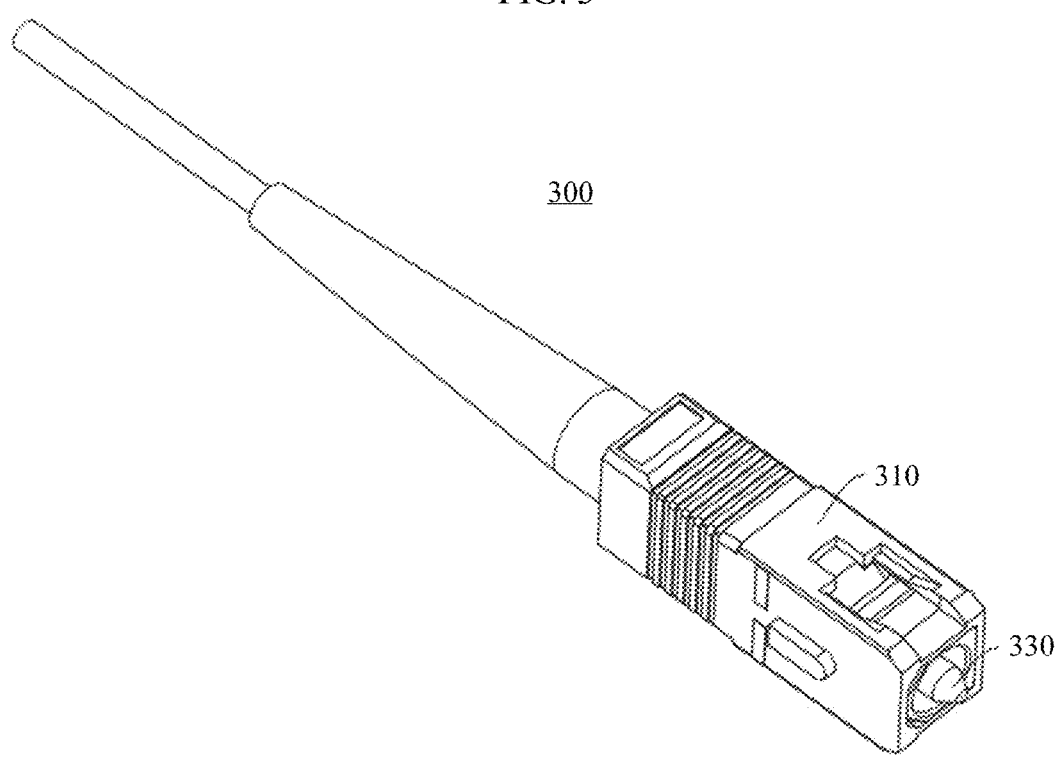
FIG. 4 is a diagram of an opposite connector plug of the communication device shown in FIG. 2.
Figure 5:
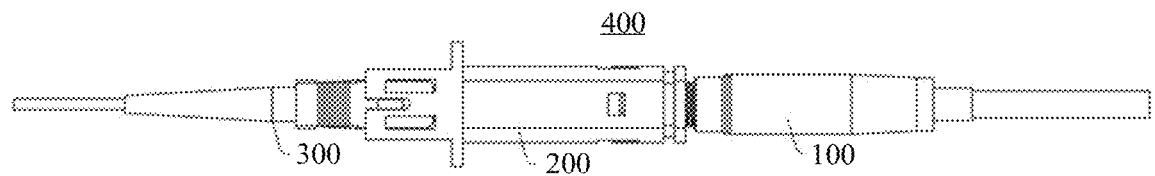
FIG. 5 is a diagram of a connector assembly according to this application.
Figure 6:
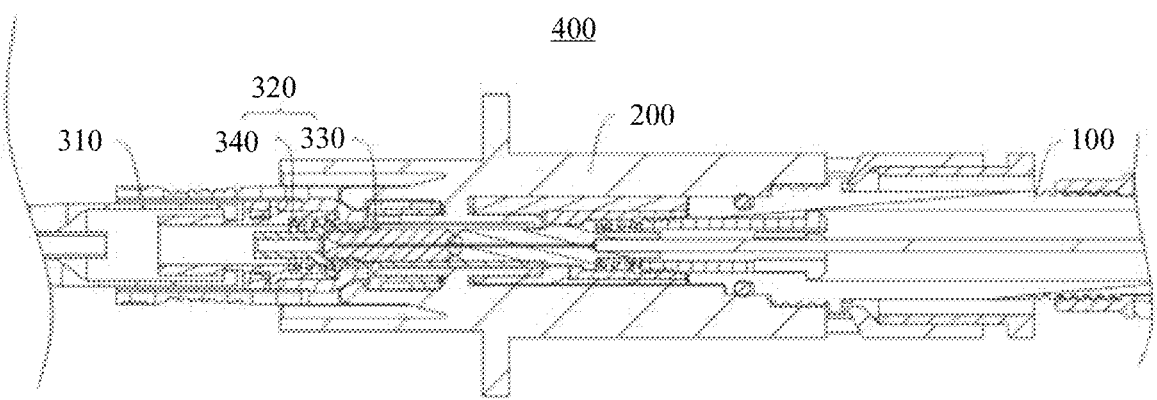
FIG. 6 is a diagram of a partial section of the connector assembly shown in FIG. 5.

Refer to FIG. 4, FIG. 5, and FIG. 6. The opposite connector plug 300 includes a plug body 310 and a ferrule assembly 320 accommodated in the plug body 310. The ferrule assembly 320 includes a ferrule 330 configured to implement interconnection and a spring 340 elastically abutting between the plug body 310 and the ferrule 330. A structure of the opposite connector plug 300 is not limited in this embodiment of this application.

Because architectures of all optical fiber connector plugs 100 are the same, and architectures of all optical fiber adapters 200 are the same, the following describes detailed architectures in technical solutions of this application by using embodiments of three different structures of each of one optical fiber connector plug 100 and an optical fiber adapter 200 that cooperates with the optical fiber connector plug 100.

First Embodiment

A detailed description of an optical fiber connector plug 100 provided in the first embodiment is as follows:

Refer to FIG. 7 to FIG. 10. The optical fiber connector plug 100 includes a housing 10, a ferrule assembly 20, a fixing sleeve 30, an optical fiber 40, and an optical fiber fixing component 50. The ferrule assembly 20 is located inside the housing 10 and is disposed close to an end part of the housing 10, and is configured to be connected to an opposite connector plug 300 to implement optical signal coupling. The fixing sleeve 30 is located between the housing 10 and the ferrule assembly 20, and is configured to firmly secure the ferrule assembly 20 to the housing 10. This limits movement of the ferrule assembly 20 in an axial direction and rotation of the ferrule assembly 20 in a circumferential direction, to ensure connection stability and reliability of the ferrule assembly 20. A main body of the optical fiber 40 is located outside the housing 10 to perform wiring connection-based optical network transmission. An end part of the optical fiber 40 extends into the housing 10 to be connected to the ferrule assembly 20, to prepare for subsequent transmission of an optical signal. In this way, the optical fiber 40 and other optical fibers 40 can implement functions such as connection, straight-through, divergence, and protection by using a connecting function of the optical fiber connector plug 100. The optical fiber fixing component 50 is sleeved outside the housing 10, and is configured to firmly secure the optical fiber 40 to the housing 10, to ensure that a case in which the optical fiber 40 is detached from the housing 10 due to vibration can be avoided, thereby improving installation stability of the optical fiber 40.

For ease of understanding, the following explains and describes related technical terms related to the optical fiber connector plug 100 in this embodiment.

Axial direction: It may be understood as a direction in which a central axis of the optical fiber connector plug 100 is located, is equivalent to an extension direction of the ferrule assembly 20 and the optical fiber 40, that is, a direction in which a tail end of the optical fiber 40 located inside the housing 10 extends to a front end of the optical fiber 40 and continues to extend to a front end of the ferrule assembly 20, and is equivalent to an extension direction of the housing 10.

Circumferential direction: It may be understood as a circumferential direction around the central axis of the optical fiber connector plug 100.

Radial direction: a direction perpendicular to the axial direction

Sleeve shape: It is sleeved on an outer surface of a long strip-shaped object to protect and strengthen fixing or connection; a sleeve-shaped component includes a cylindrical (or tubular) housing, there is hollow space in the housing, and both end faces of the cylindrical (or tubular) housing are provided with openings, and the long strip-shaped object may enter or pass through the sleeve-shaped component through the two openings. The sleeve-shaped component includes two end faces and an outer surface (also referred to as a peripheral surface) connected between the two end faces. An axial direction of the sleeve-shaped component is a direction extending from one end face of the sleeve-shaped component to the other end face thereof. A circumferential direction of the sleeve-shaped component is a direction surrounding the outer surface. A radial direction of the sleeve-shaped component is a direction extending vertically from an inner surface of the sleeve-shaped component to the outer surface thereof, and may be understood as being perpendicular to the axial direction of the sleeve-shaped component.

Figure 7:
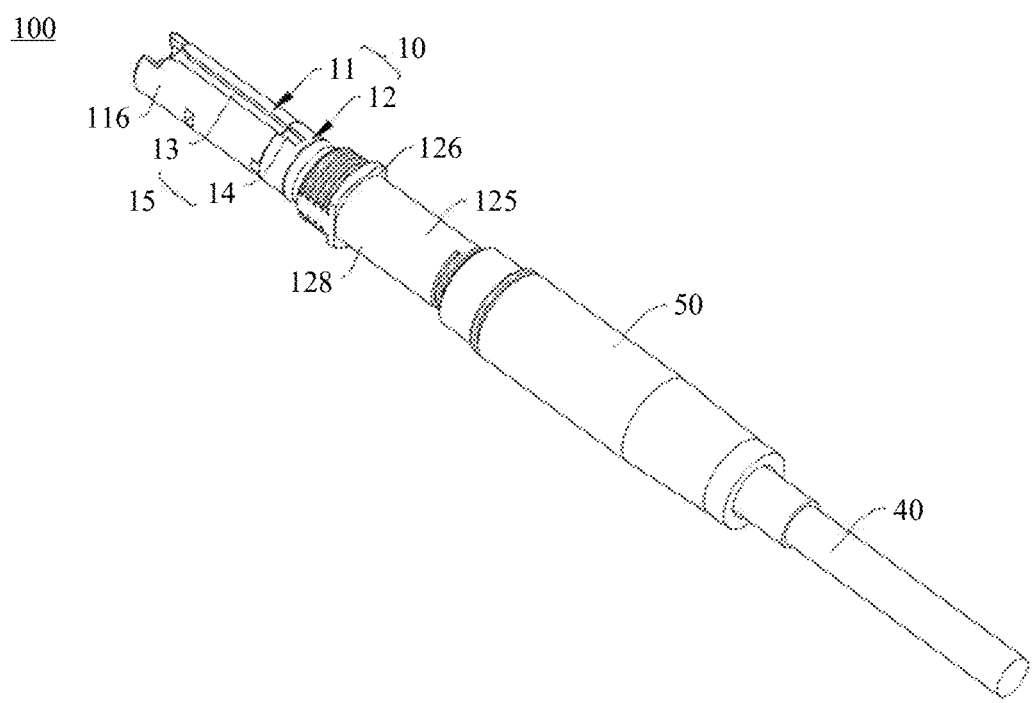
FIG. 7 is a diagram of an optical fiber connector plug viewed from an angle according to a first embodiment of this application.

Refer to FIG. 7. The housing 10 includes an outer frame sleeve 11 and a main shaft 12. The outer frame sleeve 11 is secured to one end of the main shaft 12, and an outer surface 116 of the outer frame sleeve 11 and an outer surface 128 of the main shaft 12 are spliced to form an outer surface of the housing 10, that is, an outer surface of the optical fiber connector plug 100. It may be understood that, a case in which the outer surface 116 of the outer frame sleeve 11 and the outer surface 128 of the main shaft 12 are spliced may include a case in which the outer surface 116 of the outer frame sleeve 11 is connected to the outer surface 128 of the main shaft 12 with no gap therebetween, or may include a case in which the outer surface 116 of the outer frame sleeve 11 and the outer surface 128 of the main shaft 12 are close to each other with a small gap therebetween. When the outer surface 116 of the outer frame sleeve 11 is connected to the outer surface 128 of the main shaft 12 with no gap therebetween, an end face of the outer frame sleeve 11 facing the main shaft 12 is connected to the end face of the main shaft 12, so that the outer surface 116 of the outer frame sleeve 11 is connected to the outer surface 128 of the main shaft 12 with no gap, thereby achieving good reliability and strong aesthetics.

Figure 8:
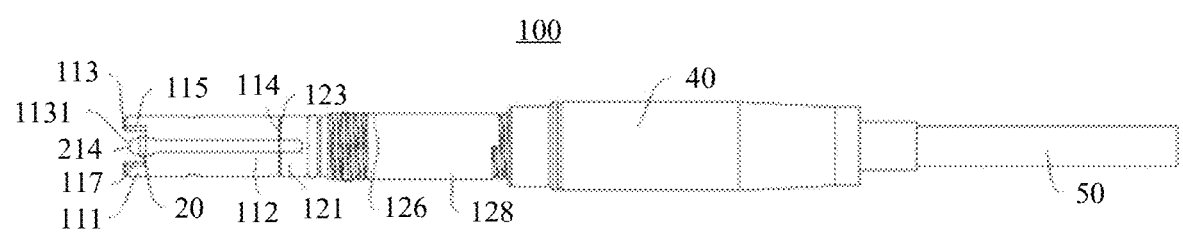
FIG. 8 is a diagram, viewed from another angle, of the optical fiber connector plug shown in FIG. 7.
Figure 10:
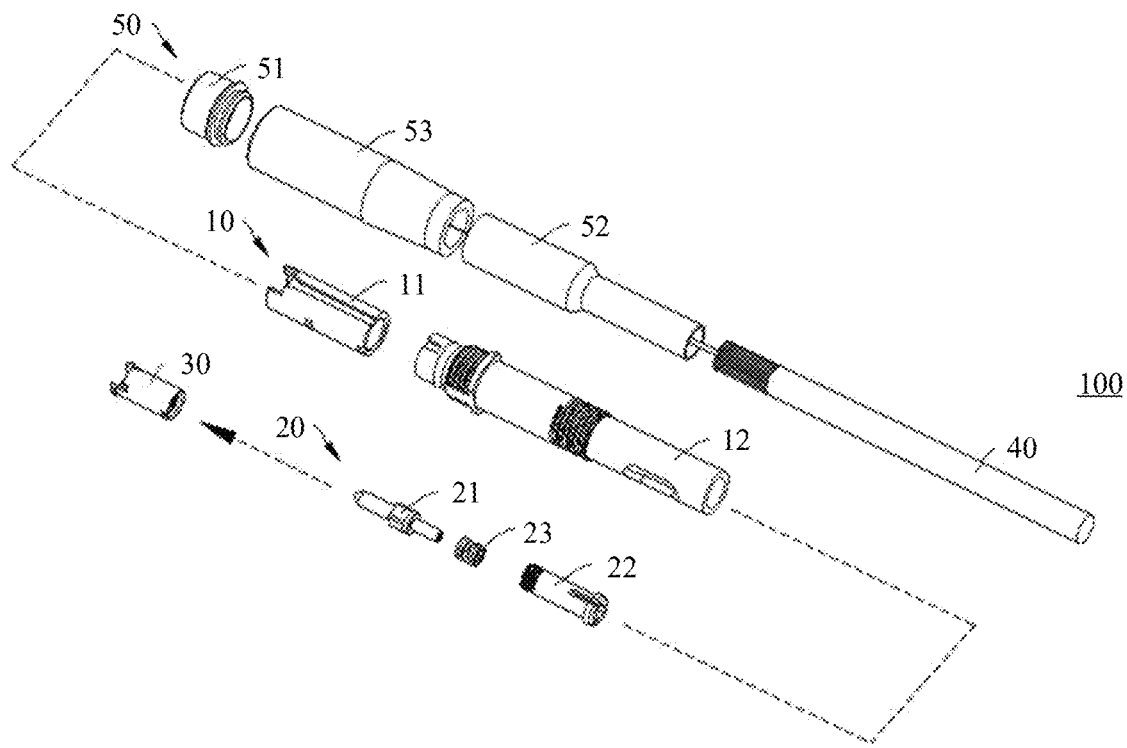
FIG. 10 is an exploded diagram of the optical fiber connector plug shown in FIG. 7.
Figure 11:
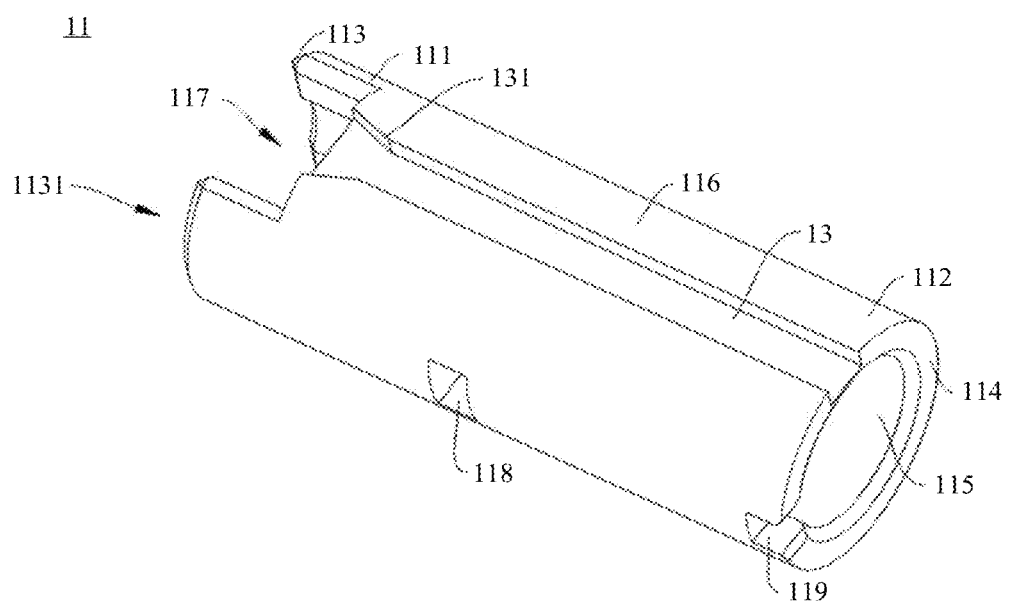
FIG. 11 is a diagram of an outer frame sleeve of the optical fiber connector plug shown in FIG. 7.

Refer to FIG. 8, FIG. 10, and FIG. 11. The outer frame sleeve 11 is in a sleeve shape and includes a front end 111 and a rear end 112. The front end 111 of the outer frame sleeve 11 is an end of the outer frame sleeve 11 away from the main shaft 12 and is also a forefront end of the housing 10. The rear end 112 of the outer frame sleeve 11 is an end of the outer frame sleeve 11 facing the main shaft 12 and is connected to the main shaft 12. For example, a clamping groove 119 may be disposed at the rear end 112 of the outer frame sleeve 11, and a positioning block (not shown in the figure) is disposed at one end of the main shaft 12 facing the outer frame sleeve 11. The positioning block is clamped in the clamping groove 119 to implement a fixed connection between the outer frame sleeve 11 and the main shaft 12 and position the outer frame sleeve 11 and the main shaft 12 in the circumferential direction, to prevent the outer frame sleeve 11 from rotating relative to the main shaft 12.

An end face 113 of the front end 111 of the outer frame sleeve 11 (referred to as the front end face 113 of the outer frame sleeve 11 below) is provided with an opening 1131, and the opening 1131 can expose the ferrule assembly 20, to facilitate subsequent plugging of the ferrule assembly 20 into a ferrule assembly 20 of the opposite connector plug 300. The exposing the ferrule assembly 20 means that a worker can see at least a partial structure of the ferrule assembly 20 when directly facing and looking at the front end face 113 of the outer frame sleeve 11.

In an embodiment, as shown in FIG. 8, the front end 111 of the outer frame sleeve 11 protrudes relative to a front end of the ferrule assembly 20, in other words, the front end face 113 of the outer frame sleeve 11 protrudes relative to a front end face of the ferrule assembly 20 in the axial direction. The front end face of the ferrule assembly 20 is surrounded by an inner surface 115 of the outer frame sleeve 11. Therefore, the outer frame sleeve 11 can protect the front end face of the ferrule assembly 20 in processes of turnover, transportation, and plugging and unplugging of the optical fiber adapter 200, so that the ferrule assembly 20 can be protected by the outer frame sleeve 11 from suffering bumping, crashing, and dust interference, and can keep its own cleanness and safety. In this way, when the ferrule assembly 20 is subsequently plugged into the ferrule assembly 20 of the opposite connector plug 300, stable and reliable transmission of an optical signal between the two ferrule assemblies 20 is ensured.

In another embodiment, the front end face 113 of the outer frame sleeve 11 is flush with the front end face of the ferrule assembly 20.

Refer to FIG. 8 and FIG. 11. In an embodiment, the front end face 113 of the outer frame sleeve 11 is provided with a notch 117. The notch 117 extends from the front end face 113 of the outer frame sleeve 11 in a direction of the main shaft 12, and the notch 117 also penetrates through the inner surface 115 and the outer surface 116 of the outer frame sleeve 11 in the radial direction. Therefore, the front end face 113 of the outer frame sleeve 11 presents an unclosed annular shape. In addition, as shown in FIG. 8, the front end 111 of the outer frame sleeve 11 may roughly present a mirror image "C" shape.

Because the front end 111 of the outer frame sleeve 11 is a front end of the optical fiber connector plug 100, and the front end 111 of the outer frame sleeve 11 is provided with the notch 117, the front end of the optical fiber connector plug 100 can present a concave-convex shape suitable for plugging. In this way, when the optical fiber connector plug 100 is plugged into the optical fiber adapter 200, compared with a flat shape of the front end of the optical fiber connector plug 100, the concave-convex shape can better adapt to internal space of the optical fiber adapter 200. This avoids connection looseness caused due to a limitation of the internal space of the optical fiber adapter 200, and improves plugging stability and reliability, thereby achieving strong practicability and a wide application range. For example, there are two notches 117, and the two notches 117 are symmetrically disposed at the front end 111 of the outer frame sleeve 11. Due to the symmetrical arrangement form, forces on the outer frame sleeve during plugging can be relatively uniform and balanced, and overall strength of the outer frame sleeve 11 is high. This can minimize a possibility of a connection failure caused due to unbalanced forces.

In another embodiment, the front end face 113 of the outer frame sleeve 11 presents a closed annular shape. For example, the front end face 113 of the outer frame sleeve 11 may present a circular annular shape.

Figure 9:
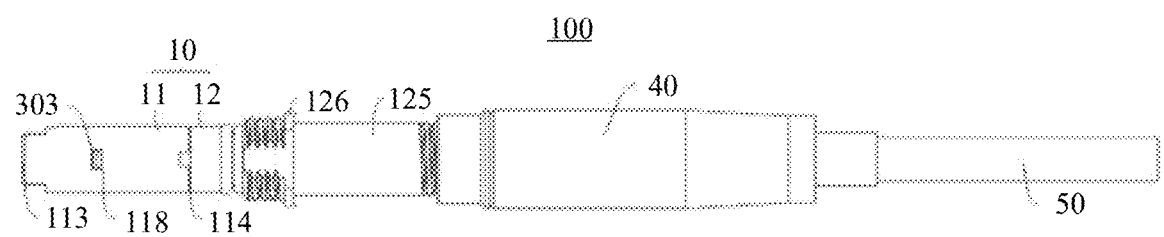
FIG. 9 is a diagram, viewed from still another angle, of the optical fiber connector plug shown in FIG. 7.

Refer to FIG. 9, FIG. 10, and FIG. 11. The inner surface 115 of the outer frame sleeve 11 is provided with a clamping hole 118 (or a clamping groove), and the clamping hole 118 (or the clamping groove) is configured to cooperate with a clamping hook 303 on an outer surface of the fixing sleeve 30 to secure the fixing sleeve 30 to the outer frame sleeve 11.

In this way, movement of the ferrule assembly 20 in the axial direction and rotation of the ferrule assembly 20 in the circumferential direction are limited by using a connection relationship between the fixing sleeve 30 and the ferrule assembly 20, thereby ensuring connection stability and reliability of the ferrule assembly 20. For example, there are two clamping holes 118 (or clamping grooves), the two clamping holes 118 (or the clamping grooves) are symmetrically disposed, and each clamping hole 118 (or each clamping groove) is a through-hole penetrating through the inner surface 115 and the outer surface of the outer frame sleeve 11.

It should be noted that, the clamping hole 118 (or the clamping groove) is at a middle position of the outer frame sleeve 11; and the middle position is a position between the front end face 113 and a rear end face 114, and may represent a central position between the front end face 113 and the rear end face 114, may represent a position close to the front end face 113, or may represent a position close to the rear end face 114. The clamping hole 118 (or the clamping groove) is disposed at the middle position of the outer frame sleeve 11, so that a position of the rear end 112 of the outer frame sleeve 11 can be correspondingly designed as a closed structure. A problem in a conventional design that a structure of the outer frame sleeve 11 is relatively loose because a structure of the rear end 112 of the outer frame sleeve 11 is an unclosed structure due to a design of a relatively long notch 117 at the rear end 112 of the outer frame sleeve 11 can be effectively avoided, and integrity of the outer frame sleeve 11 can be effectively strengthened. In addition, the clamping hole 118 (or the clamping groove) is disposed at the middle position of the outer frame sleeve 11. Due to convenience of a clamping structure and stability of the middle position, a size of the clamping hole 118 (or the clamping groove) only needs to satisfy a requirement that the clamping hole 118 (or the clamping groove) is clamped with the fixing sleeve 30. In other words, the size of the clamping hole 118 (or the clamping groove) can be designed to be relatively small, so that strength and toughness of the outer frame sleeve 11 can be ensured, thereby avoiding fracture during installation.

Refer to FIG. 11. The outer surface 116 of the outer frame sleeve 11 is provided with a first guide structure 13, the first guide structure 13 extends in the axial direction, and the first guide structure 13 can play a guiding function in a process of plugging the optical fiber connector plug 100 into the optical fiber adapter 200, to guide the optical fiber connector plug 100 to be smoothly plugged into the optical fiber adapter 200.

In an embodiment, as shown in FIG. 11, the first guide structure 13 may extend from the front end face 113 of the outer frame sleeve 11 to the rear end face 114 of the outer frame sleeve 11.

In another embodiment, the first guide structure 13 may extend from the front end face 113 of the outer frame sleeve 11 to any position on the outer surface 116 of the outer frame sleeve 11. The any position may be a middle position that is on the outer surface 116 of the outer frame sleeve 11 and that is between the front end face 113 of the outer frame sleeve 11 and the rear end face 114 of the outer frame sleeve 11, may be a position that is on the outer surface 116 of the outer frame sleeve 11 and that is close to the front end face 113 of the outer frame sleeve 11, or may be a position that is on the outer surface 116 of the outer frame sleeve 11 and that is close to the rear end face 114 of the outer frame sleeve 11. This is not strictly limited in this embodiment.

In this embodiment, the first guide structure 13 may be a groove structure concavely disposed on the outer surface 116 of the outer frame sleeve 11, or the first guide structure 13 may be a boss structure convexly disposed on the outer surface 116 of the outer frame sleeve 11. There may be one first guide structure 13, or there may be a plurality of (two or more) first guide structures 13. A structure form of the first guide structure 13 and a quantity of first guide structures 13 may be designed based on an actual situation, thereby achieving strong flexibility and a wide application range. The following provides a description by using an example in which the first guide structure 13 is a groove structure concavely disposed on the outer surface 116 of the outer frame sleeve 11.

In an embodiment, as shown in FIG. 11, the first guide structure 13 is a groove structure formed after the outer surface 116 of the outer frame sleeve 11 is recessed inward, and the first guide structure 13 does not penetrate through the inner surface 115 of the outer frame sleeve 11. The first guide structure 13 can be embedded with a corresponding structure of the optical fiber adapter 200 (for example, a guide key 290 of the optical fiber adapter 200), and has a bearing capacity to support the corresponding structure of the optical fiber adapter 200. In addition, the first guide structure 13 can guide the corresponding structure of the optical fiber adapter 200 to be plugged into the first guide structure 13, to prevent the outer frame sleeve 11 from rotating, thereby preventing the optical fiber connector plug 100 from rotating relative to the optical fiber adapter 200. For example, a slot of the first guide structure 13 may be communicated with the notch 117 of the front end face 113, thereby further providing a striking reminding function for plugging of the optical fiber connector plug 100.

In another embodiment, the first guide structure 13 penetrates through the inner surface 115 and the outer surface 116 of the outer frame sleeve 11.

Based on the foregoing description, the first guide structure 13 is disposed, so that the outer frame sleeve 11 can have striking reminding and guiding functions, thereby facilitating alignment between the optical fiber connector plug 100 and the optical fiber adapter 200. In this way, a success rate of plugging the optical fiber connector plug 100 into the optical fiber adapter 200 is increased, a problem that the ferrule assembly 20 of the optical fiber connector plug 100 is damaged or fails because the ferrule assembly 20 is collided for a plurality of times due to incorrect plugging of the optical fiber connector plug 100 is prevented, and a service life of the optical fiber connector plug 100 is effectively prolonged.

Still refer to 11. To facilitate alignment of the corresponding structure of the optical fiber adapter 200 with the first guide structure 13, a chamfer 131 may be formed at an outer end of the first guide structure 13, so that the outer end of the first guide structure 13 forms a shape of a trumpet-shaped flaring. The outer end of the first guide structure 13 is an end of the first guide structure 13 close to the front end face 113 of the outer frame sleeve 11. Therefore, the chamfer 131 is disposed, so that a fault-tolerant space can be provided for the first guide structure 13. Even if the corresponding structure of the optical fiber adapter 200 is not aligned with a center of the first guide structure 13, the corresponding structure can slide into the first guide structure 13 by using a guiding function of the chamfer 131. When a worker plugs the optical fiber connector plug 100 into the optical fiber adapter 200, the first guide structure 13 can also be aligned with the corresponding structure of the optical fiber adapter 200 by using the guiding function of the chamfer 131. This can further improve plugging efficiency and increase a plugging success rate, and can more effectively protect the optical fiber connector plug 100 from being damaged.

In an embodiment, as shown in FIG. 11, the chamfer 131 may be a right-angled chamfer. Structure processing of the right-angled chamfer is simpler and more convenient, and an outer end opening of the trumpet-shaped flaring may be set to be relatively large, thereby further widening a guiding range. For example, an angle range of a tilt angle of a single-sided chamfer 131 may be 0°-90°. For example, the tilt angle of the single-sided chamfer 131 may be set to 10°, 15°, or 30°. Angle selection of the tilt angle may be adjusted based on an actual requirement. This is not strictly limited in this embodiment.

In another embodiment, the chamfer 131 may alternatively be a fillet, and the fillet has no edge, and a surface thereof is smoother. This can effectively prevent wear on the corresponding structure of the optical fiber adapter 200, thereby achieving strong safety.

Based on the foregoing description, the front end face 113 of the outer frame sleeve 11 in this embodiment can protect the front end face of the ferrule assembly 20, and the inner surface 115 of the outer frame sleeve 11 can limit the ferrule assembly 20 through connection to the fixing sleeve 30. The outer surface 116 of the outer frame sleeve 11 is provided with the first guide structure 13 and can cooperate with the corresponding structure of the optical fiber adapter 200 to limit rotation of the optical fiber connector plug 100. The rear end face 114 of the outer frame sleeve 11 can be connected to the end face of the main shaft 12, so that the rear end face 114 of the outer frame sleeve 11 and the end face of the main shaft 12 can position each other. Therefore, the structure arrangement of the outer frame sleeve 11 can adapt to a requirement of diversified scenarios, thereby achieving strong practicability and a wide application range. In addition, the outer surface 116 of the outer frame sleeve 11 directly forms an appearance structure of the optical fiber connector plug 100. This can effectively reduce a quantity of parts of the optical fiber connector plug 100, thereby facilitating miniaturization of the optical fiber connector plug 100.

The outer frame sleeve 11 of the housing 10 has been described in detail above, and the other core component of the housing 10, namely the main shaft 12, is described in detail below.

Refer to FIG. 7, FIG. 8, FIG. 10, and FIG. 12. In this embodiment, the main shaft 12 is in a sleeve shape and includes a head end 121 and a tail end 122. The head end 121 of the main shaft 12 is one end facing the outer frame sleeve 11, and is secured to the rear end 112 of the outer frame sleeve 11. An end face 123 of the head end 121 of the main shaft 12 is connected to the rear end face 114 of the outer frame sleeve 11. The tail end 122 of the main shaft 12 is an end away from the outer frame sleeve 11 and is also a rearmost end of the housing 10, and can be fixedly connected to the optical fiber 40.

The main shaft 12 includes a shaft body 125 and a second locking structure 126. For convenience of description, the head end 121 of the main shaft 12 defined in this embodiment is equivalent to a head end of the shaft body 125, and the tail end 122 of the main shaft 12 is equivalent to a tail end of the shaft body 125. In addition, an inner surface 127 of the main shaft 12 defined in this embodiment is an inner surface of the shaft body 125, and an outer surface 128 of the main shaft 12 is a surface bearing the second locking structure 126, that is, an outer surface of the shaft body 125, rather than an outer surface of the second locking structure 126.

Figure 12:
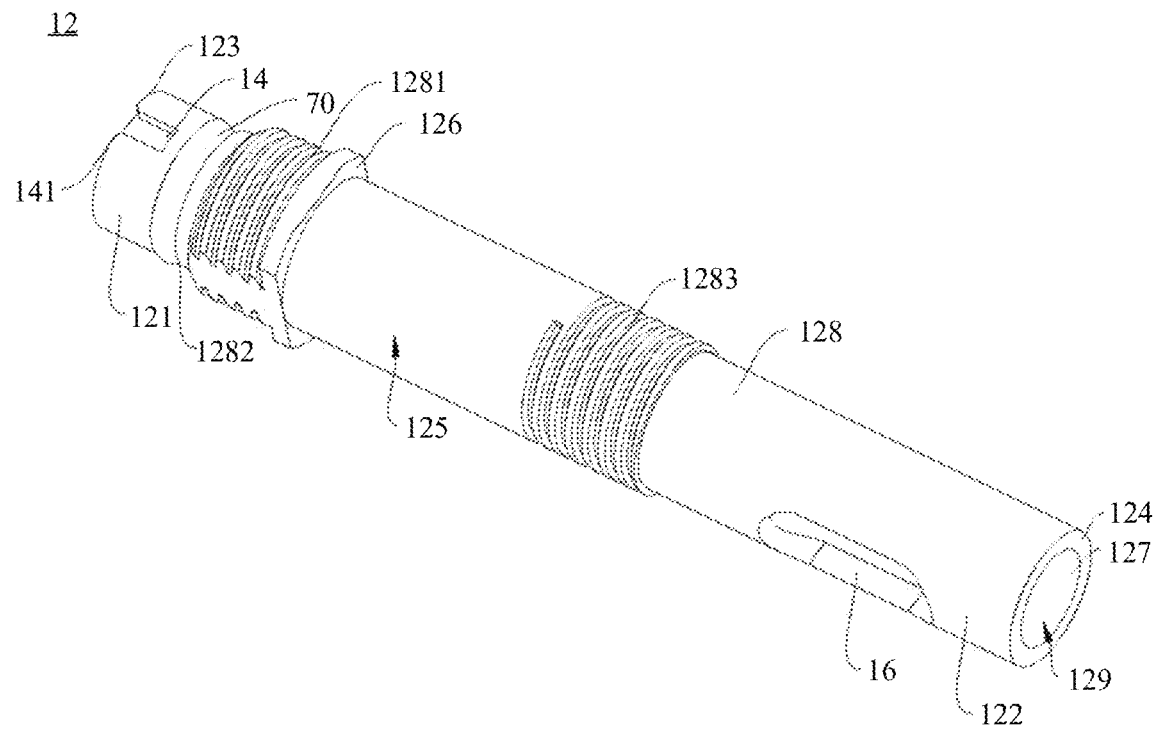
FIG. 12 is a diagram of a main shaft of the optical fiber connector plug shown in FIG. 7.
Figure 13:
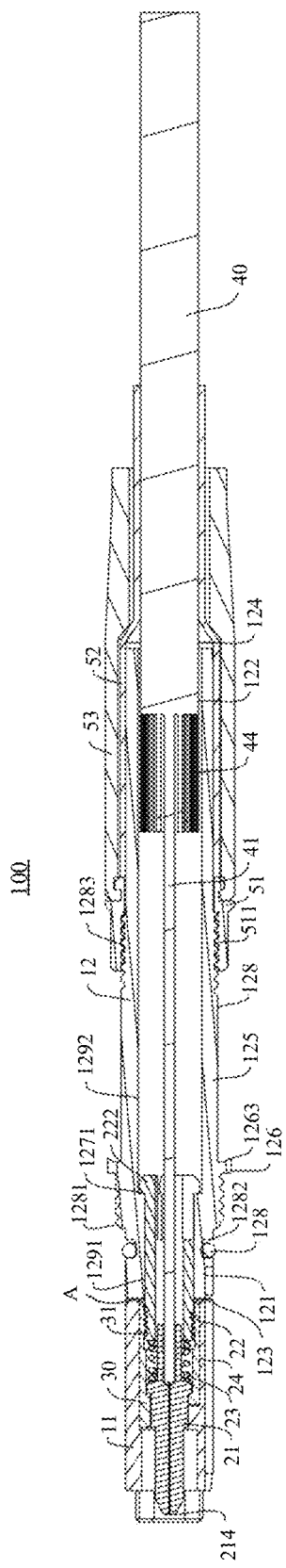
FIG. 13 is a cross-sectional view of the optical fiber connector plug shown in FIG. 7.

Refer to FIG. 12 and FIG. 13. A through-hole 129 extending in the axial direction is disposed in the main shaft 12, and the through-hole 129 penetrates through the end face 123 of the head end 121 of the main shaft 12 and an end face 124 of the tail end 122 of the shaft body 125. The through-hole 129 may be configured to accommodate the fixing sleeve 30, the ferrule assembly 20, and the optical fiber 40, to implement appropriate layout and miniaturization of the optical fiber connector plug 100 through compact space design.

The inner surface 127 of the main shaft 12 is provided with a first limiting structure 1271. The first limiting structure 1271 is configured to cooperate with a second limiting structure of the ferrule assembly 20, to limit movement of the ferrule assembly 20 in the axial direction to prevent the ferrule assembly 20 from being removed from the main shaft 12.

For example, the first limiting structure 1271 may be a shaft shoulder formed by a hole wall of the through-hole 129. The through-hole 129 may include a first through-hole 1291 and a second through-hole 1292 that are coaxial. The first through-hole 1291 is a hole-like structure that extends from the end face 123 of the head end 121 of the main shaft 12 to the end face 124 of the tail end 122 of the main shaft 12, the second through-hole 1292 is a hole-like structure that extends from the end face 124 of the tail end 122 of the main shaft 12 to the end face 123 of the head end 121 of the main shaft 12, and the second through-hole 1292 and the first through-hole 1291 are communicated with each other. In addition, an aperture size of the second through-hole 1292 is larger than an aperture size of the first through-hole 1291. Therefore, at a joint part between the first through-hole 1291 and the second through-hole 1292, due to an aperture size variation between the second through-hole 1292 and the first through-hole 1291, the first limiting structure 1271 can be formed for being abutted by the second limiting structure 222. Due to existence of the first limiting structure 1271, the main shaft 12 can be used for positioning and installing the ferrule assembly 20 without adding an additional component, thereby implementing a simple operation and a reliable connection.

Figure 14:
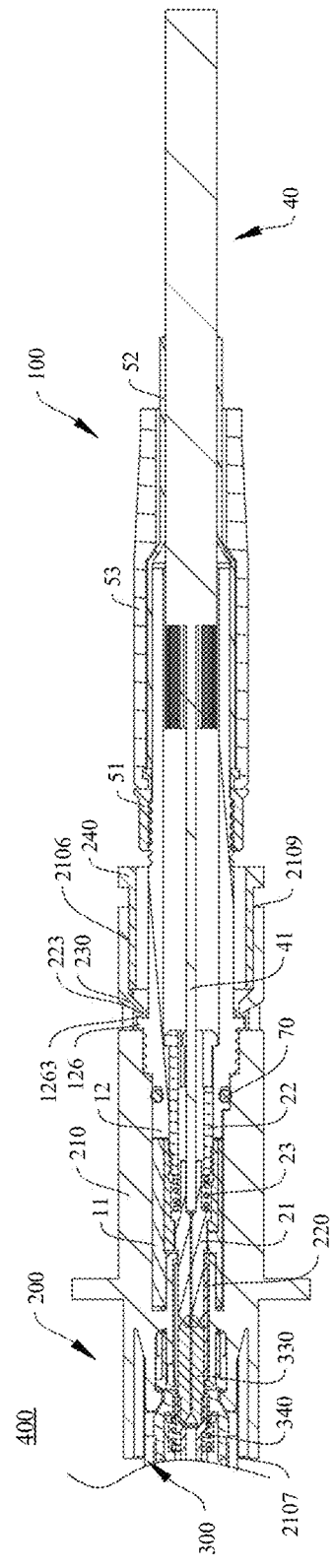
FIG. 14 is a cross-sectional view of the assembly of the optical fiber connector plug and an optical fiber adapter according to the first embodiment of this application.

Refer to FIG. 12, FIG. 13, and FIG. 14, the second locking structure 126 is located on the outer surface of the shaft body 125, that is, the outer surface 128 of the main shaft 12. The second locking structure 126 is configured to cooperate with a first locking structure 230 of the optical fiber adapter 200 to secure the optical fiber connector plug 100 to the optical fiber adapter 200.

The second locking structure 126 is disposed on the outer surface of the shaft body 125, so that the second locking structure 126 can be in direct contact with the first locking structure 230 of the optical fiber adapter 200, to cooperate with each other to secure the optical fiber connector plug 100 to the optical fiber adapter 200. Therefore, the outer surface of the shaft body 125 can directly form the outer surface of the optical fiber connector plug 100. Compared with a case in which a conventional optical fiber connector plug has a relatively large outer diameter because a handle sleeve is sleeved outside a main shaft of the optical fiber connector plug, an outer diameter of the optical fiber connector plug 100 can be reduced correspondingly. Correspondingly, an outer diameter of the optical fiber adapter 200 that matches the optical fiber connector plug 100 is further reduced. In other words, based on this arrangement, a size of space occupied by the optical fiber connector plug 100 and the optical fiber adapter 200 can be effectively reduced. In this case, compared with a conventional design, more jacks 1130 for plugging and securing optical fiber adapters 200 can be arranged in limited space of a communication device 1000 to which the optical fiber adapter 200 is applied. In other words, more optical fiber adapters 200 that function as optical fiber connection ports can be arranged, so that a quantity of optical fiber connection ports is further increased in an insufficient space layout of the communication device 1000, and requirements of high performance and miniaturization of the communication device 1000 can also be satisfied, thereby achieving strong practicability and a wide application range.

It may be understood that, because the second locking structure 126 needs to cooperate with the first locking structure 230 of the optical fiber adapter 200, the second locking structure 126 is located at a part that is of the optical fiber connector plug 100 and that is to be plugged into the optical fiber adapter 200. In other words, the second locking structure 126 is located at the head end 121 of the main shaft 12. To facilitate plugging of the main shaft 12 to make the second locking structure 126 smoothly cooperate with the first locking structure 230 of the optical fiber adapter 200, a cross-sectional shape at a position that is on the main shaft 12 and at which the second locking structure 126 is provided needs to match a cross-sectional shape of the optical fiber adapter 200. For example, because the cross-sectional shape of the optical fiber adapter 200 is roughly elliptical, the cross-sectional shape at the position that is on the main shaft 12 and at which the second locking structure 126 is provided may also be roughly elliptical.

In an embodiment, the second locking structure 126 is an arc-shaped boss disposed on the outer surface of the shaft body 125 in the circumferential direction of the shaft body 125, and the arc-shaped boss is partially disposed around the outer surface of the shaft body 125. For example, there are two second locking structures 126, and the two second locking structures 126 are symmetrically arranged. The symmetrical arrangement form leads to good force uniformity and good balance.

The two second locking structures 126 may be symmetrically located at two circular arc bends of an oval, so that each second locking structure 126 may present a shape of an arc-shaped boss. In this case, a central angle corresponding to each arc-shaped boss is less than 180°. Alternatively, the two second locking structures 126 may be symmetrically located at two straights of an oval, so that each second locking structure 126 may present a shape of an ellipsoidal arc-shaped boss.

Therefore, the second locking structure 126 is disposed as an arc-shaped boss, so that the second locking structure 126 can fit a cylindrical shape of the outer surface of the shaft body 125. In this way, it is relatively simple to perform processing, and the second locking structure 126 (that can cooperate with the first locking structure 230 of the optical fiber adapter 200) can be formed without consuming more materials. This can effectively reduce material costs and improve production efficiency.

In another embodiment, the second locking structure 126 is an annular boss disposed around the outer surface of the shaft body 125 in the circumferential direction of the shaft body 125. For example, the annular boss may be an ellipsoidal boss.

Based on the foregoing description, the cross-sectional shape at the position that is on the main shaft 12 and at which the second locking structure 126 is provided, can sufficiently match the cross-sectional shape of the optical fiber adapter 200. In this case, when the optical fiber connector plug 100 is plugged into the optical fiber adapter 200, connection stability and reliability between the optical fiber connector plug 100 and the optical fiber adapter 200 can be enhanced.

Figure 15:
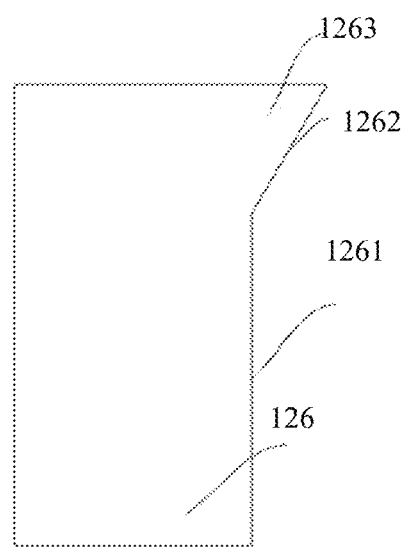
FIG. 15 is a diagram a second locking structure of the optical fiber connector plug according to the first embodiment of this application.

Refer to FIG. 12, FIG. 13, and FIG. 15, in this embodiment, a protrusion 1262 is disposed on a surface 1261 of the second locking structure 126 facing away from the outer frame sleeve 11, and the protrusion 1262 includes a second matching surface 1263. The second matching surface 1263 is connected to the surface 1261 of the second locking structure 126 facing away from the outer frame sleeve 11 and an included angle is formed between the second matching surface 1263 and the surface 1261 of the second locking structure 126 facing away from the outer frame sleeve 11. The second matching surface 1263 is configured to abut against a first matching surface 233 of the first locking structure 230. For example, the included angle formed between the second matching surface 1263 and the surface 1261 of the second locking structure 126 facing away from the outer frame sleeve 11 is an obtuse angle.

It may be understood that, the surface 1261 of the second locking structure 126 facing away from the outer frame sleeve 11 is disposed perpendicular to the axial direction, and the included angle is formed between the second matching surface 1263 and the surface 1261 of the second locking structure 126 facing away from the outer frame sleeve 11. In other words, the second matching surface 1263 is inclined with respect to the axial direction. In other words, the second matching surface 1263 is an inclined surface that is inclined with respect to the surface 1261 of the second locking structure 126 facing away from the outer frame sleeve 11. Correspondingly, the first matching surface 233 of the first locking structure 230 of the optical fiber adapter 200 is also an inclined surface, disposed obliquely. Therefore, matching between the second matching surface 1263 and the first matching surface 233 is an inclined surface matching. Inclined surface matching is configured so that quick alignment can be implemented between the second locking structure 126 and the first locking structure 230. This not only reduces difficulty of interconnection between the second locking structure 126 and the first locking structure 230, but also increases a contact area between the second locking structure 126 and the first locking structure 230, thereby further improving interconnection tightness.

Figure 16:
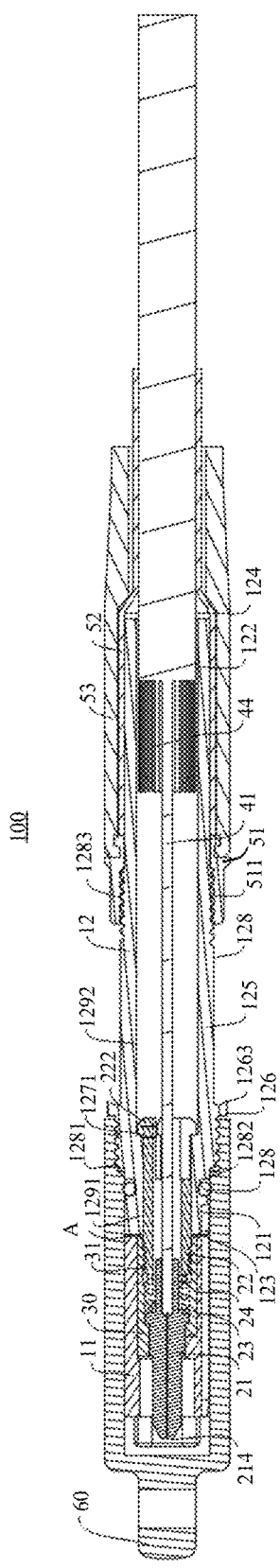
FIG. 16 is a cross-sectional view of another optical fiber connector plug according to the first embodiment of this application.

In an embodiment, because the head end 121 of the main shaft 12 and the outer frame sleeve 11 are both in an open state and directly exposed in an external environment when not connected to the optical fiber adapter 200, to prevent external dust, moisture, and the like from entering the optical fiber connector plug 100, and to prevent external dust, moisture, and the like from entering the optical fiber adapter 200, when the head end 121 of the main shaft 12 and the outer frame sleeve 11 are connected to the optical fiber adapter 200, as shown in FIG. 16, the optical fiber connector plug 100 may further include a dust-proof cap 60. The dust-proof cap 60 is sleeved outside the outer frame sleeve 11 and at the head end 121 of the main shaft 12, and is detachably connected to the main shaft 12. A structure in which a detachable connection is configured is simple, so that the dust-proof cap 60 can be quickly disassembled and installed from the main shaft 12 without using a special-purpose tool, thereby effectively improving efficiency of connecting the dust-proof cap 60 to the main shaft 12.

Therefore, when the optical fiber connector plug 100 is not connected to the optical fiber adapter 200, that is, when the optical fiber connector plug 100 is in turnover, transportation, or another case, the dust-proof cap 60 may be connected to the main shaft 12, so that the dust-proof cap 60 can close and cover a joint part between the optical fiber connector plug 100 and the optical fiber adapter 200, to protect the outer frame sleeve 11 and the main shaft 12. This can prevent entry of external foreign matters, moisture, dust, and the like into the optical fiber connector plug 100 from causing damage to the optical fiber connector plug 100, so that the joint part between the optical fiber connector plug 100 and the optical fiber adapter 200 is kept clean, thereby reaching an IP68 protection level. When the optical fiber connector plug 100 needs to be connected to the optical fiber adapter 200, the dust-proof cap 60 may be disassembled from the main shaft 12.

For example, an internal thread 61 may be disposed on an inner surface of the dust-proof cap 60, and an external thread 1281 may be disposed on the outer surface 128 of the main shaft 12. The external thread 1281 is located at the head end 121 of the main shaft 12, so that the dust-proof cap 60 is in threaded connection to the main shaft 12. The threaded connection structure is simple and also has relatively strong locking performance, so that the dust-proof cap 60 can be tightly connected to the main shaft 12. In addition, the external thread 1281 may be further disposed close to the second locking structure 126 of the shaft body 125. That the external thread 1281 is disposed close to the second locking structure 126 of the shaft body 125 may include a case in which the external thread 1281 is connected to the second locking structure 126 of the shaft body 125 without a gap, or may include a case in which there is a small gap between the external thread 1281 and the second locking structure 126 of the shaft body 125. Therefore, when the dust-proof cap 60 is connected to the main shaft 12, the dust-proof cap 60 may also abut against a surface 1264 of the second locking structure 126 facing the outer frame sleeve 11, thereby further improving connection stability and reliability of the dust-proof cap 60.

In an embodiment, the outer surface 128 of the main shaft 12 is provided with a sealing groove 1282, and the sealing groove 1282 is an arc-shaped groove structure surrounding the outer surface 128 of the main shaft 12. The optical fiber connector plug 100 further includes a sealing ring 70, and the sealing ring 70 is sleeved in the sealing groove 1282. When the dust-proof cap 60 is connected to the main shaft 12, the sealing ring 70 may be sandwiched between the dust-proof cap 60 and the main shaft 12 to seal the dust-proof cap 60, so that there is good sealing between the dust-proof cap 60 and the main shaft 12. In addition, when the optical fiber connector plug 100 is connected to the optical fiber adapter 200, the sealing ring 70 may be sandwiched between the optical fiber connector plug 100 and the optical fiber adapter 200 to seal the optical fiber adapter 200, so that there is good sealing between the optical fiber connector plug 100 and the optical fiber adapter 200. Therefore, the sealing ring 70 can have dual functions of sealing the dust-proof cap 60 and the optical fiber adapter 200, thereby achieving strong practicability and a wide application range.

Refer to FIG. 7 and FIG. 12. A second guide structure 14 is disposed on the outer surface 128 of the main shaft 12, and the second guide structure 14 extends in the axial direction. The second guide structure 14 and the first guide structure 13 are connected to each other to form a guide structure 15 disposed on the outer surface of the housing 10, and are together configured to cooperate with the corresponding structure of the optical fiber adapter 200 (for example, the guide key 290 of the optical fiber adapter 200) to limit rotation of the optical fiber connector plug 100 in the optical fiber adapter 200. In other words, the second guide structure 14 can play a guiding function in a process of plugging the optical fiber connector plug 100 into the optical fiber adapter 200, to guide the optical fiber connector plug 100 to be smoothly plugged into the optical fiber adapter 200.

In an embodiment, the second guide structure 14 may extend from the end face 123 of the head end 121 of the main shaft 12 to the sealing groove 1282, and is separated from the sealing groove 1282.

In this embodiment, the second guide structure 14 may be a groove structure concavely disposed on the outer surface 128 of the main shaft 12, or the second guide structure 14 may be a boss structure convexly disposed on the outer surface 128 of main shaft 12. There may be one second guide structure 14, or there may be a plurality of (two or more) second guide structures 14. A structure form of the second guide structure 14 and a quantity of second guide structures 14 may be designed based on an actual situation, thereby achieving strong flexibility and a wide application range. The following provides a description by using an example in which the second guide structure 14 is a groove structure concavely disposed on the outer surface 128 of the main shaft 12.

In an embodiment, the second guide structure 14 is a groove structure formed after the outer surface 128 of the main shaft 12 is recessed inward, and the second guide structure 14 does not penetrate through the inner surface 127 of the main shaft 12. The second guide structure 14 can be embedded with the corresponding structure of the optical fiber adapter 200 (for example, the guide key 290 of the optical fiber adapter 200), and has a bearing capacity to support the corresponding structure of the optical fiber adapter 200. In addition, the second guide structure 14 can guide the corresponding structure of the optical fiber adapter 200 to be plugged into the second guide structure 14, to prevent the main shaft 12 from rotating, thereby preventing the optical fiber connector plug 100 from rotating relative to the optical fiber adapter 200. For example, a slot of the second guide structure 14 may be communicated with the first guide structure 13, thereby further providing a striking reminding function for plugging of the optical fiber connector plug 100.

In another embodiment, the second guide structure 14 penetrates through the inner surface 127 and the outer surface 128 of the main shaft 12.

Based on the foregoing description, the second guide structure 14 is disposed so that the main shaft 12 can have striking reminding and guiding functions, thereby facilitating alignment between the optical fiber connector plug 100 and the optical fiber adapter 200. In this way, a success rate of plugging the optical fiber connector plug 100 into the optical fiber adapter 200 is increased, a problem that the ferrule assembly 20 of the optical fiber connector plug 100 is damaged or fails because the ferrule assembly 20 is collided for a plurality of times due to incorrect plugging of the optical fiber connector plug 100 is prevented, and a service life of the optical fiber connector plug 100 is effectively prolonged.

To facilitate alignment of the corresponding structure of the optical fiber adapter 200 with the second guide structure 14, a chamfer 141 may be formed at an outer end of the second guide structure 14, so that the outer end of the second guide structure 14 forms a shape of a trumpet-shaped flaring. The outer end of the second guide structure 14 is an end of the second guide structure 14 close to the rear end face 114 of the outer frame sleeve 11. Therefore, the chamfer 141 is disposed, so that a fault-tolerant space can be provided for the second guide structure 14. Even if the corresponding structure of the optical fiber adapter 200 is not aligned with a center of the second guide structure 14, the corresponding structure can slide into the second guide structure 14 by using the guiding function of the chamfer 141. When a worker plugs the optical fiber connector plug 100 into the optical fiber adapter 200, the second guide structure 14 can also be aligned with the corresponding structure of the optical fiber adapter 200 by using the guiding function of the chamfer 141. This can further improve plugging efficiency and increase a plugging success rate, and can more effectively protect the optical fiber connector plug 100 from being damaged.

In an embodiment, as shown in FIG. 12, the chamfer 141 may be a right-angled chamfer. Structure processing of the right-angled chamfer is simpler and more convenient, and an outer end opening of the trumpet-shaped flaring may be set to be relatively large, thereby further widening a guiding range. For example, an angle range of a tilt angle of a single-sided chamfer 141 may be 0°-90°. For example, the tilt angle of the single-sided chamfer 141 may be set to 10°, 15°, or 30°. Angle selection of the tilt angle may be adjusted based on an actual requirement. This is not strictly limited in this embodiment.

In another embodiment, the chamfer 141 may alternatively be a fillet, and the fillet has no edge, and a surface thereof is smoother. This can effectively prevent wear on the corresponding structure of the optical fiber adapter 200, thereby achieving strong safety.

Still refer to FIG. 8 and FIG. 12, the outer surface 128 of the main shaft 12 is further provided with a glue filling hole 16 penetrating through the outer surface 128 and the inner surface 127 of the main shaft 12. The glue filling hole 16 is located at the tail end 122 of the main shaft 12 and is used for glue injection to secure the main shaft 12 to the optical fiber 40. The tail end 122 of the main shaft 12 can be further secured to the optical fiber fixing component 50. In this way, when the optical fiber fixing component 50 is secured to the tail end 122 of the main shaft 12 and is wrapped on the glue filling hole 16, the glue filling hole 16 can be sealed, thereby ensuring that the main shaft 12 has good sealing performance. In addition, due to the fixed connection between the main shaft 12 and the optical fiber fixing component 50, the main shaft 12 can be further firmly secured to the optical fiber 40 by using a connecting function of the optical fiber fixing component 50.

For example, an external thread 1283 may be disposed on the outer surface 128 of the main shaft, and an internal thread 511 may be disposed on an inner surface of the optical fiber fixing component 50, so that the optical fiber fixing component 50 is in threaded connection to the main shaft 12. The threaded connection structure is simple and also has relatively strong locking performance, so that the main shaft 12 can be tightly connected to the optical fiber fixing component 50.

Therefore, the first limiting structure 1271 is disposed on the inner surface 127 of the main shaft 12 in a direction from the head end 121 of the main shaft 12 to the tail end 122 of the main shaft 12. The second guide structure 14, the sealing groove 1282, the external thread 1281 for connecting to the dust-proof cap 60, the second locking structure 126, the external thread 1283 for connecting to the optical fiber fixing component 50, and the glue filling hole 16 are successively disposed on the outer surface of the shaft body 125.

Based on the foregoing description, the end face 123 of the head end 121 of the main shaft 12 in this embodiment can be connected to the outer frame sleeve 11. The inner surface 127 of the main shaft 12 can accommodate the fixing sleeve 30, the ferrule assembly 20, and the optical fiber 40, and can further limit the ferrule assembly 20 through cooperation between the first limiting structure 1271 and the second limiting structure 222 of the ferrule assembly 20. The second guide structure 14 can cooperate with the first guide structure 13 of the outer frame sleeve 11 to limit rotation of the optical fiber connector plug 100. The sealing groove 1282 enables the dust-proof cap 60 or the optical fiber adapter 200 to have good sealing performance. The external thread 1281 can be detachably connected to the dust-proof cap 60. The second locking structure 126 can be locked with the first locking structure 230 of the optical fiber adapter 200. The external thread 1283 can secure the optical fiber fixing component 50. The glue filling hole 16 can be used for glue injection to secure the main shaft 12 to the optical fiber 40 and can be provided on the outer surface 128 of the main shaft 12. Therefore, the structure arrangement of the main shaft 12 can adapt to a requirement of diversified scenarios, thereby achieving strong practicability and a wide application range. In addition, the outer surface 128 of the main shaft 12 directly forms an appearance structure of the optical fiber connector plug 100. This can effectively reduce a quantity of parts of the optical fiber connector plug 100, thereby facilitating miniaturization of the optical fiber connector plug 100.

In this embodiment, the outer frame sleeve 11 is located at a front end part of the housing 10, and the main shaft 12 is located at a rear end part of the housing 10. Through cooperation between the outer frame sleeve 11 and the main shaft 12, the housing 10 can present an elegant appearance structure, and can further accommodate the ferrule assembly 20, the fixing sleeve 30, and the optical fiber 40. The following describes in detail structures of the ferrule assembly 20, the fixing sleeve 30, and the optical fiber 40 successively.

Refer to FIG. 10 and FIG. 13, the ferrule assembly 20 includes a ferrule 21, a ferrule base 22, and an elastic component 23. The ferrule 21 is secured to one end of the ferrule base 22, and forms a gap 24 with the ferrule base 22. The elastic component 23 is located in the gap 24, one end of the elastic component 23 abuts against the ferrule 21, and the other end of the elastic component 23 abuts against the ferrule base 22. In other words, the elastic component 23 elastically abuts between the ferrule 21 and the ferrule base 22, so that under an action of an elastic force of the elastic component 23, the ferrule 21 and the ferrule base 22 can be kept tensioned. The ferrule 21 and the ferrule base 22 are not easy to loosen even if they are subject to long-time vibration. This helps to enhance long-term reliability of the ferrule assembly 20.

Both the ferrule 21 and the elastic component 23 are accommodated in the outer frame sleeve 11. The ferrule base 22 is partially accommodated in the outer frame sleeve 11 and is partially accommodated in the main shaft 12. Therefore, the entire ferrule assembly 20 is located at the front end part of the housing 10, and can be plugged into the ferrule assembly 20 of the opposite connector plug 300 to implement optical signal transmission.

Figure 17:
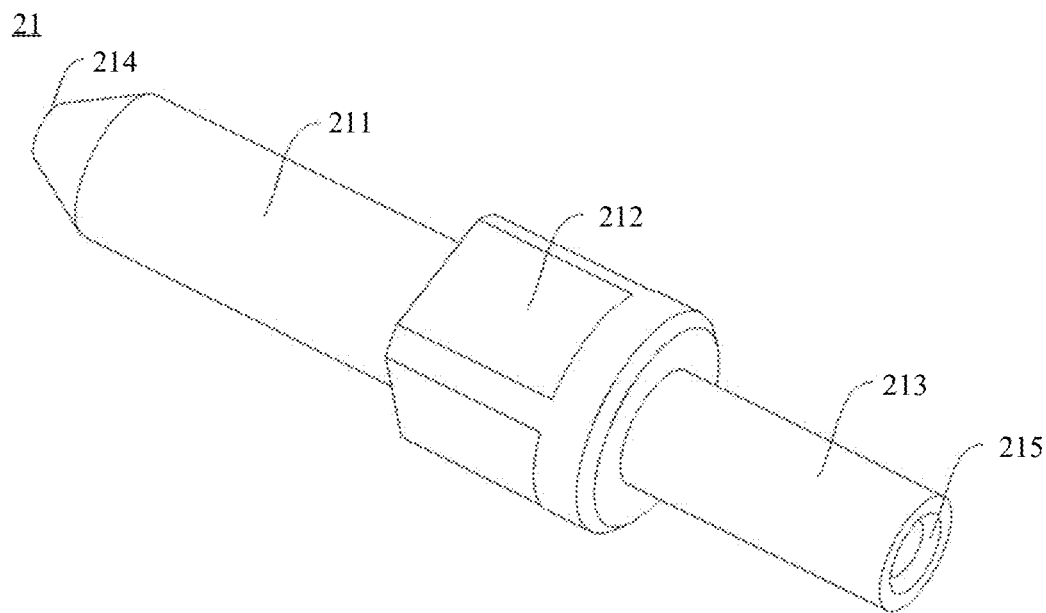
FIG. 17 is a diagram of a ferrule of the optical fiber connector plug shown in FIG. 7.

Refer to FIG. 8, FIG. 13, and FIG. 17. The ferrule 21 includes a front section 211, a middle section 212, and a rear section 213 that are successively connected. The front section 211, the middle section 212, and the rear section 213 are all roughly columnar. For example, the front section 211 is a combination of a cylindrical shape and a truncated cone shape, and the middle section 212 and the rear section 213 are both cylindrical.

A surface of the front section 211 away from the middle section 212 is a front end face 214 of the ferrule 21 and is also the front end face of the ferrule assembly 20 described above. Therefore, the front end face 214 of the ferrule 21 can be protected by the outer frame sleeve 11 from suffering bumping. In addition, a worker can see at least the front end face 214 of the ferrule 21 when directly facing and looking at the outer surface 116 of the outer frame sleeve 11 provided with the notch 117. Based on this, during connecting of the optical fiber connector plug 100 to the optical fiber adapter 200, the worker can see a position of the ferrule 21, so that the front end face 214 of the ferrule 21 and an end face of the ferrule 330 of the opposite connector plug 300 can be connected to each other by aligning the ferrule 21 with the optical fiber adapter 200. In this way, optical signal transmission between the optical fiber connector plug 100 and the opposite connector plug 300 is implemented. A plugging success rate is increased and the ferrule 21 is prevented from being collided for a plurality of times due to incorrect plugging to prevent the ferrule 21 from being damaged.

A part that is of the middle section 212 and that is corresponding to a largest outer diameter tightly abuts against the fixing sleeve 30 to enhance connection stability and reliability between the middle section 212 and the fixing sleeve 30, so that the middle section 212 can be tightly secured to the fixing sleeve 30.

A fiber core fixing hole 215 is disposed in the rear section 213. The fiber core fixing hole 215 is formed on a surface of the rear section 213 away from the middle section 212 and extends in the axial direction and is configured to plug a fiber core 41 of the optical fiber 40 to connect the ferrule 21 to the fiber core 41. In addition, one end of the rear section 213 away from the middle section 212 is further secured to the ferrule base 22 so that the ferrule 21 can be fixedly connected to the ferrule base 22.

It may be understood that because one end of the rear section 213 of the ferrule 21 away from the middle section 212 is secured to the ferrule base 22, the gap 24 between the ferrule 21 and the ferrule base 22 is formed between the ferrule base 22 and the middle section 212 of the ferrule 21. The elastic component 23 may be located in the gap 24 and abuts against the ferrule 21 and the ferrule base 22. For example, the elastic component 23 may be a spring, and the spring is sleeved on the rear section 213 of the ferrule 21, and elastically abuts between the middle section 212 of the ferrule 21 and the ferrule base 22.

Figure 18:
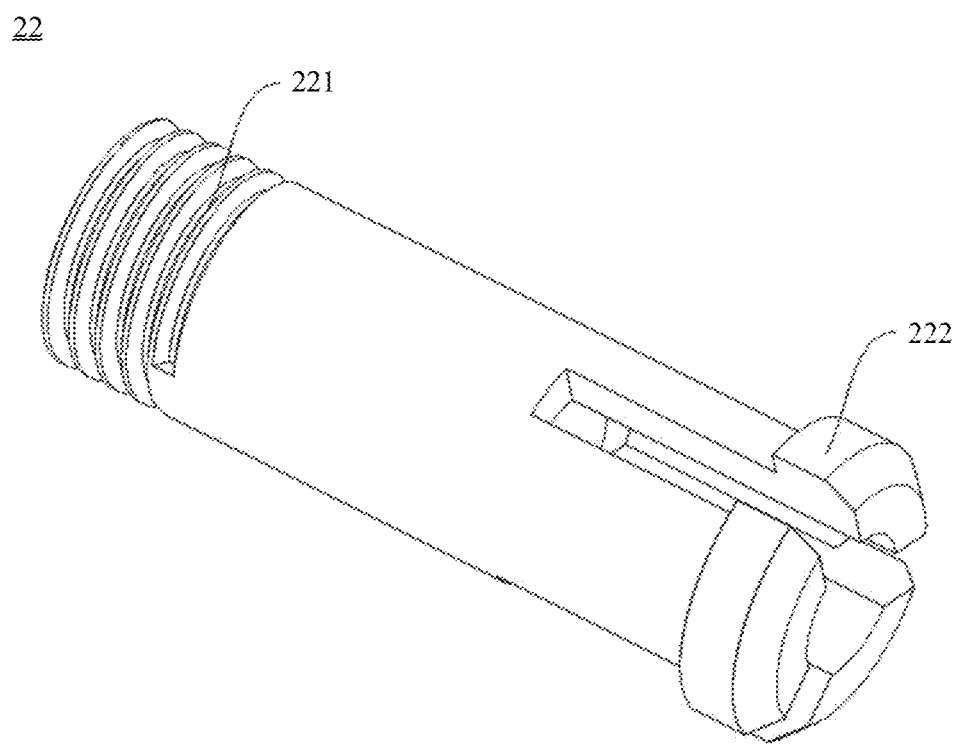
FIG. 18 is a diagram of a ferrule base of the optical fiber connector plug shown in FIG. 7.
Figure 19:
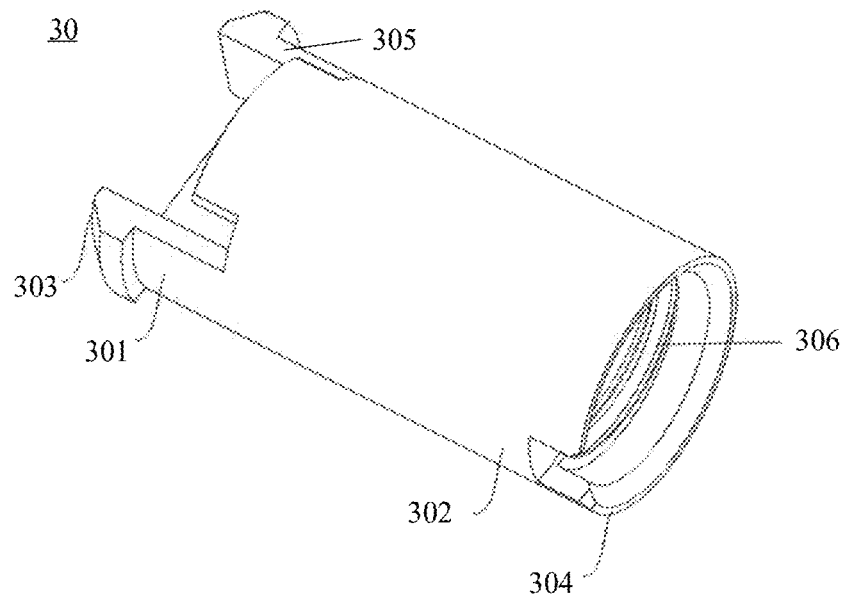
FIG. 19 is a diagram of a fixing sleeve of the optical fiber connector plug shown in FIG. 7.

Refer to FIG. 10, FIG. 13, and FIG. 18, the ferrule base 22 is in a sleeve shape, and an external thread 221 and the second limiting structure 222 are successively disposed on an outer surface of the ferrule base 22. The external thread 221 is located at one end of the ferrule base 22 close to the ferrule 21, and is configured to cooperate with an internal thread 31 of the fixing sleeve 30 for securing, to limit movement of the ferrule assembly 20 in the axial direction and rotation of the ferrule assembly 20 in the circumferential direction.

The second limiting structure 222 is configured to cooperate with the first limiting structure 1271 of the main shaft 12, to limit movement of the ferrule assembly 20 in the axial direction to prevent the ferrule assembly 20 from being removed from the main shaft 12. For example, the second limiting structure 222 may be a flange protruding on the outer surface of the ferrule base 22, and the flange is located at one end of the ferrule base 22 away from the ferrule 21, to abut against the first limiting structure 1271. Due to existence of the flange, the ferrule base 22 can be used for positioning and installing the ferrule assembly 20 without adding an additional component, thereby implementing a simple operation and a reliable connection.

Based on the foregoing description, the ferrule 21 of the ferrule assembly 20 can be connected to the ferrule 330 of the opposite connector plug 300 to implement optical signal transmission. The elastic component 23 of the ferrule assembly 20 may elastically abut between the ferrule 21 and the ferrule base 22 so that the ferrule assembly 20 is not excessively loose, and integrity of the ferrule assembly 20 is improved. The ferrule base 22 of the ferrule assembly 20 can secure the ferrule 21 and can also cooperate with the main shaft 12 to limit movement of the ferrule assembly 20 in the axial direction, thereby ensuring that the ferrule assembly 20 is not removed from the main shaft 12. Therefore, the structure configuration of the ferrule assembly 20 can adapt to a requirement of diversified scenarios, thereby achieving strong practicability and a wide application range.

Refer to FIG. 11, FIG. 13, FIG. 17, FIG. 19, and FIG. 20, the fixing sleeve 30 is in a sleeve shape, is located between the outer frame sleeve 11 and the ferrule assembly 20, is fixedly connected to both the outer frame sleeve 11 and the ferrule assembly 20, and can accommodate a part of the ferrule assembly 20.

The ferrule 21, the fixing sleeve 30, and the outer frame sleeve 11 are successively stacked in the radial direction, and the outer frame sleeve 11 is sleeved at a periphery of the fixing sleeve 30. The fixing sleeve 30 is sleeved to the middle section 212 of the ferrule 21 so that the rear section 213 of the ferrule 21 is located inside the fixing sleeve 30, and the front section 211 of the ferrule 21 extends out of the fixing sleeve 30. This arrangement can prevent the fixing sleeve 30 from blocking and interfering with the front end face 214 of the ferrule 21, so that the front end face 214 of the ferrule 21 can be exposed in the outer frame sleeve 11, and can be further connected to the opposite connector plug 300, thereby ensuring connection precision.

The fixing sleeve 30 is in a sleeve shape and includes a front end 301 and a rear end 302. The front end 301 of the fixing sleeve 30 is one end connected to the ferrule 21, and a front end face 303 of the fixing sleeve 30 is coplanar with a surface of the middle section 212 of the ferrule 21 away from the rear section 213. The rear end 302 of the fixing sleeve 30 is one end facing the main shaft 12. A rear end face 304 of the fixing sleeve 30 is coplanar with the rear end face 114 of the outer frame sleeve 11 and together they form an abutment surface A. The abutment surface A is connected to the end face 123 of the head end 121 of the main shaft 12. Therefore, the fixing sleeve 30 can be precisely connected to the main shaft 12 to ensure that the fixing sleeve 30 fits the main shaft 12 and improve tightness of the connection to the main shaft 12.

A clamping hook 305 protrudes on the outer surface of the fixing sleeve 30. The clamping hook 305 is located at the front end 301 of the fixing sleeve 30 and is configured to cooperate with the clamping hole 118 (or the clamping groove) of the outer frame sleeve 11 to secure the front end 301 of the fixing sleeve 30 to the outer frame sleeve 11. In this way, movement of the ferrule assembly 20 in the axial direction and rotation of the ferrule assembly 20 in the circumferential rotation can be limited by using a connection relationship between the fixing sleeve 30 and the ferrule assembly 20, thereby ensuring connection stability and reliability of the ferrule assembly 20. For example, there are two clamping hooks 305, the two clamping hooks 305 are symmetrically disposed, and each clamping hook 305 is clamped with one clamping hole 118 (or one clamping groove) of the outer frame sleeve 11 in a cooperation manner.

An internal thread 306 is disposed on an inner surface of the fixing sleeve 30 and the internal thread 306 is located at the rear end 302 of the fixing sleeve 30 and is configured to cooperate with an external thread 1283 of the ferrule base 22 to secure the rear end 302 of the fixing sleeve 30 to the ferrule base 22. This limits movement of the ferrule assembly 20 in the axial direction and rotation of the ferrule assembly 20 in the circumferential rotation.

Based on the foregoing description, the fixing sleeve 30 can accommodate the ferrule 21 and a part of the ferrule base 22, thereby further ensuring stability and reliability of the ferrule assembly 20 during installation. In addition, the fixing sleeve 30 can be fixedly connected to the ferrule assembly 20 and can also be fixedly connected to the outer frame sleeve 11 so that the outer frame sleeve 11 and the ferrule assembly 20 can be relatively fixed through connection of the fixing sleeve 30. This effectively prevents the ferrule assembly 20 from rotating in the circumferential direction and moving in the axial direction in the outer frame sleeve 11. Therefore, the arrangement of the fixing sleeve 30 can adapt to a requirement of diversified scenarios, thereby achieving strong practicability and a wide application range.

Figure 21:
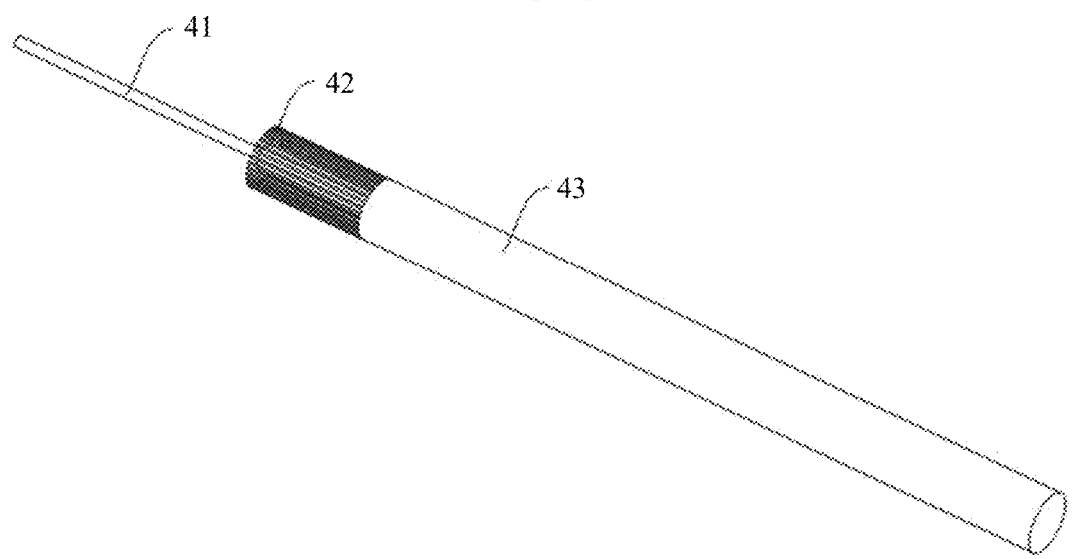
FIG. 21 is a diagram of an optical fiber of the optical fiber connector plug shown in FIG. 7.
Figure 22:
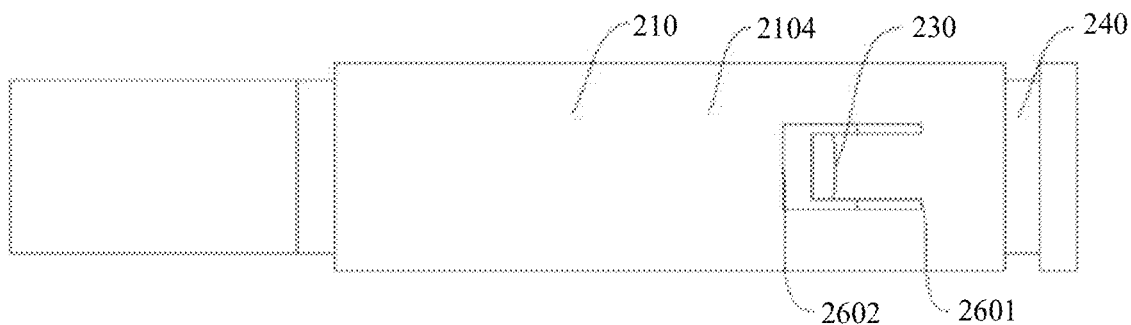
FIG. 22 is a diagram of an optical fiber adapter according to the first embodiment of this application.

Refer to FIG. 13, FIG. 17, and FIG. 21. The optical fiber 40 includes a fiber core 41, a cladding layer 42, and an outer layer 43 that are successively disposed in a radial direction. The cladding layer 42 is wrapped around the fiber core 41, and the outer layer 43 is wrapped around the cladding layer 42, thereby forming the optical fiber 40 of a multi-layer structure. The optical fiber 40 can be plugged into the through-hole 129 of the main shaft 12.

It may be understood that, a part of the fiber core 41 extends out of the cladding layer 42 for connecting to the ferrule 21 and for connecting to the fiber core fixing hole 215 of the rear section 213 of the ferrule 21. A part of the outer layer 43 forms a reinforcing section 44 with a plurality of slits, and the reinforcing section 44 with the plurality of slits presents a fence shape and is disposed around the cladding layer 42. The plurality of slits are used for allowing glue injected through the glue filling hole 16 to flow so that the glue secures the reinforcing section 44 to the inner surface 127 of the main shaft 12, thereby securing the optical fiber 40 to the main shaft 12 and improving tensile strength of the optical fiber connector plug 100. For example, the reinforcing section 44 may be made of aramid, steel wire, or fiber reinforced polymer/plastic (FRP).

Considering that the optical fiber 40 needs to be tightly connected to the main shaft 12 to ensure that there is no looseness, in this embodiment the optical fiber fixing component 50 is secured to the tail end 122 of the main shaft 12 to further ensure retention stability and reliability of the optical fiber 40 and the main shaft 12.

Figure 20:
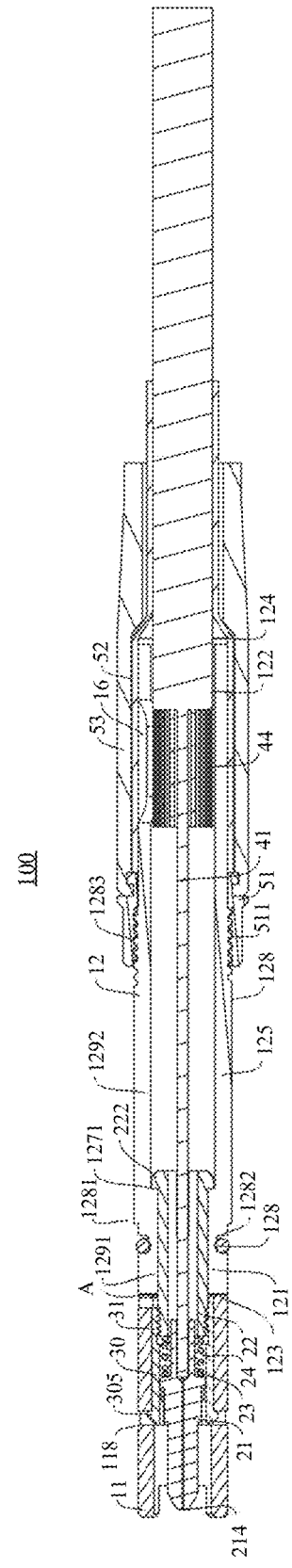
FIG. 20 is another cross-sectional view of the optical fiber connector plug shown in FIG. 7.

Refer to FIG. 10, FIG. 13, and FIG. 20, the optical fiber fixing component 50 includes a fixing base 51, a heat shrink tubing 52, and a tail sleeve 53. The fixing base 51 is in a sleeve shape, and an internal thread 511 is disposed on an inner surface of the fixing base 51. The internal thread 511 is configured to, when the fixing base 51 is sleeved on the tail end 122 of the main shaft 12, cooperate with an external thread 1283 at the tail end 122 of the main shaft 12 to secure the fixing base 51 to the tail end 122 of the main shaft 12. Therefore, the fixing base 51 can be sleeved and secured to the tail end 122 of the main shaft 12.

The heat shrink tubing 52 is in a sleeve shape, and can be sleeved and overlap the tail end 122 of the main shaft 12 and the optical fiber 40, and one end of the heat shrink tubing 52 facing the fixing base 51 can abut against the fixing base 51. In addition, the heat shrink tubing 52 may be further covered on the glue filling hole 16 to seal the glue filling hole 16.

The tail sleeve 53 is in a sleeve shape, and can be sleeved to peripheries of the heat shrink tubing 52 and the fixing base 51, and one end of the tail sleeve 53 can be secured to the fixing base 51. This can effectively secure the optical fiber 40 at a tail end of the optical fiber connector plug 100. For example, the fixing base 51 is provided with a clamping groove 512, and one end of the tail sleeve 53 is elastically clamped in the clamping groove 512 to secure the tail sleeve 53 to the fixing base 51 and prevent the tail sleeve 53 from moving in the axial direction.

In an embodiment, a mark (not shown in the figure) may be disposed on an outer surface of the tail sleeve 53 to perform port identification and route management. For example, the mark may be a one-dimensional barcode imprinted by using a technique such as impression or laser marking. Therefore, manual operation workload caused by performing paper label recording and sticking a paper label to the outer surface of the tail sleeve 53 can be greatly reduced, and labor costs can be effectively reduced. In addition, different optical fibers 40 and ports of ODN devices can be quickly distinguished, an error rate is relatively low, data can be updated in time, and operation and maintenance efficiency is high. In addition, the imprinted one-dimensional barcode is not easily damaged and is not easily blurred with time. This reduces complexity of ODN device management and maintenance, and improves quality maintenance and detection efficiency.

Based on the foregoing description, the optical fiber fixing component 50 can effectively ensure connection stability and reliability between the optical fiber 40 and the main shaft 12.

The structure of the optical fiber connector plug 100 provided in the first embodiment has been fully described above, and the optical fiber adapter 200 provided in the first embodiment is described in detail below.

Refer to FIG. 14, FIG. 22, FIG. 23, and FIG. 24. The optical fiber adapter 200 includes an adapter body 210, a ferrule sleeve 220, a first locking structure 230, and a pressing member 240. The adapter body 210 is configured to accommodate a part of the optical fiber connector plug 100 and a part of the opposite connector plug 300. The ferrule sleeve 220 is accommodated in the adapter body 210, and is configured to enable the ferrule 21 of the optical fiber connector plug 100 to be connected to the ferrule 330 of the opposite connector plug 300 in the ferrule sleeve 220, to implement optical signal transmission. The first locking structure 230 is disposed on the adapter body 210 and is configured to cooperate with the second locking structure 126 of the optical fiber connector plug 100 to secure the optical fiber adapter 200 to the optical fiber connector plug 100. The pressing member 240 is connected to an inner surface 2103 of the adapter body 210, and the pressing member 240 can slide relative to the adapter body 210 and is configured to drive, based on a pressing force, the first locking structure 230 to be unlocked from the second locking structure 126. In other words, the pressing member 240 is slidably connected to the adapter body 210.

For ease of understanding, the following explains and describes related technical terms related to the optical fiber adapter 200 in this embodiment.

Axial direction: It may be understood as a direction in which a central axis of the optical fiber adapter 200 is located, and is equivalent to an extension direction of the adapter body 210, the ferrule sleeve 220, and the pressing member 240.

Circumferential direction: It may be understood as a circumferential direction around the central axis of the optical fiber adapter 200.

Radial direction: a direction perpendicular to the axial direction

Sleeve shape: It is sleeved on an outer surface of a long strip-shaped object to protect and strengthen fixing or connection; a sleeve-shaped component includes a cylindrical (or tubular) housing, there is hollow space in the housing, and both end faces of the cylindrical (or tubular) housing are provided with openings, and the long strip-shaped object may enter or pass through the sleeve-shaped component through the two openings. The sleeve-shaped component includes two end faces and an outer surface (also referred to as a peripheral surface) connected between the two end faces. An axial direction of the sleeve-shaped component is a direction extending from one end face of the sleeve-shaped component to the other end face thereof. A circumferential direction of the sleeve-shaped component is a direction surrounding the outer surface. The axial direction of the sleeve-shaped component is a direction extending vertically from an inner surface of the sleeve-shaped component to the outer surface thereof, and may be understood as being perpendicular to the axial direction of the sleeve-shaped component.

Refer to FIG. 14, FIG. 22, FIG. 23, FIG. 24, and FIG. 25, the adapter body 210 is in a sleeve shape, and is internally provided with accommodating space 2105 for accommodating the ferrule sleeve 220. The adapter body 210 includes a first end face 2101 and a second end face 2102 that are disposed opposite to each other, and an inner surface 2103 and an outer surface 2104 that are connected to the first end face 2101 and the second end face 2102. A first slot 2106 matching the optical fiber connector plug 100 is concavely disposed on the first end face 2101, and the first slot 2106 is in communication with the accommodating space 2105. A second slot 2107 matching the opposite connector plug 300 is concavely disposed on the second end face 2102, and the second slot 2107 is in communication with the accommodating space 2105. Therefore, it should be understood that space in the adapter body 210 is divided into three regions (the first slot 2106, the accommodating space 2105, and the second slot 2107). The three regions are in communication with each other and are respectively used to accommodate the optical fiber connector plug 100, the ferrule sleeve 220, and the opposite connector plug 300.

In an embodiment, a guide key 290 protrudes on the inner surface 2103 of the adapter body 210. The guide key 290 extends in the axial direction. The guide key 290 is configured to cooperate with the guide structure 15 of the optical fiber connector plug 100. Therefore, when the optical fiber connector plug 100 is plugged into the optical fiber adapter 200, the guide key 290 can be correspondingly plugged into the guide structure 15 of the optical fiber connector plug 100. This can prevent the optical fiber connector plug 100 from rotating relative to the optical fiber adapter 200, and ensure stability of the optical fiber connector plug 100 and the optical fiber adapter 200 during plugging. For example, the guide key 290 protrudes on an inner slot wall of the first slot 2106.

A baffle plate 250, a mounting groove 260, and a first stop structure 270 are disposed on the outer surface 2104 of the adapter body 210. The baffle plate 250 protrudes on the outer surface 2104 of the adapter body 210 in the circumferential direction. The baffle plate 250 is configured to be secured to a box body 1110 of the housing 1100 and has a stopping function so that the optical fiber adapter 200 can be partially located inside the box body 1110 and partially located outside the box body 1110. For example, the baffle plate 250 may be an annular baffle plate surrounding the outer surface 2104 of the adapter body 210, or the baffle plate 250 may be an arc-shaped baffle plate partially surrounding the outer surface 2104 of the adapter body 210.

The mounting groove 260 penetrates through the inner surface 2103 and the outer surface 2104 of the adapter body 210 and is in communication with the first slot 2106. The mounting groove 260 can provide mounting space for the first locking structure 230. The mounting groove 260 includes a first groove wall 2601 and a second groove wall 2602 that are disposed opposite to each other in the axial direction, and the first groove wall 2601 is disposed close to a plug interface 2109 of the first slot 2106 relative to the second groove wall 2602. The first groove wall 2601 is used for connection to the first locking structure 230.

The first stop structure 270 is a hole-like structure disposed on the outer surface of the adapter body 210, and the first stop structure 270 penetrates through the outer surface 2104 and the inner surface 2103 of the adapter body 210 and is in communication with the first slot 2106. The first stop structure 270 is configured to cooperate with a second stop structure 243 of the pressing member 240 to prevent the pressing member 240 from being removed from the adapter body 210 from one end that is of the adapter body 210 and at which the plug interface 2109 of the first slot 2106 is disposed. In this way, the pressing member 240 can be stopped on the adapter body 210 to prevent the pressing member 240 from being detached from the adapter body 210, thereby improving connection reliability between the pressing member 240 and the adapter body 210. For example, the first stop structure 270 is a clamping hole and may be configured to be clamped with the second stop structure 243.

For example, there are two mounting grooves 260 and two first stop structures 270, and the two mounting grooves 260 are symmetrically disposed to be respectively connected to two first locking structures 230 to improve force uniformity and balance of the adapter body 210. The two first stop structures 270 are also symmetrically disposed to respectively cooperate with two second stop structures 243 to improve connection reliability between the adapter body 210 and the pressing member 240. It should be understood that the mounting groove 260 and the first stop structure 270 are disposed on different planes. The outer surface 2104 of the adapter body 210 includes four surfaces that are successively connected, and every two of the four surfaces form one group and are disposed opposite to each other. The two mounting grooves 260 are respectively disposed on two surfaces that are in one of the two groups and that are disposed opposite to each other, and the two first stop structures 270 are disposed on two surfaces that are in the other of the two groups and that are disposed opposite to each other. In this way, each mounting groove 260 and one first stop structure 270 are disposed on different planes to ensure layout appropriateness of each structure of the adapter body 210.

The ferrule sleeve 220 is in a sleeve shape, and can be secured to the accommodating space 2105 in the adapter body 210. Openings at both ends of the ferrule sleeve 220 can respectively allow the ferrule 21 of the optical fiber connector plug 100 and the ferrule 330 of the opposite connector plug 300 to pass through so that the ferrule 21 of the optical fiber connector plug 100 and the ferrule 330 of the opposite connector plug 300 are connected to each other in the ferrule sleeve 220. In other words, end faces of two optical fibers that need to be connected to each other are connected to each other. In this way, an optical signal of an optical fiber connected to the opposite connector plug 300 can be coupled to the optical fiber 40 connected to the optical fiber connector plug 100 to a maximum extent, thereby improving optical signal coupling efficiency. For example, the ferrule sleeve 220 may be made of ceramic or bronze, and the ferrule sleeve 220 may be secured in the accommodating space 2105 through ultrasonic welding to improve stability of the ferrule sleeve 220 in the accommodating space 2105.

The first locking structure 230 is configured to cooperate with the second locking structure 126 of the optical fiber connector plug 100 to secure the optical fiber adapter 200 to the optical fiber connector plug 100. The first locking structure 230 is an elastic structure having elasticity, and the first locking structure 230 can be elastically connected to the first groove wall 2601, to be locked with or unlocked from the second locking structure 126 through elastic deformation. For example, there may be two first locking structures 230, and the two first locking structures 230 are symmetrically disposed. Therefore, locking forces can be distributed more evenly, and the optical fiber connector plug 100 can be prevented from being detached from the optical fiber adapter 200. In addition, the first locking structure 230 may alternatively be integrated with the adapter body 210. The integration design can reduce process steps and ensure overall strength of the optical fiber adapter 200.

Figure 23:
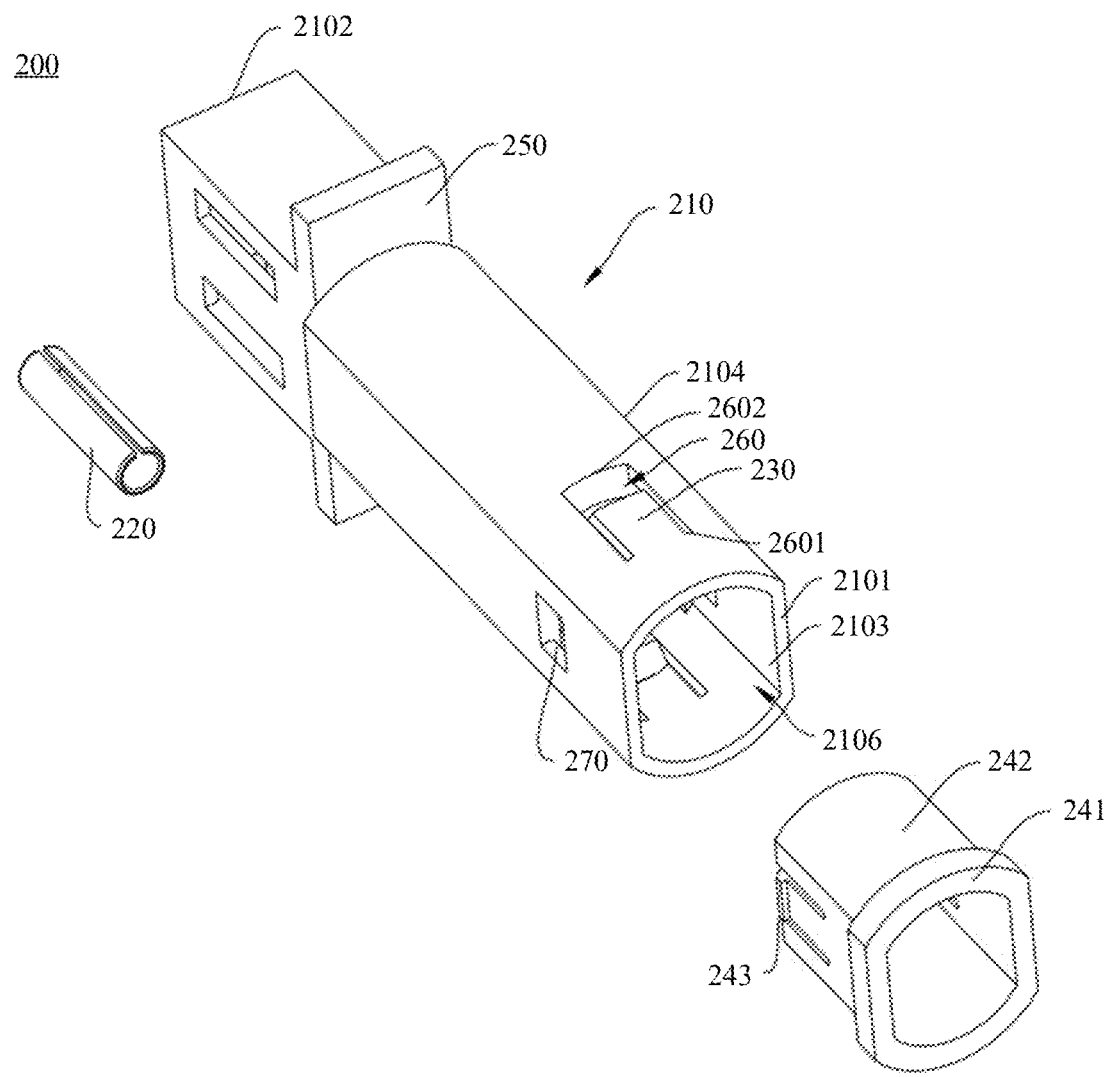
FIG. 23 is an exploded diagram of the optical fiber adapter shown in FIG. 22.
Figure 24:
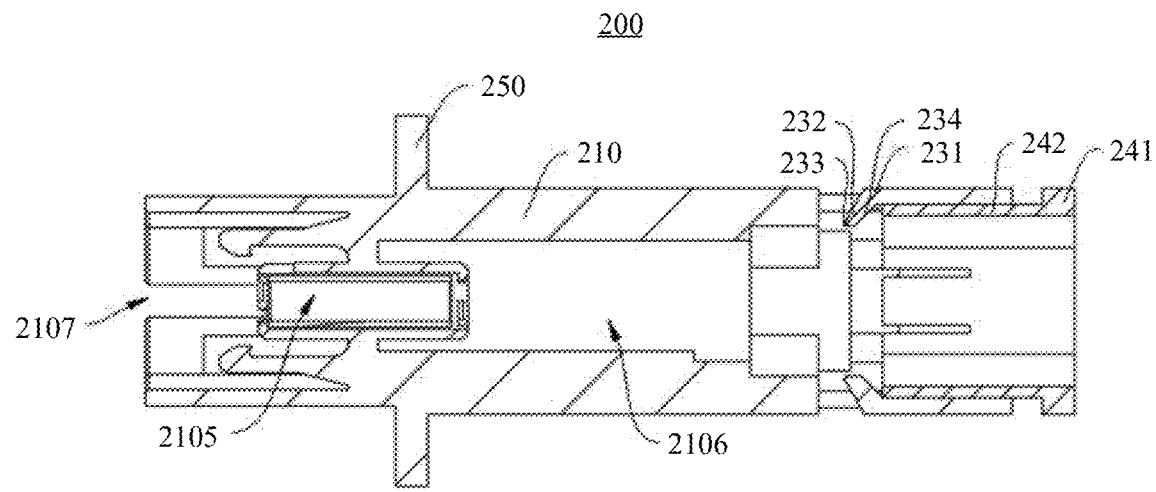
FIG. 24 is a cross-sectional view of the optical fiber adapter shown in FIG. 22.
Figure 25:
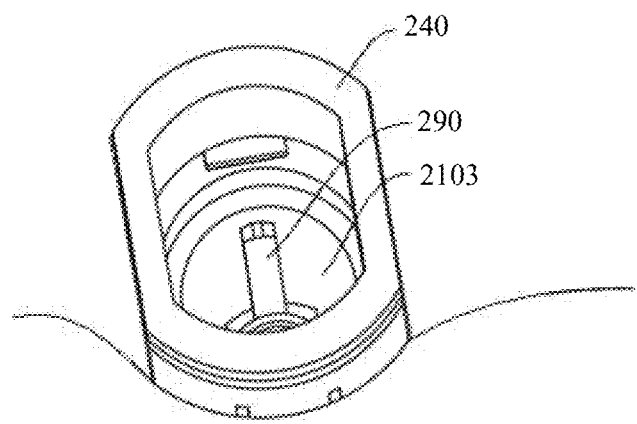
FIG. 25 is a diagram of a partial structure of the optical fiber adapter shown in FIG. 22.
Figure 26:
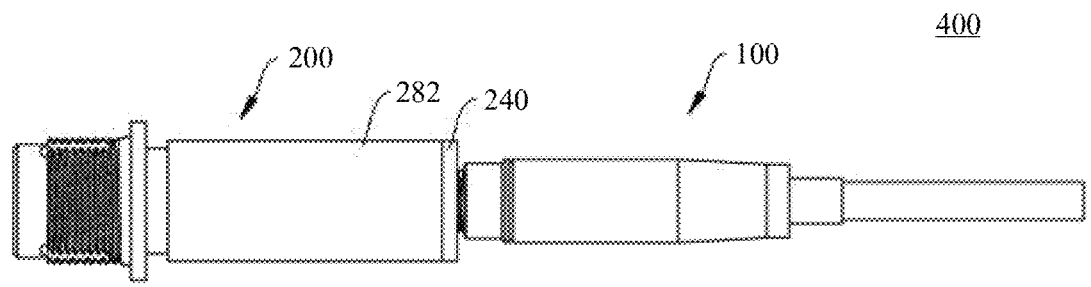
FIG. 26 is a diagram of a structure of the assembly of an optical fiber connector plug and an optical fiber adapter according to a second embodiment of this application.

Refer to FIG. 14, FIG. 23, and FIG. 24. The first locking structure 230 includes a first part 231 and a second part 232. The first part 231 is a part that can connect the entire first locking structure 230 to the adapter body 210. The second part 232 is a part that can abut against the second locking structure 126, and the second part 232 is also a part that can drive, under an action of a pressing force of the pressing member 240, the entire first locking structure 230 to be elastically deformed.

The first part 231 is connected to the first groove wall 2601 and extends in the axial direction. The second part 232 is bent and connected to one end of the first part 231 away from the first groove wall 2601, and the second part 232 extends toward an interior of the first slot 2106 and forms an included angle with the first part 231. In other words, the second part 232 extends in a direction inclined with respect to the axial direction. For example, the first part 231 and the second part 232 are arranged at an obtuse angle, so that the first locking structure 230 presents a shape like a Chinese character "chang". The arrangement of the shape helps the pressing member 240 to subsequently drive the first locking structure 230 to be elastically deformed, thereby facilitating labor saving.

In addition, at least a part of the second part 232 is located inside the first slot 2106. In this case, when the optical fiber connector plug 100 extends into the optical fiber adapter 200, the part of the second part 232 can be more conveniently in contact with the second locking structure 126 of the optical fiber connector plug 100, thereby locking the optical fiber adapter 200 and the optical fiber connector plug 100. In addition, when the pressing member 240 is driven to slide, the pressing member 240 can apply a force to the first locking structure 230 to separate the first locking structure 230 from the second locking structure 126, thereby unlocking the optical fiber adapter 200 from the optical fiber connector plug 100.

Still refer to FIG. 14, FIG. 23, and FIG. 24. A surface of the second part 232 facing the second groove wall 2602 is a first matching surface 233, and the first matching surface 233 is configured to abut against a second matching surface 1263 of the second locking structure 126. The first matching surface 233 is disposed, so that the first matching surface 233 can abut against the second matching surface 1263 to implement fixing of the first locking structure 230 and the second locking structure 126, and to further implement fixing of the optical fiber adapter 200 and the optical fiber connector plug 100. In a surface-to-surface contact form, a contact area between the first locking structure 230 and the second locking structure 126 can be increased and contact stress can be reduced accordingly.

Because the first matching surface 233 needs to abut against the second matching surface 1263, and the second matching surface 1263 is inclined with respect to the axial direction, the first matching surface 233 is also inclined with respect to the axial direction. In other words, the second matching surface 1263 is arranged in parallel with the first matching surface 233. Therefore, matching between the first matching surface 233 and the second matching surface 1263 is inclined surface matching. Inclined surface matching is configured so that quick alignment can be implemented between the first locking structure 230 and the second locking structure 126. This not only reduces difficulty of interconnection between the first locking structure 230 and the second locking structure 126, but also increases a contact area between the first locking structure 230 and the second locking structure 126, thereby further improving interconnection tightness.

A surface of the second part 232 facing away from the second groove wall 2602 is an abutment surface 234, and the abutment surface 234 is a surface that is of the second part 232 and that is to be in contact with the pressing member 240. When the second locking structure 126 of the optical fiber connector plug 100 is in contact with the abutment surface 234, an acting force is applied to the second part 232, so that the entire first locking structure 230 can be driven to be elastically deformed to be opened. In this case, the second locking structure 126 smoothly passes over the first locking structure 230 and moves in a direction of the ferrule sleeve 220, and further the first locking structure 230 rebounds for resetting due to an elastic force, to be in contact with and locked with the second locking structure 126. When the pressing member 240 is in contact with the abutment surface 234, an acting force is applied to the second part 232 so that the entire first locking structure 230 can be driven to be elastically deformed to be switched from a locked state (in which the first locking structure 230 and the second locking structure 126 are in contact with each other) to an unlocked state (in which the first locking structure 230 and the second locking structure 126 are separated from each other).

In an embodiment, the abutment surface 234 is inclined with respect to the axial direction. Therefore, when the pressing member 240 is in contact with the abutment surface 234 because the abutment surface 234 is disposed as an inclined surface, a contact part between the pressing member 240 and the abutment surface 234 is relatively small and a force bearing area of the abutment surface 234 is relatively small. Therefore, the pressing member 240 can cause obvious elastic deformation on the second part 232 based on a specific pressing force, and the first locking structure 230 and the second locking structure 126 can be more conveniently and accurately separated from each other to be unlocked from each other.

In another embodiment, the abutment surface 234 is perpendicular to the axial direction, in other words, the abutment surface 234 is parallel to the radial direction.

Based on the foregoing description, because the first locking structure 230 has elasticity, when the optical fiber connector plug 100 is plugged into the optical fiber adapter 200 and the optical fiber connector plug 100 is unplugged from the optical fiber adapter 200, the first locking structure 230 is squeezed to be elastically deformed. Therefore, the first locking structure 230 only needs to rely on elastic deformation of the first locking structure 230 to abut against or to be separated from the second locking structure 126, thereby achieving a simple operation, time saving, and high reliability.

Refer to FIG. 23 and FIG. 24, the pressing member 240 is in a sleeve shape and includes a pressing part 241 and a sliding part 242. The sliding part 242 is connected to one end of the pressing part 241, and a center line of the sliding part 242 is co-linear with a center line of the pressing part 241.

It may be understood that, the pressing part 241 is a part that is located outside the adapter body 210 and that can be used by a worker to apply a force. When the worker applies a force to this part, the pressing member 240 can be subject to a force so that the entire pressing member 240 slides in the first slot 2106. The sliding part 242 is a part that is located inside the adapter body 210 and that can slide relative to the first slot 2106 in the first slot 2106. In other words, the sliding part 242 can slide relative to the adapter body 210. Under driving of a pressing force applied to the pressing part 241, this part can be driven to move in the first slot 2106 in a direction toward the accommodating space 2105 to press against the first locking structure 230 to make the first locking structure 230 elastically deformed to be opened outward, to be detached from the second locking structure 126 to be unlocked from the second locking structure 126.

For example, an outer diameter of the pressing part 241 is larger than an outer diameter of the sliding part 242. In this way, a larger contact area can be provided, and it is convenient for a worker to apply a force. In addition, when the sliding part 242 is slidably connected to the first slot 2106, there can be a stopping effect, so that the pressing member 240 does not completely slide into the adapter body 210 to avoid interference on a component of the optical fiber connector plug 100. Therefore, the pressing member 240 has dual performance of convenient force application and stopping, thereby achieving strong practicability and a wide application range.

The outer diameter of the pressing part 241 is larger than an outer diameter of the plug interface 2109 of the first slot 2106, and a shape of an outer contour of the pressing part 241 matches a shape of the plug interface 2109 of the first slot 2106. In this case, the pressing part 241 can be confined to be outside the adapter body 210 and only the sliding part 242 is located inside the adapter body 210. It should be understood that because the sliding part 242 may slide relative to the adapter body 210, the entire sliding part 242 may be located inside the adapter body 210, or only a part of the sliding part 242 may be located inside the adapter body 210. The outer diameter of the sliding part 242 is smaller than the outer diameter of the plug interface 2109 of the first slot 2106 and the shape of the outer contour of the pressing part 241 matches the shape of the plug interface 2109 of the first slot 2106. In this case, the pressing part 241 can slide in the adapter body 210.

Still refer to FIG. 23 and FIG. 24. The sliding part 242 is provided with a second stop structure 243. The second stop structure 243 is located at one end of the sliding part 242 away from the pressing part 241, and may be configured to cooperate with the first stop structure 270 to prevent the pressing member 240 from being removed from the adapter body 210 from one end that is of the adapter body 210 and at which the plug interface 2109 of the first slot 2106 is disposed. In this way, the pressing member 240 can be stopped on the adapter body 210 to prevent the pressing member 240 from being detached from the adapter body 210, thereby improving connection reliability between the pressing member 240 and the adapter body 210. For example, the second stop structure 243 may be an elastic clamping hook and may be configured to be clamped with the first stop structure 270.

Based on the foregoing description, by applying a force to the first locking structure 230, the pressing member 240 enables the first locking structure 230 to be detached from the second locking structure 126, thereby unlocking the optical fiber connector plug 100 from the optical fiber adapter 200. In this way, the operation is simple, small operation space is required, and the optical fiber adapter 200 can fully adapt to setting of a scenario in which space is limited.

The structures of the optical fiber connector plug 100 and the optical fiber adapter 200 provided in the first embodiment have been fully described above. With reference to the foregoing description, it should be understood that the optical fiber connector plug 100 and the optical fiber adapter 200 are detachably connected to each other. The optical fiber connector plug 100 may be plugged into the optical fiber adapter 200 so that the optical fiber connector plug 100 and the optical fiber adapter 200 cooperate with each other to be locked each other. Or the optical fiber connector plug 100 may be detached from the optical fiber adapter 200 so that the optical fiber connector plug 100 and the optical fiber adapter 200 are separated from each other to be unlocked from each other.

A principle of locking and unlocking the optical fiber connector plug 100 and the optical fiber adapter 200 provided in the first embodiment is described in detail below with reference to FIG. 14. For ease of description, an application scenario described below is that the opposite connector plug 300 is already connected to the optical fiber adapter 200. In this case, the ferrule 330 of the opposite connector plug 300 is already plugged into the ferrule sleeve 220.

When the optical fiber connector plug 100 is just plugged into the first slot 2106 from the plug interface 2109 of the first slot 2106 disposed in the optical fiber adapter 200, the second locking structure 126 of the optical fiber connector plug 100 and the first locking structure 230 of the optical fiber adapter 200 are not in contact with each other. As plugging of the optical fiber connector plug 100 continues, the second locking structure 126 can continuously apply a force to the first locking structure 230. Therefore, the first locking structure 230 can be elastically deformed due to being subject to an external force, in other words, the first locking structure 230 can be opened outward to be detached from the second locking structure 126. Therefore, plugging of the optical fiber connector plug 100 can continue, so that the ferrule 21 of the optical fiber connector plug 100 can be plugged into the ferrule sleeve 220 to be connected to the ferrule 330 of the opposite connector plug 300. In this case, the first locking structure 230 can automatically rebound for resetting because the first locking structure 230 is not subject to an external force from the second locking structure 126, and the ferrule 21 of the optical fiber connector plug 100 is retracted by a specific distance due to being subject to an acting force of the ferrule 330 of the opposite connector plug 300. In this case, the second locking structure 126 abuts against the first locking structure 230 and cooperates with the first locking structure 230 to lock the optical fiber connector plug 100 and the optical fiber adapter 200. Therefore, the optical fiber connector plug 100 is plugged into and locked with the optical fiber adapter 200.

It should be understood that when the ferrule 21 of the optical fiber connector plug 100 and the ferrule 330 of the opposite connector plug 300 are assembled in place, they are connected to each other and a specific amount of interference is generated. Due to the interference amount, the ferrule 21 of the optical fiber connector plug 100 and the ferrule 330 of the opposite connector plug 300 each tend to move in an opposite direction (a direction opposite to a direction into which each ferrule is plugged). Therefore, both the elastic component 23 of the optical fiber connector plug 100 and the spring 340 of the opposite connector plug 300 can be compressed. The elastic component 23 of the optical fiber connector plug 100 in the compressed state can continuously apply a specific acting force to the ferrule 21 of the optical fiber connector plug 100, and the spring 340 of the opposite connector plug 300 in the compressed state can also continuously apply a specific acting force to the ferrule 330 of the opposite connector plug 300. The two acting forces enable the ferrule 21 of the optical fiber connector plug 100 and the ferrule 330 of the opposite connector plug 300 to be tightly connected to each other, and interaction forces are generated between the ferrule 21 of the optical fiber connector plug 100 and the ferrule 330 of the opposite connector plug 300. The interaction forces are a connection force applied by the ferrule 21 of the optical fiber connector plug 100 to the ferrule 330 of the opposite connector plug 300 and a connection force applied by the ferrule 330 of the opposite connector plug 300 to the ferrule 21 of the optical fiber connector plug 100. The two forces have an equal magnitude and opposite directions.

When the pressing member 240 of the optical fiber adapter 200 is pressed to make the pressing member 240 slide in the first slot 2106, the pressing member 240 gradually approaches the first locking structure 230. As the pressing member 240 continuously slides in the first slot 2106, the pressing member 240 can continuously apply a force to the first locking structure 230. Therefore, the first locking structure 230 can be elastically deformed due to being subject to an external force. In other words, the first locking structure 230 can be opened outward to be detached from the second locking structure 126. In this case, the optical fiber connector plug 100 is retracted by a specific distance due to being subject to an acting force of the opposite connector plug 300. Therefore, the first locking structure 230 and the second locking structure 126 can be completely detached from each other to unlock the optical fiber connector plug 100 from the optical fiber adapter 200. In this case, the optical fiber connector plug 100 can be smoothly unplugged and the first locking structure 230 automatically rebounds for resetting. Therefore, the optical fiber connector plug 100 is detached and unlocked from the optical fiber adapter 200.

It should be understood that when the pressing member 240 drives the first locking structure 230 to be opened to be detached from the second locking structure 126, the ferrule 21 of the optical fiber connector plug 100 no longer applies a connection force to the ferrule 330 of the opposite connector plug 300. Therefore, the spring 340 of the opposite connector plug 300 can rebound, and an elastic force generated by rebounding reacts on the optical fiber connector plug 100. In this case, the optical fiber connector plug 100 can be retracted by a specific distance to make the first locking structure 230 completely detached from the second locking structure 126, to unplug the optical fiber connector plug 100.

Second Embodiment

A detailed description of an optical fiber connector plug 100 provided in the second embodiment is as follows:

In this embodiment, content the same as that of the optical fiber connector plug 100 in the first embodiment is not described again, and a part different from that of the optical fiber connector plug 100 in the first embodiment is described as follows:

Refer to FIG. 26 to FIG. 29. A surface of the second locking structure 126 facing away from the outer frame sleeve 11 is a second matching surface 1263, and the second matching surface 1263 is perpendicular to the axial direction. In other words, the second matching surface 1263 is parallel to the radial direction. The second matching surface 1263 is configured to abut against the first matching surface 233 of the first locking structure 230, to secure the second locking structure 126 to the first locking structure 230.

In addition, in this embodiment a stop block 1284 is disposed on the outer surface of the shaft body 125. In other words, the stop block 1284 protrudes on the outer surface 128 of the main shaft 12. The stop block 1284 is disposed adjacent to the second locking structure 126. The stop block 1284 can abut against an elastic structure 243 of the pressing member 240 of the optical fiber adapter 200 when the optical fiber connector plug 100 is just plugged into the optical fiber adapter 200. Through continuous plugging of a plug of the optical fiber adapter 200, the pressing member 240 is driven to slide in a direction close to the adapter body 210. Therefore, based on a simple elastic clamping relationship, when the optical fiber connector plug 100 is plugged into the optical fiber adapter 200, with continuous plugging, the pressing member 240 can be naturally driven to move a specific distance. This helps to subsequently secure the first locking structure 230 to the second locking structure 126 and detach the first locking structure 230 from the second locking structure 126, thereby achieving a simple structure and a firm connection.

In an embodiment, the stop block 1284 protrudes on the second locking structure 126. For example, there are two stop blocks 1284, and the two stop blocks 1284 are symmetrically disposed and are respectively configured to cooperate with two elastic structures 243.

The structure of the optical fiber connector plug 100 provided in the second embodiment has been fully described above, and the optical fiber adapter 200 provided in the second embodiment is described in detail below.

Figure 27:
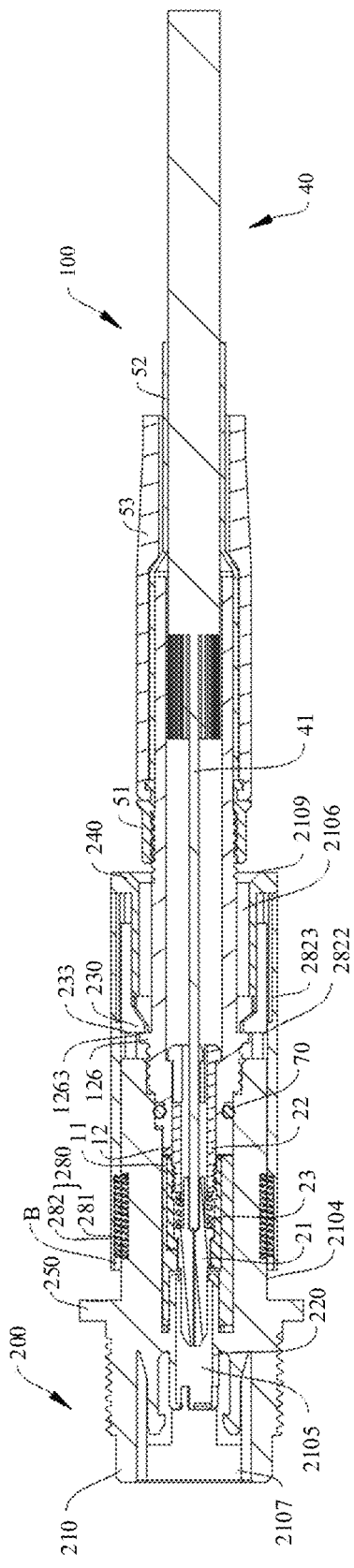
FIG. 27 is a cross-sectional view during the assembly of the optical fiber connector plug and the optical fiber adapter shown in FIG. 26.
Figure 28:
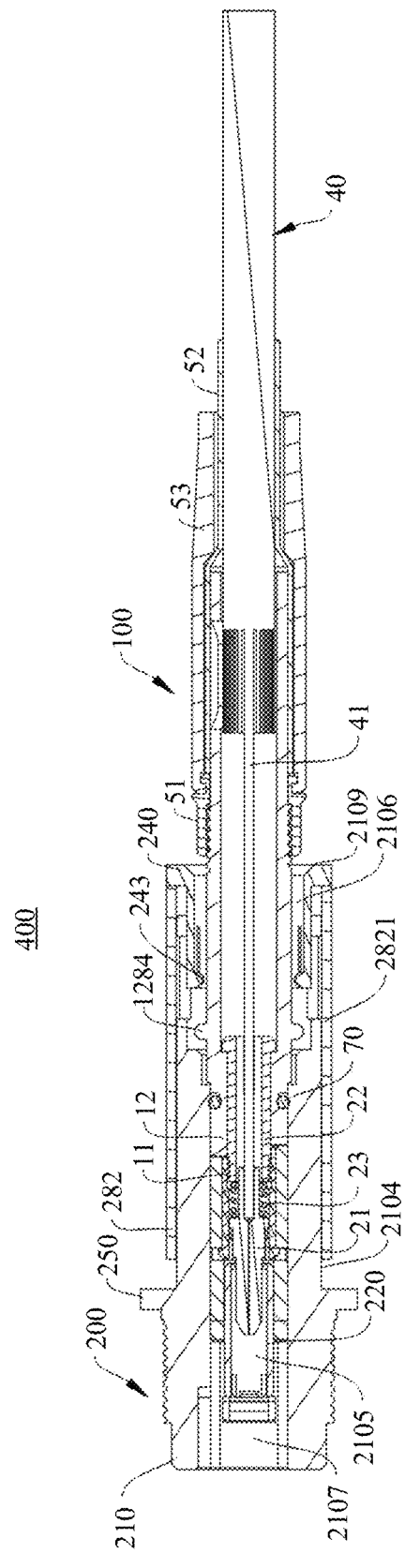
FIG. 28 is another cross-sectional view during the assembly of the optical fiber connector plug and the optical fiber adapter shown in FIG. 26.
Figure 29:
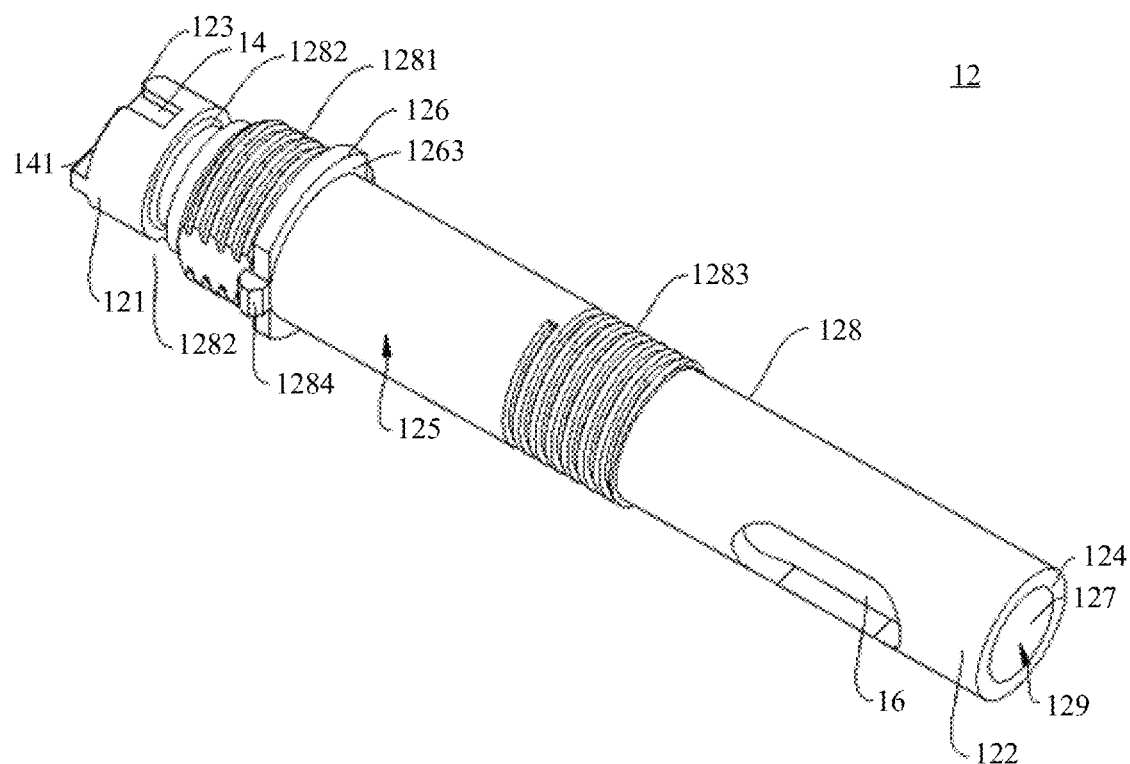
FIG. 29 is a diagram of a main shaft of the optical fiber connector plug according to the second embodiment of this application.
Figure 30:
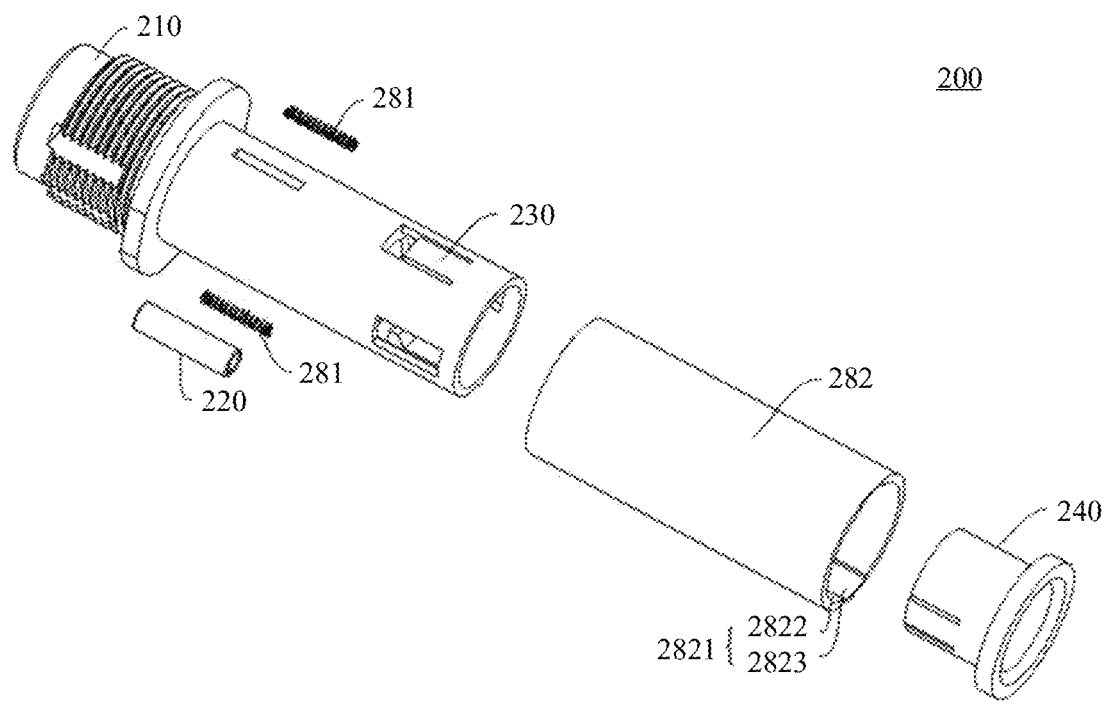
FIG. 30 is an exploded diagram of the optical fiber adapter according to the second embodiment of this application.

In this embodiment, content the same as that of the optical fiber adapter 200 in the first embodiment is not described again, and a part different from that of the optical fiber adapter 200 in the first embodiment is described as follows:

Refer to FIG. 27, FIG. 28, and FIG. 30, different from the case in the first embodiment in which the first matching surface 233 of the first locking structure 230 is inclined with respect to the axial direction. In this embodiment, the first matching surface 233 of the first locking structure 230 is perpendicular to the axial direction. In other words, the first matching surface 233 is parallel to the radial direction.

In consideration of connection stability between the first locking structure 230 and the second locking structure 126, it is necessary to ensure that the first locking structure 230 does not bounce off when being subject to a force. Therefore, in this embodiment the optical fiber adapter 200 further includes a sliding assembly 280, and the sliding assembly 280 is slidably connected to the outer surface 2104 of the adapter body 210 and covers the first locking structure 230. In other words, the sliding assembly 280 is connected to the outer surface 2104 of the adapter body 210, and the sliding assembly 280 can slide relative to the adapter body 210. In other words, the sliding assembly 280 is slidably connected to the adapter body 210. When the sliding assembly 280 does not slide relative to the adapter body 210, the sliding assembly 280 can always press above the first locking structure 230 so that it is possible that the first locking structure 230 is detached from the second locking structure 126 because the first locking structure 230 is elastically deformed due to being subject to a force can be effectively reduced to a minimum by tightly pressing the first locking structure 230 by using the sliding assembly 280, thereby achieving strong reliability.

The sliding assembly 280 includes an elastic component 281 and a sliding sleeve 282. The sliding sleeve 282 is sleeved on the outer surface 2104 of the adapter body 210 and abuts against the pressing part 241 of the pressing member 240, and can slide relative to the adapter body 210. For example, the sliding sleeve 282 can slide relative to the adapter body 210 in a direction away from the pressing member 240 under an action of a thrust force of the pressing member 240.

In an embodiment, the elastic component 281 is a spring.

Refer to FIG. 27, FIG. 28, and FIG. 30, an inner surface 2821 of the sliding sleeve 282 is provided with a contact region 2822, and a depression region 2823 connected to the contact region 2822. The contact region 2822 is a region that is of the inner surface 2821 of the sliding sleeve 282 and that can be in contact with the outer surface 2104 of the adapter body 210. The depression region 2823 is a region that is of the inner surface 2821 of the sliding sleeve 282 and that is not in contact with the outer surface 2104 of the adapter body 210, and the depression region 2823 is located at one end of the sliding sleeve 282 facing the pressing member 240. The contact region 2822 is connected to the depression region 2823 and can visually form a stepped structure.

It may be understood that in a state in which the sliding sleeve 282 does not slide relative to the adapter body 210, the contact region 2822 tightly presses the first locking structure 230 and the depression region 2823 is misaligned with the first locking structure 230, to prevent the first locking structure 230 from being subject to a force to bounce off. The state in which the sliding sleeve 282 does not slide relative to the adapter body 210 may be a state in which the optical fiber connector plug 100 is not plugged into the optical fiber adapter 200 or may be a state in which the optical fiber connector plug 100 and the optical fiber adapter 200 have been assembled in place. In a state in which the sliding sleeve 282 slides relative to the adapter body 210, the contact region 2822 is misaligned with the first locking structure 230 and the depression region 2823 moves above the first locking structure 230 and can provide space for generating elastic deformation for the first locking structure 230, to make the first locking structure 230 detached from the second locking structure 126. For example, that the sliding sleeve 282 slides relative to the adapter body 210 may be that the sliding sleeve 282 slides relative to the adapter body 210 in a direction away from the pressing member 240.

The outer surface 2104 of the adapter body 210 is recessed inward to form a first accommodating groove (not shown in the figure), the first accommodating groove is disposed close to the baffle plate 250, and the first accommodating groove is configured to install the elastic component 281. The inner surface 2821 of the sliding sleeve 282 is recessed outward to form a second accommodating groove (not shown in the figure), and can cooperate with the first accommodating groove to form accommodating space B for accommodating the elastic component 281. For example, there are two first accommodating grooves, and the two first accommodating grooves are symmetrically disposed.

It should be understood that when the sliding assembly 280 and the adapter body 210 are assembled in place, the elastic component 281 is partially located in the first accommodating groove and partially located in the second accommodating groove so that the elastic component 281 can elastically abut between the adapter body 210 and the sliding sleeve 282. Therefore, the elastic component 281 can be compressed when the pressing member 240 drives the sliding sleeve 282 to move in a direction away from the pressing member 240. When the pressing member 240 is detached from the sliding sleeve 282, the elastic component 281 can accordingly provide a resetting force so that the sliding sleeve 282 can be reset under an action of the resetting force of the elastic component 281. This structure can implement resetting of the sliding sleeve 282 without an additional component, and the connection is simple and reliable.

Figure 31:
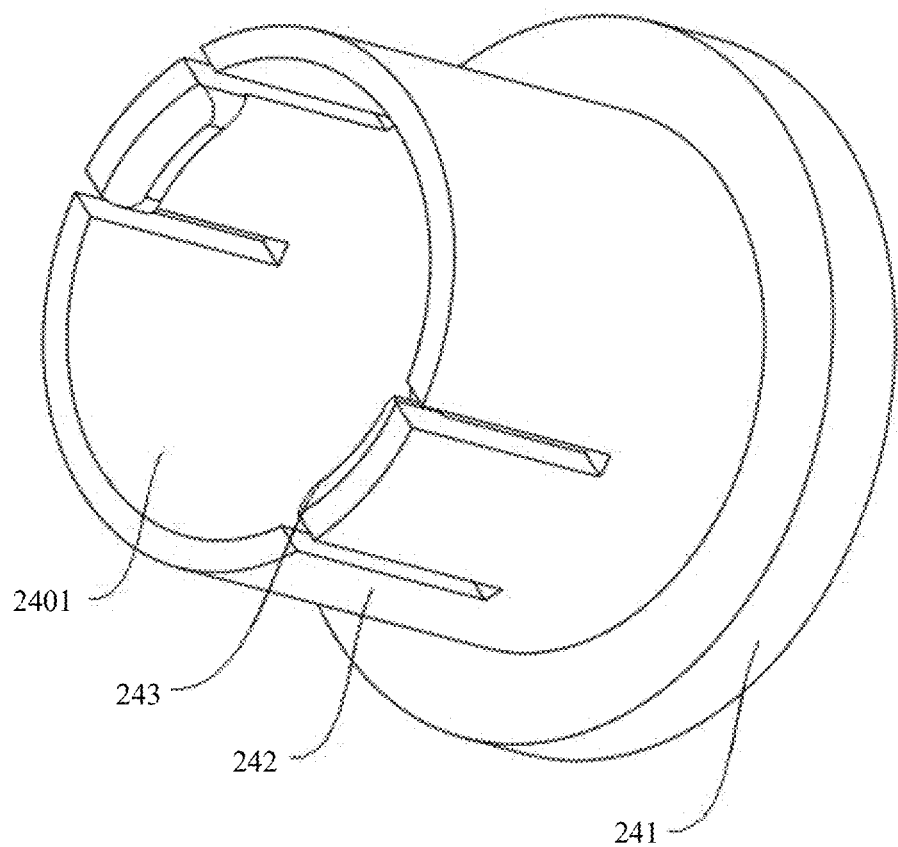
FIG. 31 is a diagram, viewed from an angle, of a pressing member shown in FIG. 30.

Refer to FIG. 27, FIG. 28, and FIG. 31, the elastic structure 243 is disposed on an inner surface 2401 of the pressing member 240, and the elastic structure 243 may be located at one end of the sliding part 242 away from the pressing part 241. When the optical fiber connector plug 100 is plugged into the optical fiber adapter 200, the stop block 1284 of the optical fiber connector plug 100 is first in contact with the elastic structure 243 to drive the elastic structure 243 and to drive the entire pressing member 240 to slide a distance in a direction of the adapter body 210. In addition, because the pressing member 240 abuts against the sliding sleeve 282, when the pressing member 240 is driven to move, a thrust force can be applied to the sliding sleeve 282 to push the sliding sleeve 282 to slide relative to the adapter body 210 in the direction away from the pressing member 240.

A part that is different from a corresponding description in the first embodiment and that is of the structures of the optical fiber connector plug 100 and the optical fiber adapter 200 provided in the second embodiment has been fully described above. With reference to the foregoing description, it should be understood that the optical fiber connector plug 100 and the optical fiber adapter 200 are detachably connected to each other. The optical fiber connector plug 100 may be plugged into the optical fiber adapter 200 so that the optical fiber connector plug 100 and the optical fiber adapter 200 cooperate with each other to be locked to each other; or the optical fiber connector plug 100 may be detached from the optical fiber adapter 200, so that the optical fiber connector plug 100 and the optical fiber adapter 200 are separated from each other to be unlocked from each other.

A principle of locking and unlocking the optical fiber connector plug 100 and the optical fiber adapter 200 provided in the second embodiment is described in detail below with reference to FIG. 27 and FIG. 28. For ease of description, an application scenario described below is that the opposite connector plug 300 is already connected to the optical fiber adapter 200. In this case, the ferrule 330 of the opposite connector plug 300 is already plugged into the ferrule sleeve 220 (for a structural feature of the opposite connector plug 300, refer to FIG. 14).

When the optical fiber connector plug 100 is plugged into the first slot 2106 from the plug interface 2109 of the first slot 2106 disposed in the optical fiber adapter 200, and the stop block 1284 of the optical fiber connector plug 100 is allowed to be in contact with the elastic structure 243 of the pressing member 240, the stop block 1284 can drive the elastic structure 243 to drive the entire pressing member 240 to slide a distance in the direction of the adapter body 210, to push the sliding sleeve 282 to slide relative to the adapter body 210 in the direction away from the pressing member 240. Therefore, the contact region 2822 of the sliding sleeve 282 is moved away from the top of the first locking structure 230. As plugging of the optical fiber connector plug 100 continues, the depression region 2823 of the sliding sleeve 282 is located above the first locking structure 230, so that the second locking structure 126 drives the first locking structure 230 to be opened outward to be detached from the second locking structure 126. When the second locking structure 126 passes over the first locking structure 230, the first locking structure 230 can automatically rebound for resetting because the first locking structure 230 is not subject to an external force from the second locking structure 126, and the ferrule 21 of the optical fiber connector plug 100 is retracted by a specific distance due to being subject to an acting force of the ferrule 330 of the opposite connector plug 300. In this case, the second locking structure 126 abuts against the first locking structure 230 and cooperates with the first locking structure 230 to lock the optical fiber connector plug 100 and the optical fiber adapter 200. The sliding sleeve 282 is reset under an action of a resetting force of the elastic component 281, so that the contact region 2822 of the sliding sleeve tightly presses the first locking structure 230 again to prevent the first locking structure 230 from bouncing off. Therefore, the optical fiber connector plug 100 is plugged into and locked with the optical fiber adapter 200.

It should be understood that when the ferrule 21 of the optical fiber connector plug 100 and the ferrule 330 of the opposite connector plug 300 are assembled in place, they are connected to each other and a specific amount of interference is generated. Due to the interference amount, the ferrule 21 of the optical fiber connector plug 100 and the ferrule 330 of the opposite connector plug 300 each tend to move in an opposite direction (a direction opposite to a direction into which each ferrule is plugged). Therefore, both the elastic component 23 of the optical fiber connector plug 100 and the spring 340 of the opposite connector plug 300 can be compressed. The elastic component 23 of the optical fiber connector plug 100 in the compressed state can continuously apply a specific acting force to the ferrule 21 of the optical fiber connector plug 100, and the spring 340 of the opposite connector plug 300 in the compressed state can also continuously apply a specific acting force to the ferrule 330 of the opposite connector plug 300. The two acting forces enable the ferrule 21 of the optical fiber connector plug 100 and the ferrule 330 of the opposite connector plug 300 to be tightly connected to each other, and interaction forces are generated between the ferrule 21 of the optical fiber connector plug 100 and the ferrule 330 of the opposite connector plug 300. The interaction forces are a connection force applied by the ferrule 21 of the optical fiber connector plug 100 to the ferrule 330 of the opposite connector plug 300 and a connection force applied by the ferrule 330 of the opposite connector plug 300 to the ferrule 21 of the optical fiber connector plug 100. The two forces have an equal magnitude and opposite directions.

When the pressing member 240 of the optical fiber adapter 200 is pressed, the pressing member 240 pushes the sliding sleeve 282 to slide relative to the adapter body 210 in the direction away from the pressing member 240. Therefore, the contact region 2822 of the sliding sleeve 282 is moved away from the top of the first locking structure 230 so that the depression region 2823 is located above the first locking structure 230. Therefore, when the pressing member 240 is pressed to make the pressing member 240 continue to slide in the first slot 2106, the pressing member 240 gradually approaches the first locking structure 230. As the pressing member 240 continuously slides in the first slot 2106, the pressing member 240 can continuously apply a force to the first locking structure 230. Therefore, the first locking structure 230 can be elastically deformed due to being subject to an external force. In other words, the first locking structure 230 can be opened outward to be detached from the second locking structure 126. In this case, the optical fiber connector plug 100 is retracted by a specific distance due to being subject to an acting force of the opposite connector plug 300. Therefore, the first locking structure 230 and the second locking structure 126 can be completely detached from each other to unlock the optical fiber connector plug 100 from the optical fiber adapter 200. In this case, the optical fiber connector plug 100 can be smoothly unplugged and the first locking structure 230 automatically rebounds for resetting. Then, the sliding sleeve 282 is reset under an action of a resetting force of the elastic component 281 so that the contact region 2822 of the sliding sleeve 282 tightly presses the first locking structure 230 again to prevent the first locking structure 230 from bouncing off. Therefore, the optical fiber connector plug 100 is detached and unlocked from the optical fiber adapter 200.

It should be understood that when the pressing member 240 drives the first locking structure 230 to be opened to be detached from the second locking structure 126, the ferrule 21 of the optical fiber connector plug 100 no longer applies a connection force to the ferrule 330 of the opposite connector plug 300. Therefore, the spring 340 of the opposite connector plug 300 can rebound and an elastic force generated by rebounding reacts on the optical fiber connector plug 100. In this case, the optical fiber connector plug 100 can be retracted by a specific distance to make the first locking structure 230 completely detached from the second locking structure 126 to unplug the optical fiber connector plug 100.

Third Embodiment

Figure 32:
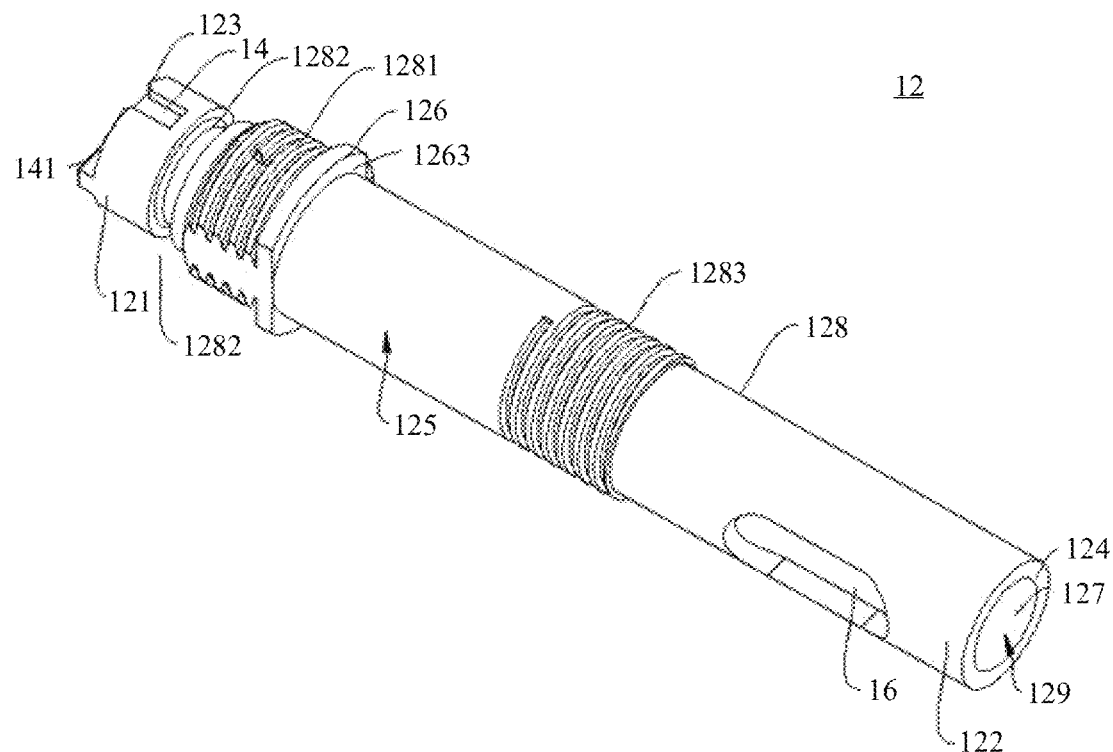
FIG. 32 is a diagram of a main shaft of an optical fiber connector plug according to a third embodiment of this application.

A detailed description of an optical fiber connector plug 100 provided in the third embodiment is as follows:

In this embodiment, content the same as that of the optical fiber connector plug 100 in the first embodiment is not described again, and a part different from that of the optical fiber connector plug 100 in the first embodiment is described as follows:

Refer to FIG. 32. A surface of the second locking structure 126 facing away from the outer frame sleeve 11 is a second matching surface 1263 and the second matching surface 1263 is perpendicular to the axial direction. In other words, the second matching surface 1263 is parallel to the radial direction. The second matching surface 1263 is configured to abut against the first matching surface 233 of the first locking structure 230 to secure the second locking structure 126 to the first locking structure 230.

The structure of the optical fiber connector plug 100 provided in the third embodiment has been fully described above, and the optical fiber adapter 200 provided in the third embodiment is described in detail below.

Figure 33:
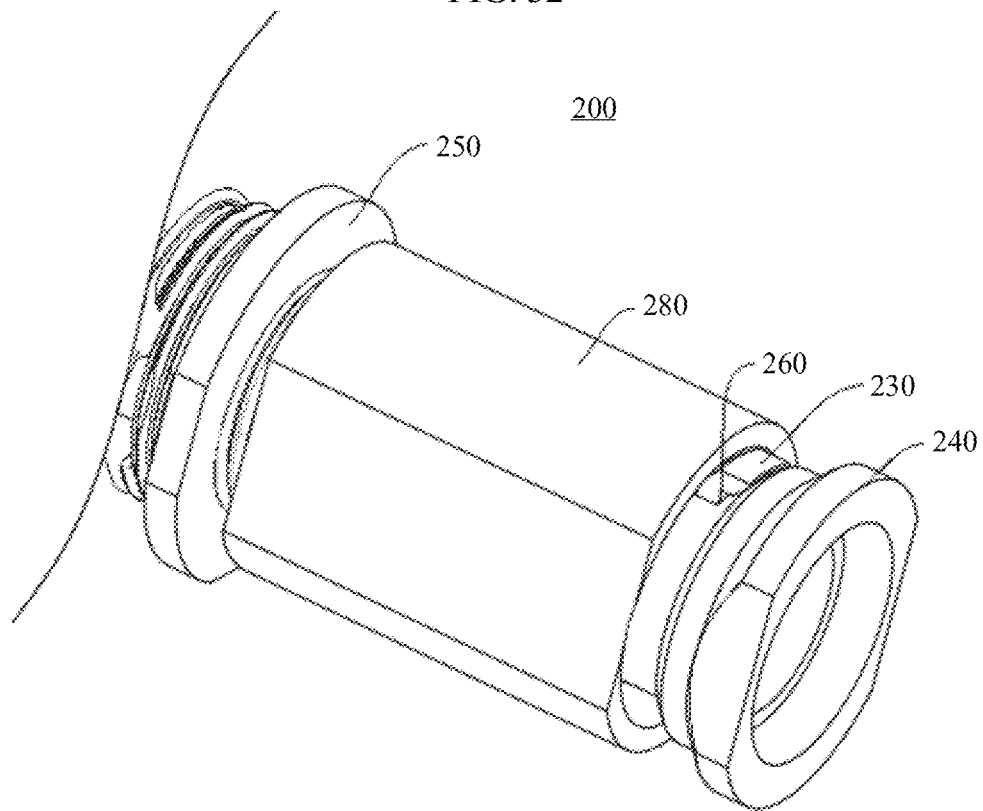
FIG. 33 is a diagram of a partial structure of an optical fiber adapter according to the third embodiment of this application.

In this embodiment, content the same as that of the optical fiber adapter 200 in the first embodiment is not described again, and a part different from that of the optical fiber adapter 200 in the first embodiment is described as follows:

Refer to FIG. 33. A part of the first locking structure 230 passes through the mounting groove 260 and the first locking structure 230 can move relative to the mounting groove 260. The optical fiber adapter 200 further includes a pressing member 240 and a sliding assembly 280. The pressing member 240 and the sliding assembly 280 are sleeved and slidably connected to a periphery of the adapter body 210. In other words, the sliding assembly 280 is connected to the outer surface 2104 of the adapter body 210 and the sliding assembly 280 can slide relative to the adapter body 210. The pressing member 240 is connected to the outer surface 2104 of the adapter body 210 and the pressing member 240 can slide relative to the adapter body 210. In other words, both the sliding assembly 280 and the pressing member 240 are slidably connected to the adapter body 210.

In addition, the pressing member 240 and the sliding assembly 280 are respectively located on two sides of the first locking structure 230 and both abut against the first locking structure 230, to ensure connection reliability of the first locking structure 230.

Structures of the first locking structure 230, the pressing member 240, and the sliding assembly 280 are successively described in detail.

Figure 34:
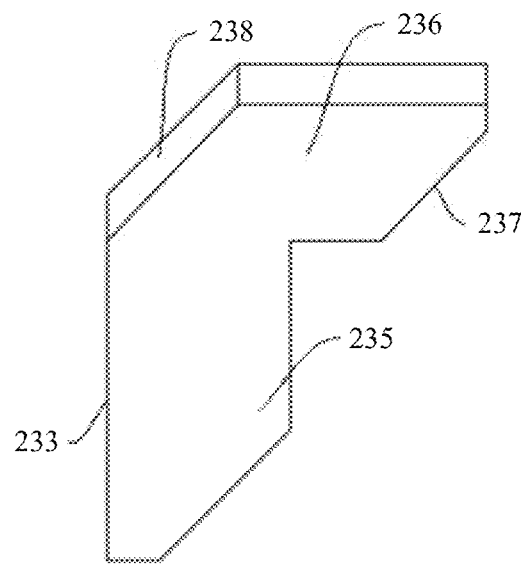
FIG. 34 is a diagram of a first locking structure shown in FIG. 33.
Figure 35:
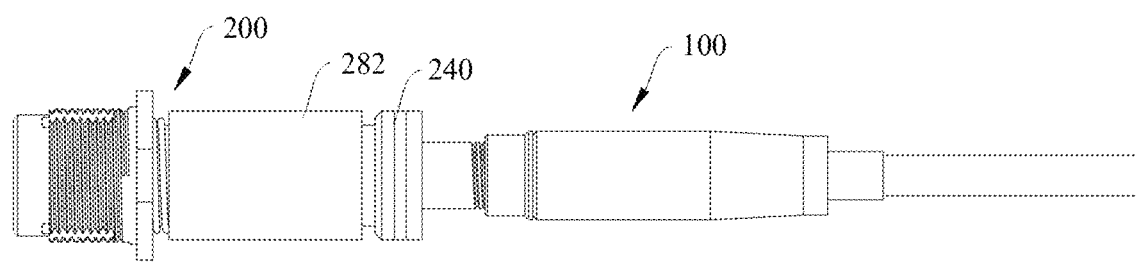
FIG. 35 is a diagram of the assembly of the optical fiber connector plug and the optical fiber adapter according to the second embodiment of this application.
Figure 36:
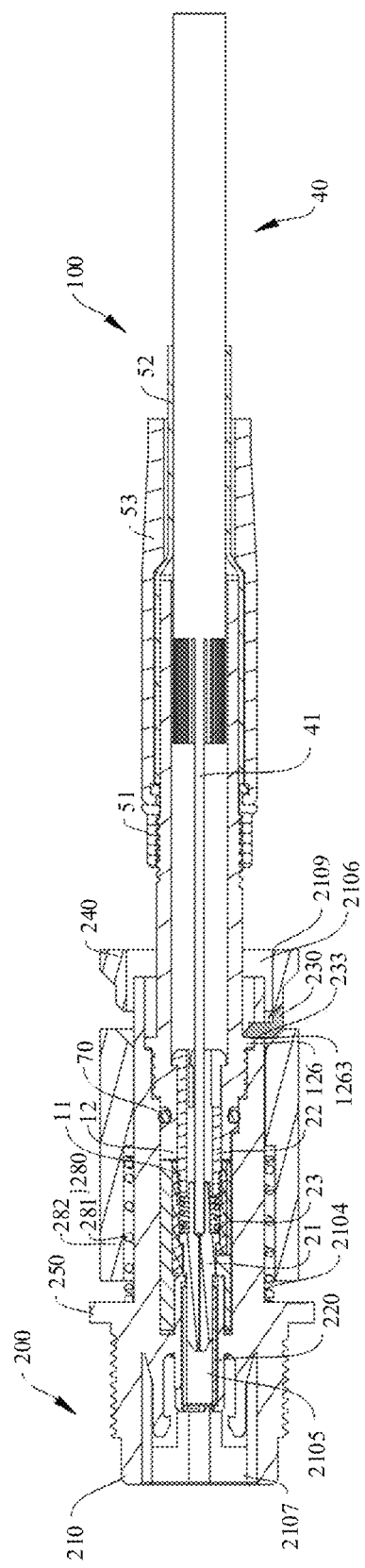
FIG. 36 is a cross-sectional view during the assembly of the optical fiber connector plug and the optical fiber adapter shown in FIG. 35.

Refer to FIG. 34, FIG. 35, and FIG. 36. The first locking structure 230 includes a moving part 235 and a contact part 236, and the contact part 236 is bent and connected to one end of the moving part 235. The moving part 235 is a part that is of the first locking structure 230 and that passes through the mounting groove 260, the moving part 235 extends in the radial direction, and the moving part 235 can slide relative to the mounting groove 260 in the radial direction to abut against or be detached from the second locking structure 126 of the optical fiber connector plug 100. The contact part 236 is a part that is of the first locking structure 230, that is located outside the adapter body 210 and that can abut against a sliding assembly 280 and the pressing member 240. The contact part 236 extends in the axial direction. Therefore, the first locking structure 230 may roughly present an inverted "L" shape. For example, the first locking structure 230 may be a locking tongue that passes through the mounting groove 260 and that can slide relative to the mounting groove 260 in the axial direction.

The moving part 235 includes a first matching surface 233 extending in the radial direction. The first matching surface 233 is a surface facing the second groove wall 2602, that is, a surface facing the ferrule sleeve 220. The first matching surface 233 is configured to abut against the second matching surface 1263 of the second locking structure 126, to secure the first locking structure 230 to the second locking structure 126.

The contact part 236 includes a first contact surface 237 and a second contact surface 238 that are both inclined with respect to the axial direction. The first contact surface 237 and the second contact surface 238 deviate from each other, and the second contact surface 238 is connected to the first matching surface 233.

When the contact part 236 abuts against the sliding assembly 280 and the pressing member 240, the first contact surface 237 is a surface facing the pressing member 240 and is configured to form inclined surface matching with a surface of the pressing member 240. In other words, both the first contact surface 237 and a surface that is of the pressing member 240 and that is in contact with the first contact surface 237 are inclined surfaces. The second contact surface 238 is a surface facing the sliding assembly 280 and is configured to form inclined surface matching with a surface of the sliding assembly 280. In other words, both the second contact surface 238 and a surface that is of the sliding assembly 280 and that is in contact with the second contact surface 238 are inclined surfaces. Inclined surface matching is configured so that quick alignment can be implemented between the first locking structure 230 and the pressing member 240 and between the first locking structure 230 and the sliding assembly 280. This not only reduces interconnection difficulty, but also increases contact areas between the first locking structure 230 and the pressing member 240 and between the first locking structure 230 and the sliding assembly 280, thereby further improving interconnection tightness. For example, the first contact surface 237 and the second contact surface 238 may both be planes, may both be arc surfaces, or may be a combination of a plane and an arc surface.

It should be understood that the first locking structure 230 can move to an exterior of the adapter body 210 in the radial direction under the push of the second locking structure 126 of the optical fiber connector plug 100, and can also move to an interior of the adapter body 210 in the radial direction under the push of the pressing member 240. Therefore, the first locking structure 230 can move relative to the mounting groove 260 in the radial direction.

In this embodiment, the pressing member 240 is in a sleeve shape, is sleeved to the outer surface 2104 of the adapter body 210, and is configured to drive the first locking structure 230 to move in a direction perpendicular to the axial direction of the adapter body 210 to be unlocked from the second locking structure 126. One end of the pressing member 240 protrudes relative to the adapter body 210 to facilitate application of a force by a worker. The other end of the pressing member 240 abuts against the first locking structure 230 to provide a thrust force for the first locking structure 230 more conveniently.

The sliding assembly 280 includes an elastic component 281 and a sliding sleeve 282, the elastic component 281 is sleeved on the outer surface 2104 of the adapter body 210, and the sliding sleeve 282 is sleeved on the elastic component 281 and the outer surface 2104 of the adapter body 210 and accommodates at least a part of the elastic component 281. In an embodiment, the elastic component 281 is a spring.

The elastic component 281 elastically abuts between the baffle plate 250 and the sliding sleeve 282 and can provide a resetting force for the sliding sleeve 282 by changing a status. In addition, because the elastic component 281 is disposed between the baffle plate 250 and the sliding sleeve 282, the sliding sleeve 282 can tightly abut against the first locking structure 230 under an action of an elastic force of the elastic component 281. Therefore, the sliding sleeve 282 and the first locking structure 230 are not easy to loosen even if they are subject to long-time vibration, thereby ensuring long-term reliability of the optical fiber adapter 200.

When the sliding sleeve 282 does not slide relative to the adapter body 210, an end part of the sliding sleeve 282 away from the elastic component 281 can abut against the pressing member 240. When the sliding sleeve 282 is subject to a thrust force of the first locking structure 230, the sliding sleeve 282 can slide toward the baffle plate 250. In this case, the elastic component 281 is compressed. When the elastic component 281 is released from a compressed state, a resetting force can be provided for the sliding sleeve 282 so that the sliding sleeve 282 slides away from the baffle plate 250. Therefore, the sliding sleeve 282 can slide toward or away from the baffle plate 250.

A part that is different from a corresponding description in the first embodiment and that is of the structures of the optical fiber connector plug 100 and the optical fiber adapter 200 provided in the third embodiment has been fully described above. With reference to the foregoing description, it should be understood that the optical fiber connector plug 100 and the optical fiber adapter 200 are detachably connected to each other. The optical fiber connector plug 100 may be plugged into the optical fiber adapter 200 so that the optical fiber connector plug 100 and the optical fiber adapter 200 cooperate with each other to be locked each other. Or the optical fiber connector plug 100 may be detached from the optical fiber adapter 200 so that the optical fiber connector plug 100 and the optical fiber adapter 200 are separated from each other to be unlocked from each other.

A principle of locking and unlocking the optical fiber connector plug 100 and the optical fiber adapter 200 provided in the third embodiment is described in detail below with reference to FIG. 36. For ease of description, an application scenario described below is that the opposite connector plug 300 is already connected to the optical fiber adapter 200. In this case, the ferrule 330 of the opposite connector plug 300 is already plugged into the ferrule sleeve 220 (for a structural feature of the opposite connector plug 300, refer to FIG. 14).

When the optical fiber connector plug 100 is plugged into the first slot 2106 from the plug interface 2109 of the first slot 2106 disposed in the optical fiber adapter 200, the second locking structure 126 of the optical fiber connector plug 100 gradually approaches the first locking structure of the optical fiber adapter 200. As plugging of the optical fiber connector plug 100 continues, the second locking structure 126 can push away the first locking structure 230 in the axial direction. Therefore, the first locking structure 230 can move to an exterior of the adapter body 210 in the radial direction due to being subject to an external force. In other words, the first locking structure 230 can be detached from the second locking structure 126. In a process in which the first locking structure 230 moves to the exterior of the adapter body 210 in the radial direction, the first locking structure 230 can push the sliding sleeve 282 to slide toward the baffle plate 250 so that plugging of the optical fiber connector plug 100 can continue. In this way, the ferrule 21 of the optical fiber connector plug 100 can be plugged into the ferrule sleeve 220 to be connected to the ferrule 330 of the opposite connector plug 300. In this case, the sliding sleeve 282 slides away from the baffle plate 250 under an action of a resetting force of the elastic component 281 for resetting, to drive the first locking structure 230 to move toward the interior of the adapter body 210 in the radial direction. The ferrule 21 of the optical fiber connector plug 100 is retracted by a specific distance due to being subject to an acting force of the ferrule 330 of the opposite connector plug 300. In this case, the second locking structure 126 abuts against the first locking structure 230 and cooperates with the first locking structure 230 to lock the optical fiber connector plug 100 and the optical fiber adapter 200. Therefore, the optical fiber connector plug 100 is plugged into and locked with the optical fiber adapter 200.

It should be understood that when the ferrule 21 of the optical fiber connector plug 100 and the ferrule 330 of the opposite connector plug 300 are assembled in place, they are connected to each other and a specific amount of interference is generated. Due to the interference amount, the ferrule 21 of the optical fiber connector plug 100 and the ferrule 330 of the opposite connector plug 300 each tend to move in an opposite direction (a direction opposite to a direction into which each ferrule is plugged). Therefore, both the elastic component 23 of the optical fiber connector plug 100 and the spring 340 of the opposite connector plug 300 can be compressed. The elastic component 23 of the optical fiber connector plug 100 in the compressed state can continuously apply a specific acting force to the ferrule 21 of the optical fiber connector plug 100 and the spring 340 of the opposite connector plug 300 in the compressed state can also continuously apply a specific acting force to the ferrule 330 of the opposite connector plug 300. The two acting forces enable the ferrule 21 of the optical fiber connector plug 100 and the ferrule 330 of the opposite connector plug 300 to be tightly connected to each other, and interaction forces are generated between the ferrule 21 of the optical fiber connector plug 100 and the ferrule 330 of the opposite connector plug 300. The interaction forces are a connection force applied by the ferrule 21 of the optical fiber connector plug 100 to the ferrule 330 of the opposite connector plug 300 and a connection force applied by the ferrule 330 of the opposite connector plug 300 to the ferrule 21 of the optical fiber connector plug 100. The two forces have an equal magnitude and opposite directions.

When the pressing member 240 of the optical fiber adapter 200 is pressed, the pressing member 240 pushes the first locking structure 230 in the axial direction so that the first locking structure 230 can move to the exterior of the adapter body 210 in the radial direction. In this way, the first locking structure 230 pushes the sliding sleeve 282 to slide toward the baffle plate 250 and the first locking structure 230 is detached from the second locking structure 126. In this case, the optical fiber connector plug 100 is retracted by a specific distance due to being subject to an acting force of the opposite connector plug 300. Therefore, the first locking structure 230 and the second locking structure 126 can be completely detached from each other to unlock the optical fiber connector plug 100 from the optical fiber adapter 200. In this case, the optical fiber connector plug 100 can be smoothly unplugged. Then, the sliding sleeve 282 slides away from the baffle plate 250 under an action of a resetting force of the elastic component 281 for resetting, to drive the first locking structure 230 to move toward the interior of the adapter body 210 in the radial direction, thereby resetting the first locking structure 230. Therefore, the optical fiber connector plug 100 is detached and unlocked from the optical fiber adapter 200.

It should be understood that when the pressing member 240 drives the first locking structure 230 to move to be detached from the second locking structure 126, the ferrule 21 of the optical fiber connector plug 100 no longer applies a connection force to the ferrule 330 of the opposite connector plug 300. Therefore, the spring 340 of the opposite connector plug 300 can rebound and an elastic force generated by rebounding reacts on the optical fiber connector plug 100. In this case, the optical fiber connector plug 100 can be retracted by a specific distance to make the first locking structure 230 completely detached from the second locking structure 126 to unplug the optical fiber connector plug 100.

With reference to the foregoing embodiments, it should be understood that, for the provided optical fiber connector plug 100 and the optical fiber adapter 200, a straight-plugging and pressing type locking manner is used. Compared with a conventional rotation type locking manner in which relatively large operation space is required, operation space required for assembly and disassembly of the optical fiber connector plug 100 and the optical fiber adapter 200 can be greatly reduced, to adapt to a scenario in which space is limited, and to achieve strong practicability and a wide application range. In addition, during locking and disassembly, a worker only needs to perform straight plugging and pressing operations. The operations are simple and time-saving, and there is no need to rotate a plurality of turns like the conventional rotation type locking manner. In this way, problems of poor locking effect consistency and easy loosening after long-time vibration that are caused by uneven manual tightening force of workers can be effectively avoided and strong connection reliability is achieved.

Embodiments of this application are described in detail above. The principle and implementation of this application are described in this specification through examples. The description about foregoing embodiments is merely for helping understand the method and core ideas of this application. In addition, a person of ordinary skill in the art can make variations in terms of the implementations and application scopes according to the ideas of this application. In conclusion, the content of this specification shall not be construed as a limit to this application.

What is claimed is:

1. An optical fiber adapter, comprising:
    an adapter body, the adapter body being provided with a first slot, and the first slot is configured to receive an optical fiber connector plug;
    a first locking structure, the first locking structure being disposed on the adapter body and configured to cooperate with a second locking structure of the optical fiber connector plug to secure the optical fiber adapter to the optical fiber connector plug, the first locking structure comprising:
    a first part, the first part is elastically connected to the first groove wall and extends in the axial direction of the adapter body; and
    a second part, the second part is bent and connected to one end of the first part away from the first groove wall, the second part extends toward an interior of the first slot and forms an included angle with the first part, and at least a portion of the second part is located inside the first slot, a surface of the second part facing the second groove wall is a first matching surface, and the first matching surface is configured to abut against a second matching surface of the second locking structure; and
    a pressing member, the pressing member being connected to the adapter body, the pressing member being configured to slide relative to the adapter body and configured to drive the first locking structure to be unlocked from the second locking structure.

2. The optical fiber adapter according to claim 1, wherein an outer surface of the adapter body is provided with a mounting groove, and the mounting groove penetrates through the outer surface and an inner surface of the adapter body and is in communication with the first slot; and the mounting groove comprises a first groove wall and a second groove wall that are disposed opposite to each other in an axial direction of the adapter body, the first groove wall is disposed close to a plug interface of the first slot relative to the second groove wall, and the first locking structure has elasticity and is connected to the first groove wall; or the first locking structure passes through the mounting groove, and the first locking structure can move relative to the mounting groove in a radial direction of the adapter body.

3. The optical fiber adapter according to claim 2, wherein the first locking structure comprises a moving part and a contact part, and the contact part is bent and connected to one end of the moving part;

the moving part passes through the mounting groove and can move relative to the mounting groove in the radial direction of the adapter body, and the contact part is configured to abut against the pressing member; and a surface of the moving part facing a ferrule sleeve is a first matching surface, and the first matching surface is configured to abut against a second matching surface of the second locking structure.

4. The optical fiber adapter according to claim 2, wherein the first matching surface is inclined with respect to the axial direction of the adapter body, or the first matching surface is perpendicular to the axial direction of the adapter body.

5. The optical fiber adapter according to claim 2, wherein the pressing member is sleeved and slidably connected to the inner surface of the adapter body; and the pressing member comprises a pressing part and a sliding part, the sliding part is connected to one end of the pressing part, the pressing part is located outside the adapter body, and the sliding part can slide relative to the adapter body to press against the second locking structure to drive the second locking structure to be opened.

6. The optical fiber adapter according to claim 5, wherein the adapter body is provided with a first stop structure, the sliding part is provided with a second stop structure, and the first stop structure cooperates with the second stop structure to prevent the pressing member from being removed from the adapter body from one end of the adapter body at which the plug interface of the first slot is disposed.

7. The optical fiber adapter according to claim 1, wherein the optical fiber adapter further comprises a sliding assembly, the sliding assembly is slidably connected to the outer surface of the adapter body, and the sliding assembly is configured to, when the sliding assembly does not slide relative to the adapter body, prevent the first locking structure from being unlocked from the second locking structure.

8. The optical fiber adapter according to claim 7, wherein the sliding assembly comprises a sliding sleeve and an elastic component, the sliding sleeve is sleeved at a periphery of the adapter body and abuts against the pressing member, the sliding sleeve is configured to slide relative to the adapter body in a direction away from the pressing member under an action of a thrust force of the pressing member, the sliding sleeve and the adapter body together form an accommodating space for accommodating the elastic component, and the elastic component is accommodated in the accommodating space and elastically abuts against the sliding sleeve and the adapter body.

9. The optical fiber adapter according to claim 8, wherein an inner surface of the sliding sleeve is provided with a contact region and a depression region connected to the contact region, the depression region is located at one end of the sliding sleeve facing the pressing member, the contact region is configured to tightly press the second locking structure when the sliding sleeve does not slide relative to the adapter body, and the depression region is configured to, when the sliding sleeve slides relative to the adapter body in the direction away from the pressing member, provide space for generating elastic deformation for the second locking structure.

10. The optical fiber adapter according to claim 8, wherein an elastic structure is disposed on an inner surface of the pressing member, a stop block is disposed on the optical fiber connector plug, and the elastic structure is configured to, under driving of the stop block, make the pressing member slide in a direction close to the adapter body to drive the sliding sleeve to slide relative to the adapter body.

11. The optical fiber adapter according to claim 7, wherein both the sliding assembly and the pressing member are sleeved and slidably connected to the outer surface of the adapter body, the sliding assembly and the pressing member are located on both sides of the first locking structure in the axial direction of the adapter body and both abut against the first locking structure, one end of the pressing member protrudes relative to the adapter body, and the pressing member is configured to drive the second locking structure to move in the radial direction of the adapter body to be detached from the first locking structure.

12. The fiber adapter according to claim 11, wherein a baffle plate is disposed on the outer surface of the adapter body, the sliding assembly comprises an elastic component and a sliding sleeve, the elastic component is sleeved on the outer surface of the adapter body, and the sliding sleeve is sleeved on the outer surface of the adapter body and a periphery of the elastic component, and accommodates at least a part of the elastic component; and the elastic component elastically abuts against the baffle plate and the sliding sleeve, and the sliding sleeve can slide toward or away from the baffle plate.

13. The optical fiber adapter according to claim 12, wherein a surface of a contact part facing the pressing member is a first contact surface, the first contact surface is inclined with respect to the axial direction of the adapter body, and the first contact surface is configured to form an inclined surface matching with a surface of the pressing member; or the surface of the contact part facing the sliding sleeve is a second contact surface, the second contact surface is inclined with respect to the axial direction of the adapter body, and the second contact surface is configured to form the inclined surface matching with a surface of the sliding sleeve.

14. An optical fiber connector plug, comprising:
a housing; and
a ferrule assembly accommodated in the housing, the ferrule assembly comprising a ferrule;
the housing comprises a main shaft, the main shaft comprises a shaft body and a second locking structure, a through-hole extending in an axial direction of the shaft body is disposed inside the shaft body, the through-hole is configured to allow an optical fiber to pass through, and the ferrule is configured to be connected to a fiber core of the optical fiber; and
a second locking structure is located on an outer surface of the shaft body and the second locking structure is configured to cooperate with a first locking structure of an optical fiber adapter to secure the optical fiber connector plug to the optical fiber adapter, and the second locking structure is further configured to be unlocked from the first locking structure under driving of a pressing member of the optical fiber adapter so that the optical fiber connector plug is detached from the optical fiber adapter, the second locking structure comprising an annular boss disposed around the outer surface of the shaft body in a circumferential direction of the shaft body, or the second locking structure is an arc-shaped boss disposed on the outer surface of the shaft body in a circumferential direction of the shaft body;

the optical fiber adapter comprising:
an adapter body, the adapter body being provided with a first slot, and the first slot is configured to receive the optical fiber connector plug;
the first locking structure, the first locking structure being disposed on the adapter body and configured to cooperate with the second locking structure of the optical fiber connector plug to secure the optical fiber adapter to the optical fiber connector plug; and
the pressing member, the pressing member being connected to the adapter body, the pressing member being configured to slide relative to the adapter body and configured to drive the first locking structure to be unlocked from the second locking structure.

15. The optical fiber connector plug according to claim 14, wherein a protrusion is disposed on a surface of the second locking structure facing away from the ferrule, the protrusion comprising a second matching surface, the second matching surface being connected to the surface of the second locking structure facing away from the ferrule and an included angle is formed between the second matching surface and the surface of the second locking structure facing away from the ferrule, and the second matching surface is configured to abut against a first matching surface of the second locking structure.

16. The optical fiber connector plug according to claim 14, wherein a surface of the second locking structure facing away from the ferrule is a second matching surface, the second matching surface is perpendicular to the axial direction of the shaft body, and the second matching surface is configured to abut against a first matching surface of the first locking structure.

17. A communication device, comprising:
a housing, the housing is provided with a jack; and
an optical fiber adapter, the optical fiber adapter being disposed at a position of the jack, to be connected to the housing, the optical fiber adapter comprising:
an adapter body, the adapter body being provided with a first slot, and the first slot is configured to receive an optical fiber connector plug;
a first locking structure, the first locking structure being disposed on the adapter body and configured to cooperate with a second locking structure of the optical fiber connector plug to secure the optical fiber adapter to the optical fiber connector plug, the first locking structure comprising:
a first part, the first part is elastically connected to the first groove wall and extends in the axial direction of the adapter body; and
a second part, the second part is bent and connected to one end of the first part away from the first groove wall, the second part extends toward an interior of the first slot and forms an included angle with the first part, and at least a portion of the second part is located inside the first slot, a surface of the second part facing the second groove wall is a first matching surface, and the first matching surface is configured to abut against a second matching surface of the second locking structure; and
a pressing member, the pressing member being connected to the adapter body, the pressing member being configured to slide relative to the adapter body and configured to drive the first locking structure to be unlocked from the second locking structure.

18. The communication device according to claim 17, wherein the optical fiber connector plug is configured to be plugged into the optical fiber adapter, the optical fiber connector plug comprising a connector plug housing and a ferrule assembly accommodated in the connector plug housing, and the ferrule assembly comprises a ferrule;
the connector plug housing comprises a main shaft, the main shaft comprises a shaft body and a second locking structure, a through-hole extending in an axial direction of the shaft body is disposed inside the shaft body, the through-hole is configured to allow an optical fiber to pass through, and the ferrule is configured to be connected to a fiber core of the optical fiber; and
the second locking structure is located on an outer surface of the shaft body, and the second locking structure is configured to cooperate with the first locking structure of the optical fiber adapter to secure the optical fiber connector plug to the optical fiber adapter, and the second locking structure is further configured to be unlocked from the first locking structure under driving of a pressing member of the optical fiber adapter, so that the optical fiber connector plug is detached from the optical fiber adapter.

* * * * *